(12) United States Patent
Nakanishi et al.

(10) Patent No.: US 7,839,069 B2
(45) Date of Patent: Nov. 23, 2010

(54) METHOD FOR MANUFACTURING DIRECT BACKLIGHT UNIT, FLUORESCENT LAMP AND BACKLIGHT UNIT

(75) Inventors: Akiko Nakanishi, Osaka (JP); Taizou Ono, Osaka (JP); Hirofumi Yamashita, Osaka (JP); Kazuhiro Kumada, Hyogo (JP); Haruo Yamazaki, Kyoto (JP); Shinji Kihara, Kyoto (JP); Akio Kitada, Osaka (JP); Masanobu Murakami, Osaka (JP); Tomokazu Matsuura, Osaka (JP); Hiroshi Sakurai, Osaka (JP); Makoto Yokozeki, Kagawa (JP); Takashi Maniwa, Osaka (JP); Shigeru Ido, Osaka (JP)

(73) Assignee: Panasonic Corporation, Osaka (JP)

( * ) Notice: Subject to any disclaimer, the term of this patent is extended or adjusted under 35 U.S.C. 154(b) by 339 days.

(21) Appl. No.: 12/161,212

(22) PCT Filed: Feb. 21, 2007

(86) PCT No.: PCT/JP2007/053224

§ 371 (c)(1),
(2), (4) Date: Jul. 17, 2008

(87) PCT Pub. No.: WO2007/097375

PCT Pub. Date: Aug. 30, 2007

(65) Prior Publication Data

US 2010/0220462 A1 Sep. 2, 2010

(30) Foreign Application Priority Data

Feb. 22, 2006 (JP) .............................. 2006-045563
Mar. 31, 2006 (JP) .............................. 2006-098877

(51) Int. Cl.
*H01J 1/62* (2006.01)
*G02F 1/13357* (2006.01)

(52) U.S. Cl. ......................... 313/493; 313/487; 349/70
(58) Field of Classification Search ......... 313/484–493; 349/70

See application file for complete search history.

(56) References Cited

U.S. PATENT DOCUMENTS

2005/0194906 A1 9/2005 Fujioka (Continued)

FOREIGN PATENT DOCUMENTS

CN 2598738 1/2004

(Continued)

OTHER PUBLICATIONS

Chinese Office Action re App No. 200780010192.2, May 11, 2010, 7 pages including translation.

*Primary Examiner*—Joseph L Williams

(57) ABSTRACT

The orientation of fluorescent lamps is detected in a manufacturing method for a direct backlight unit that alternates orientations of adjacent fluorescent lamps. In a preparation step of the manufacturing method for the backlight unit of the present invention, a plurality of fluorescent lamps are prepared. In each of the fluorescent lamps, a length (a1) from a first sealed portion of a glass bulb (26) to a non-phosphor layer (32) area is shorter than a length (a2) from a second sealed portion to a non-phosphor layer (32) area (a1<a2). In a detection step, the difference between the lengths is detected with use of a sensor. In an installation step, the fluorescent lamps are arranged with use of the detection results so that the first and second ends alternate on a same side of a housing.

20 Claims, 50 Drawing Sheets

U.S. PATENT DOCUMENTS

2009/0096958 A1 * 4/2009 Matsuura et al. .............. 349/70

FOREIGN PATENT DOCUMENTS

| | | |
|---|---|---|
| JP | 64-48851 | 3/1989 |
| JP | 06-295707 | 10/1994 |
| JP | 07-262910 | 10/1995 |
| JP | 07-272506 | 10/1995 |
| JP | 09-017329 | 1/1997 |
| JP | 10-112287 | 4/1998 |
| JP | 11-008327 | 1/1999 |
| JP | 11-111039 | 4/1999 |
| JP | 11-250807 | 9/1999 |
| JP | 2002-093376 | 3/2002 |
| JP | 2003-036723 | 2/2003 |
| JP | 2005-183011 | 7/2005 |
| JP | 2005-251585 | 9/2005 |
| JP | 2005-294019 | 10/2005 |
| WO | 2004/095503 | 11/2004 |

* cited by examiner

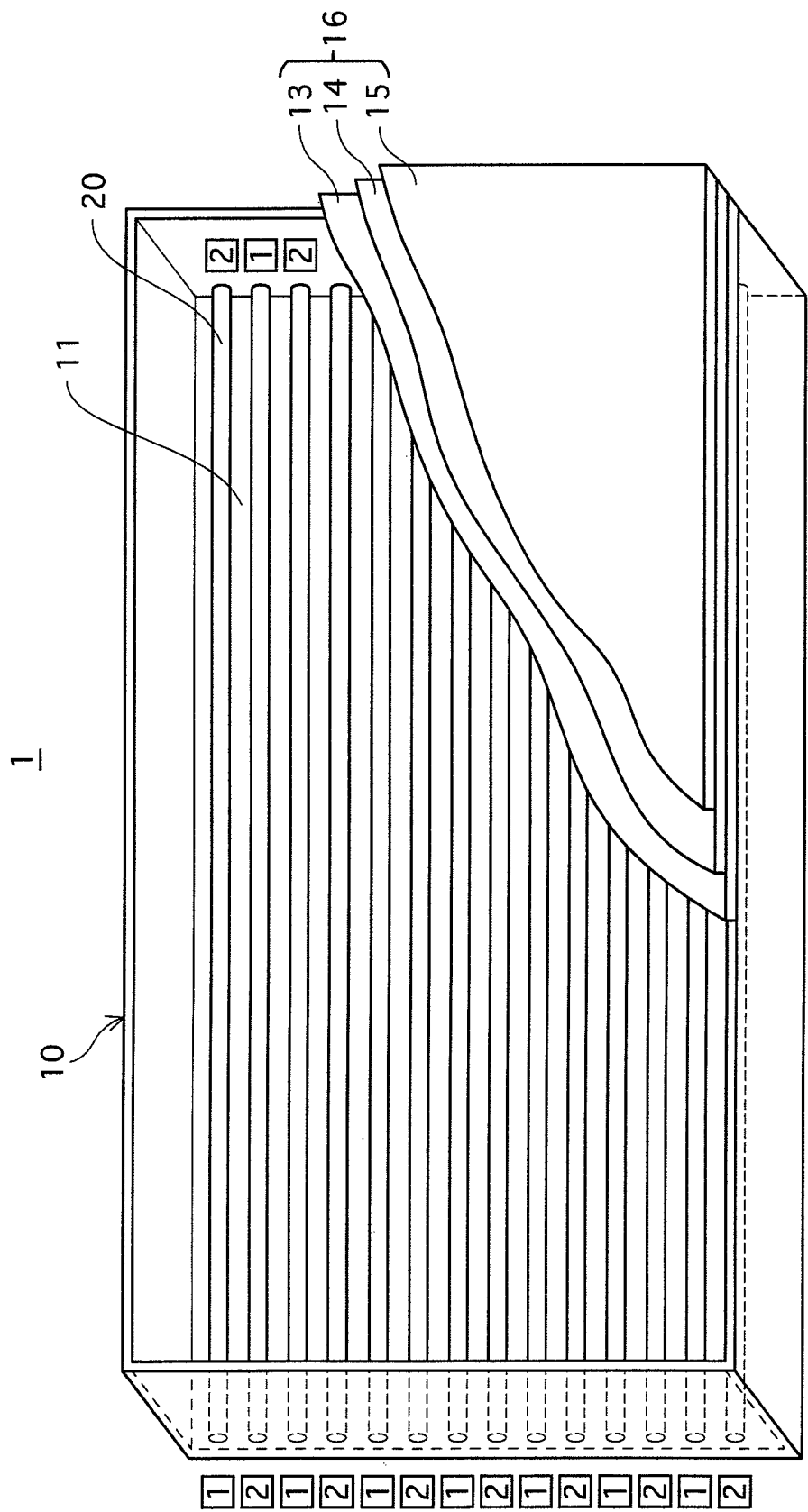

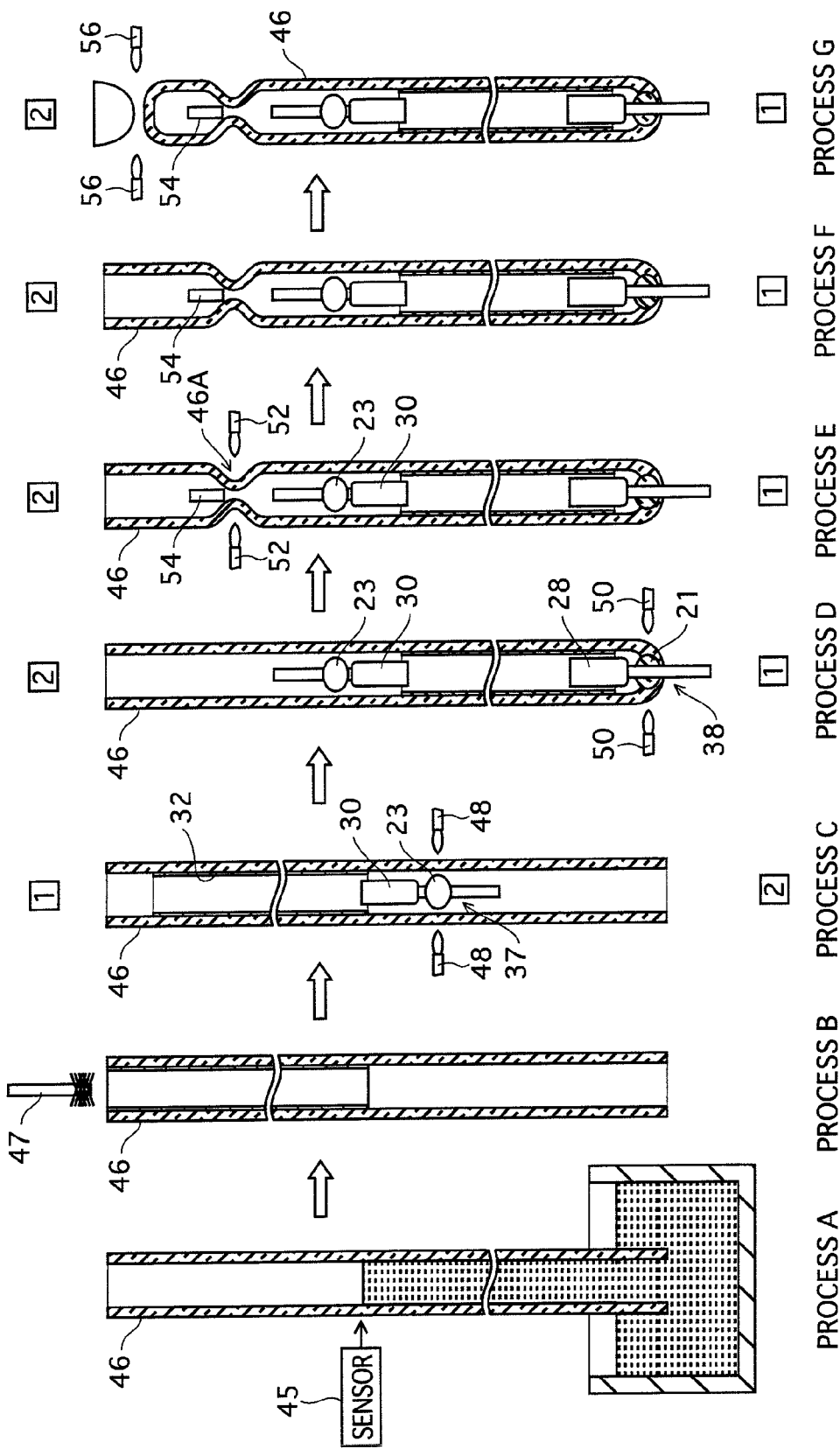

FIG.18A
FIG.18B
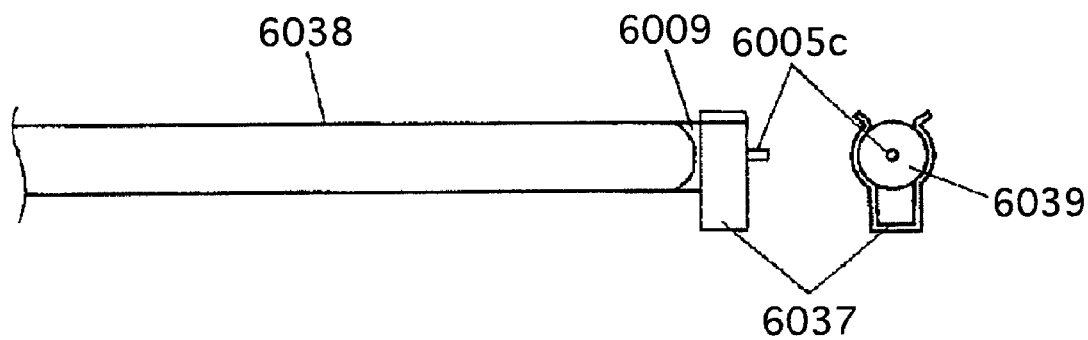
FIG.18C
FIG.18D
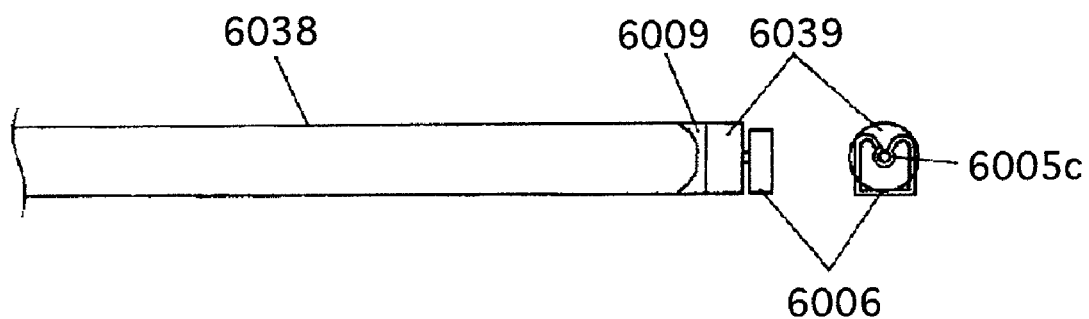

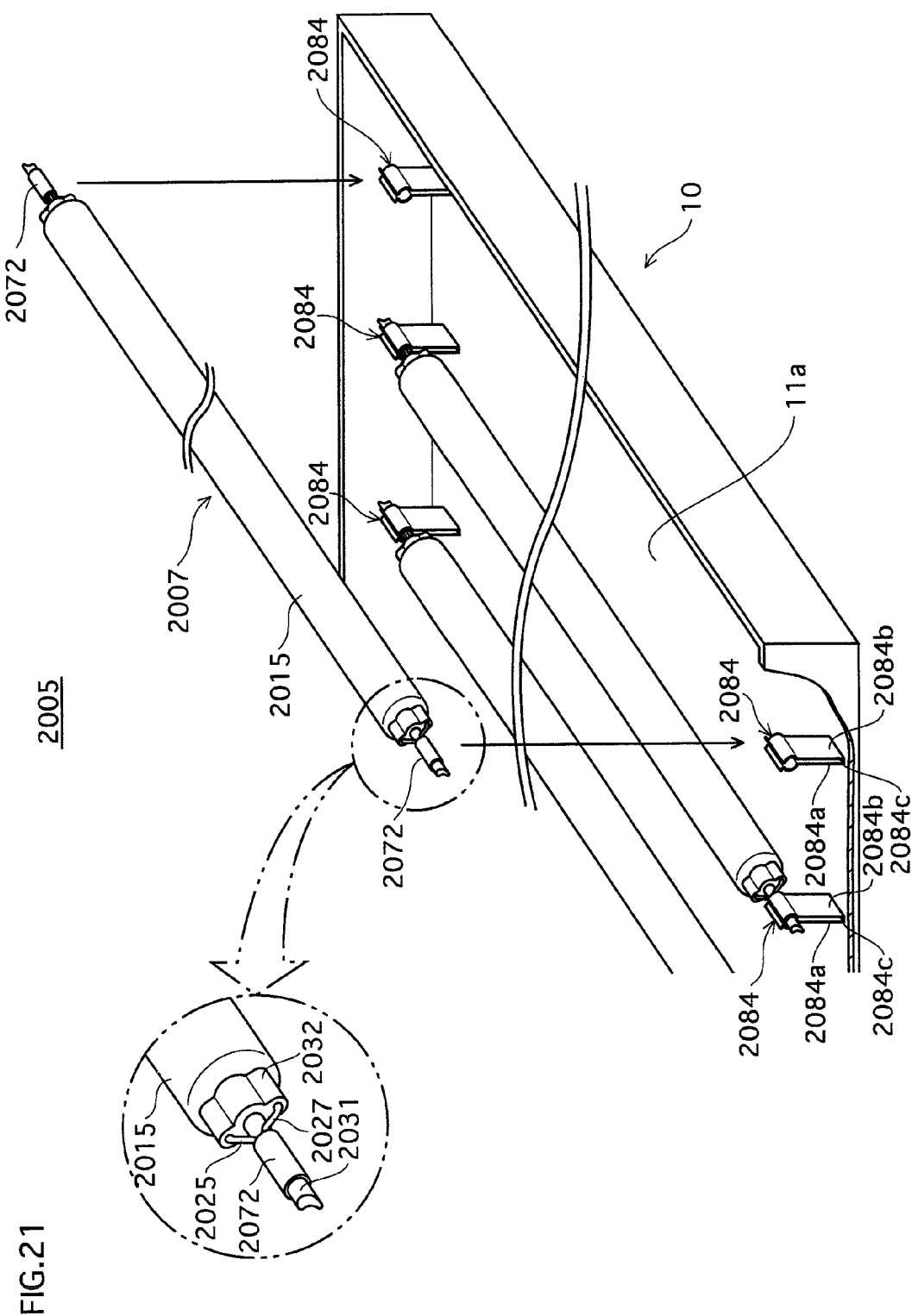

FIG.47

| IMPROVEMENT RATE | REFERENCE SYMBOL | CHARGED PRESSURE (x) | DRIVE CURRENT (y) |
|---|---|---|---|
| 3 [%] | P1 | 10 | 7.6 |
| | P2 | 21 | 6 |
| | P3 | 31 | 4 |
| | P4 | 49 | 4 |
| | P5 | 51 | 6 |
| | P6 | 52 | 8 |
| | P7 | 53 | 10 |
| 5 [%] | Q1 | 10 | 8.5 |
| | Q2 | 13 | 8 |
| | Q3 | 30 | 6 |
| | Q4 | 44 | 6 |
| | Q5 | 47 | 8 |
| | Q6 | 50 | 10 |
| 7 [%] | R1 | 10 | 9.3 |
| | R2 | 27 | 8 |
| | R3 | 39 | 8 |
| | R4 | 46 | 10 |
| 10 [%] | S1 | 10 | 10 |
| | S2 | 32 | 10 |

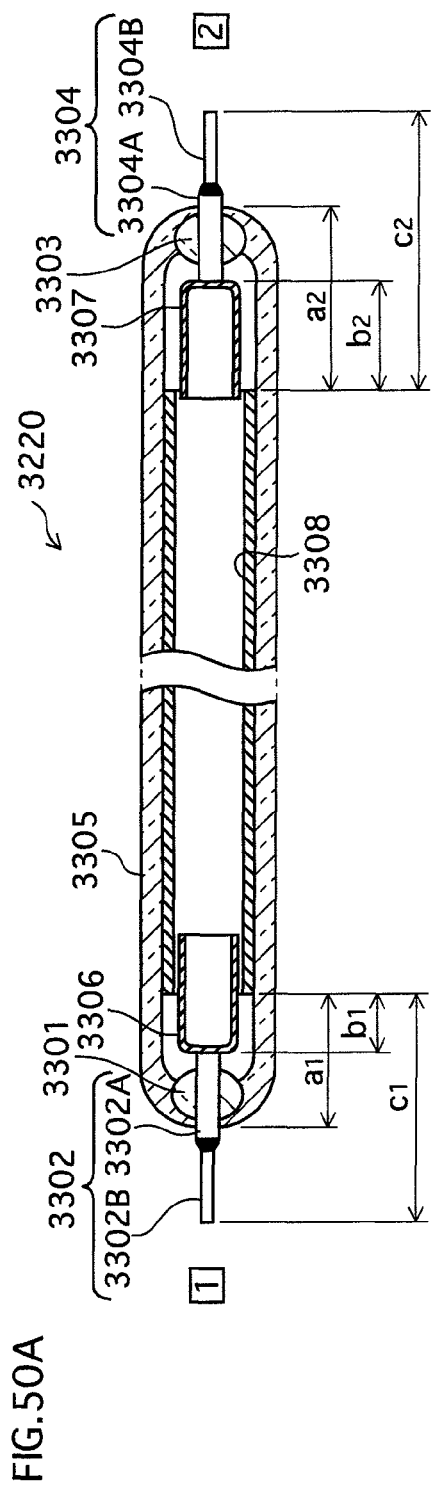
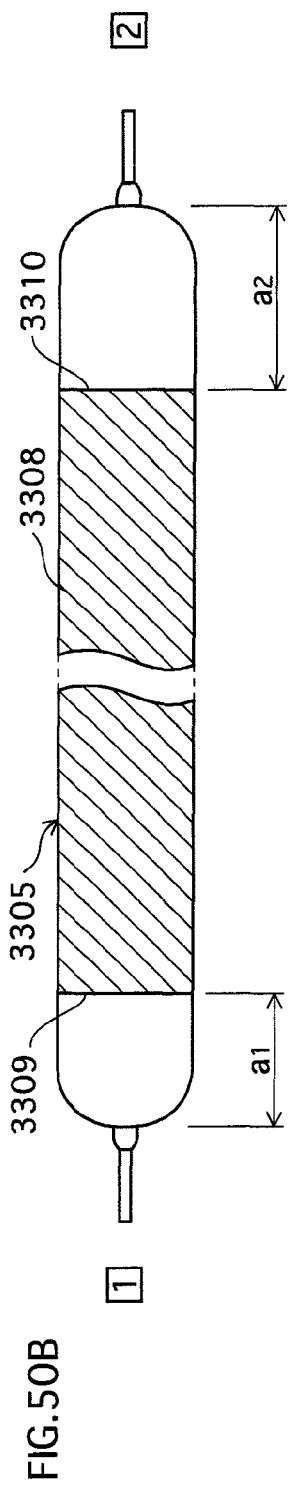
FIG.50A
FIG.50B
FIG.50C

FIG.51
(a) 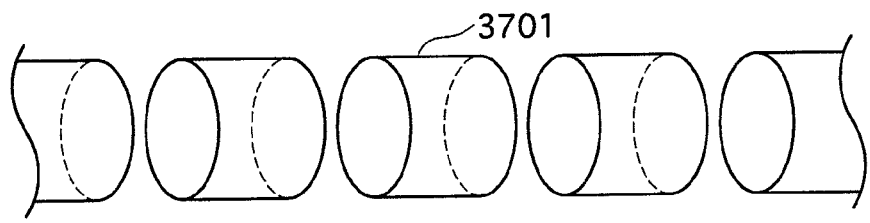
(b) 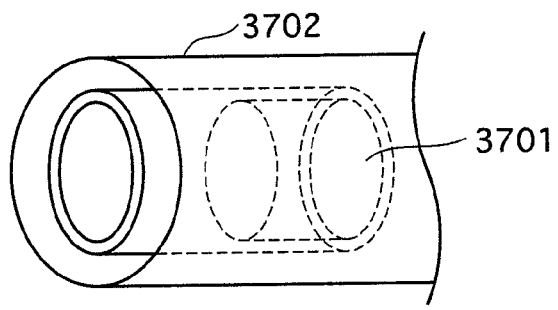
(c) 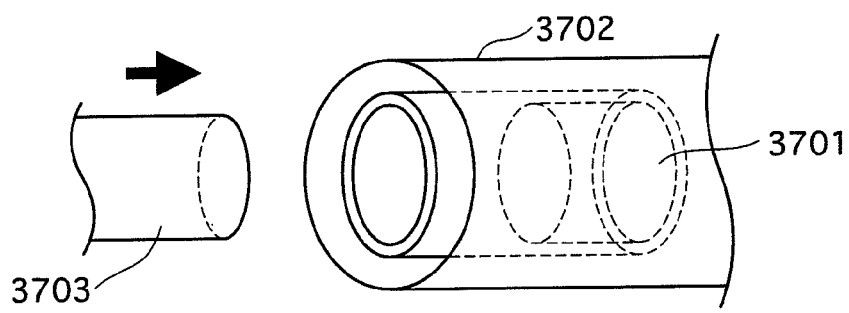
(d) 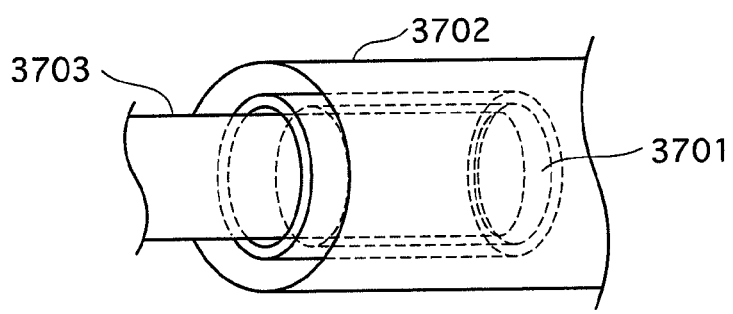
(e) 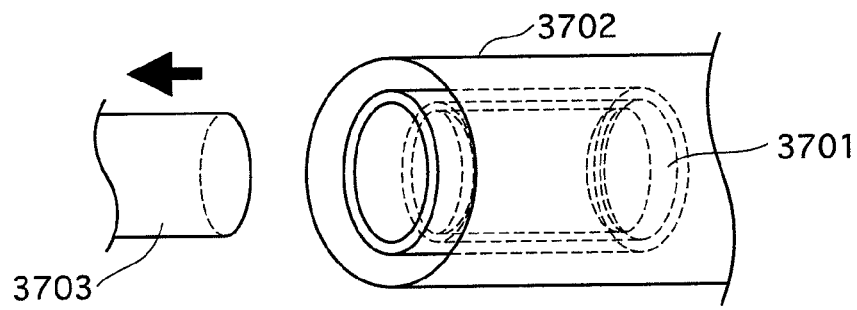

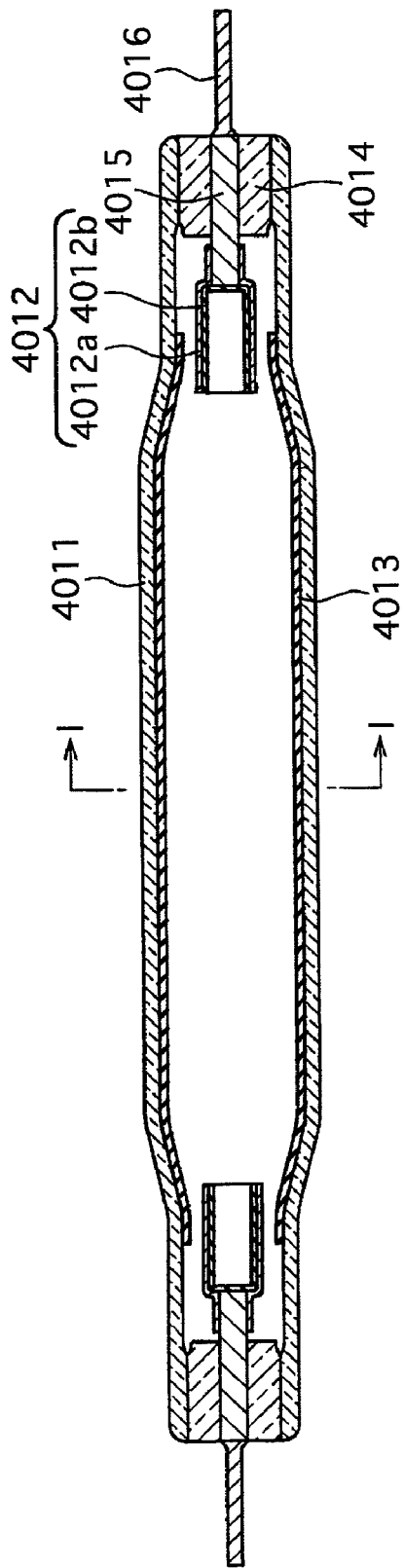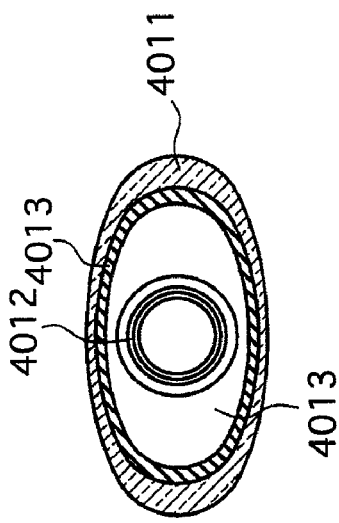
FIG.56A
FIG.56B

| | SPATTER AMOUNT [μg] |
|---|---|
| WORKING EXAMPLE 1 | 2.1 |
| COMPARATIVE EXAMPLE 1 | 3.3 |
| COMPARATIVE EXAMPLE 2 | 5.8 |

METHOD FOR MANUFACTURING DIRECT BACKLIGHT UNIT, FLUORESCENT LAMP AND BACKLIGHT UNIT

TECHNICAL FIELD

The present invention relates to a manufacturing method for a direct type backlight unit, and in particular to technology for detecting a proper orientation of a fluorescent lamp when arranging the fluorescent lamp in a housing of the backlight unit.

BACKGROUND ART

A backlight unit is mounted behind a liquid crystal panel, and is used as a light source of a liquid crystal display apparatus. Types of backlight units can be roughly divided into edge light type and direct type.

A direct type backlight unit includes a housing having a light-extracting open side on a liquid-crystal panel side, and a plurality of fluorescent lamps disposed in the housing. The open side is covered by a diffusion plate, diffusion sheet, lens sheet, etc. made of resin.

A phosphor layer has been formed on an inner face of a glass bulb of each one of the fluorescent lamps. The phosphor layer has an uneven thickness in the lengthwise direction of the glass bulb. Since the fluorescent lamps used in backlight units are of a thin type having a tube diameter of only a few [mm], the thickness of the phosphor layer is particularly prone to unevenness.

Specifically, with respect to the lengthwise direction of the glass bulb, the film thickness of the phosphor layer is thick at one end and thin at the other end. When the lamps are lit, the difference in film thickness of the phosphor layer is expressed as a difference in luminance, and may result in luminance irregularities.

For this reason, in direct type backlight units, luminance irregularities are suppressed by alternating the lengthwise orientation of adjacent fluorescent lamps when installing the fluorescent lamps inside the housing.

In a conventional manufacturing method for backlight units, an operator visually confirms an identifying mark (a lot number, etc.) that is provided on only one end of each lamp, detects lengthwise orientation, and arranges the lamps in the housing.

Patent document 1: Japanese Patent Application Publication No. H11-250807
Patent document 2: Japanese Patent Application Publication No. H11-008327

DISCLOSURE OF THE INVENTION

Problems Solved by the Invention

However, the conventional method using identifying marks requires a process and equipment for applying the identifying marks, thereby leading to higher costs.

Also, the conventional method is not well suited to automation of labor.

The present invention has been achieved in view of the above problem, and an aim thereof is to provide a manufacturing method for a direct type backlight unit in which the orientation of a fluorescent lamp can be automatically detected by a simple method and a process and equipment for detecting identifying marks are not necessary, a fluorescent lamp manufactured using the method, and a backlight unit using the fluorescent lamp.

Means to Solve the Problems

In order to solve the above problem, the manufacturing method for a direct type backlight unit of claim 1 of the present invention is a manufacturing method for a direct type backlight unit formed by arranging adjacent fluorescent lamps having different light emitting properties along a lengthwise direction of a housing in opposing orientations in a lengthwise direction, and includes the steps of preparing a plurality of fluorescent lamps, each of the fluorescent lamps having a non-phosphor layer area of a first length at a first end, a non-phosphor layer area of a second length at a second end, and light emitting properties that are different from each other at a first end side and a second end side; detecting, with use of a sensor, a length of the non-phosphor layer area at least one of the first end and the second end; and installing the plurality of fluorescent lamps in the housing with use of a result of the detection, so that the first end and the second end alternate on a same side of the housing.

In the backlight unit manufacturing method of claim 2 of the present invention, using a boundary between a non-phosphor layer area and a phosphor layer area as a reference, a distance from the boundary to a predetermined position of a constituent element of the fluorescent lamp may be detected with use of the sensor.

In the backlight unit manufacturing method of claim 3 of the present invention, each of the fluorescent lamps may further include a pair of electrodes, each electrode being disposed on an inner side of a different one of the first end and the second end, and in the detection step, a distance from the boundary to a base of at least one of the electrodes may be detected with use of the sensor.

In the backlight unit manufacturing method of claim 4 of the present invention, each of the first and second end portions of each of the fluorescent lamps may further include a lead wire projecting outward, and in the detection step, a distance from the boundary to an outer tip of at least one of the lead wires may be detected with use of the sensor.

Also, the fluorescent lamp of claim 5 of the present invention is a fluorescent lamp including a glass bulb and a phosphor layer formed on an inner face of the glass bulb excluding ends thereof, wherein a length of a non-phosphor layer area extending from one of the ends of the glass bulb and a length of the non-phosphor layer area extending from another of the ends of the glass bulb are sufficiently different so as to be identifiable by a sensor.

The fluorescent lamp of claim 6 of the present invention may have an identifying mark pertaining to detecting lengthwise orientation provided on one of an outer circumference and an inner circumference of the non-phosphor layer area of the glass bulb.

In the fluorescent lamp of claim 7 of the present invention, a plurality of the identifying marks may have been provided at respective positions on the outer circumference of the glass bulb, the positions corresponding to the non-phosphor layer area, the plurality of identifying marks provided so as to be at positions substantially equivalent to each other in the lengthwise direction of the glass bulb, and such that one or more of the identifying marks is visible from a direction regardless of a revolution direction of the glass bulb, and so as to have one or more intervals therebetween in the revolution direction.

In the fluorescent lamp of claim 8 of the present invention, the difference between the length of the non-phosphor layer area extending from the one end of the glass bulb and the length of the non-phosphor layer area extending from the another end of the glass bulb may be greater than or equal to 2 [mm].

In the fluorescent lamp of claim 9 of the present invention, both of the ends of the glass bulb may have been pinch-sealed to form pinch-sealed ends, a lead-in wire and a gas exhaust tube may have been inserted through at least one of the pinch-sealed ends, the lead-in wire functioning as a power supply route to an internal electrode, and an outer end of the gas exhaust tube may be sealed, and the fluorescent lamp may further include a base that is electrically connected to the lead-in wire and affixed to one of the gas exhaust tube and a portion of the glass bulb excluding the pinch-sealed ends.

In the fluorescent lamp of claim 10 of the present invention, the base may be sleeve-shaped and affixed to an un-pinch-sealed portion of the glass bulb, the un-pinch-sealed portion being a portion of the glass bulb other than the pinch-sealed ends.

In the fluorescent lamp of claim 11 of the present invention, the gas exhaust tube may extend outward from at least one of the pinch-sealed ends, and the base may be affixed to an extending portion of the gas exhaust tube.

The fluorescent lamp of claim 12 of the present invention may further include a pair of bottomed tube-shaped electrodes, each electrode being disposed on an inner side of a different one of the first end and the second end; and a fluorescent lamp emitter containing magnesium oxide, whose primary particles are formed from single crystals, formed on at least a portion of one of an inner face and an outer face of at least one of the electrodes, an average particle diameter of the single crystals being less than or equal to 1 [μm].

The fluorescent lamp of claim 13 of the present invention may further include a pair of bottomed tube-shaped electrodes, each electrode being disposed on an inner side of a different one of the first end and the second end, wherein an electrode material of at least one of the electrodes may be composed of nickel as a base material, yttrium oxide in a range of 0.1 [wt %] to 1.0 [wt %] inclusive having been added to the electrode material.

In the fluorescent lamp of claim 14 of the present invention, any of silicon, titanium, strontium and calcium may have been added to the electrode material in a content amount that is less than or equal to half of a content amount of the yttrium oxide.

In the fluorescent lamp of claim 15 of the present invention, a mixed gas including argon gas and neon gas may have been enclosed in the glass bulb, letting a charged pressure [Torr] of the mixed gas be plotted on an x axis and a drive current value [mA] be plotted on a y axis in an x-y orthogonal coordinate system, the charged pressure of the mixed gas may be a coordinate value of x and the mixed gas drive current value may be a coordinate value of y that are in an area enclosed by a line (including the line) drawn sequentially between points represented as (x,y) coordinates, the points being (10,10), (10, 7.6), (21,6), (31,4), (49,4), (51,6), (52,8), (53,10) and (10,10), and the mixed gas may contain argon gas at a partial pressure rate of greater than or equal to 20[%].

In the fluorescent lamp of claim 16 of the present invention, the charged pressure of the mixed gas and the drive current value may be, respectively, in an area enclosed by a line (including the line) drawn sequentially between points represented as (x,y) coordinates in the x-y orthogonal coordinate system, the points being (10,10), (10, 8.5), (13,8), (30,6), (44,6), (47,8), (50,10), and (10,10).

In the fluorescent lamp of claim 17 of the present invention, the charged pressure of the mixed gas and the drive current value may be, respectively, in an area enclosed by 5a line (including the line) drawn sequentially between points represented as (x,y) coordinates in the x-y orthogonal coordinate system, the points being (10,10), (10, 9.3), (27,8), (39,8), (46,10), and (10,10).

In the fluorescent lamp of claim 18 of the present invention, the charged pressure of the mixed gas and the drive current value may be, respectively, on a line that connects points represented as (x,y) coordinates in the x-y orthogonal coordinate system, the points being (10,10) and (32, 10).

The backlight unit of claim 19 of the present invention includes the fluorescent lamp of claim 5 in a housing.

The liquid crystal display apparatus of claim 20 of the present invention includes the backlight unit of claim 19.

EFFECTS OF THE INVENTION

According to the backlight unit manufacturing method of claim 1 of the present invention, for example, detecting with use of a sensor whether the length of a non-phosphor layer area is in a predetermined range enables automatically detecting the orientation of the fluorescent lamp in the lengthwise direction, that is to say, detecting that the film thickness of a phosphor layer is thick or thin in either direction. Also, a process and equipment for applying identifying marks are not necessary.

According to the backlight unit manufacturing method of claim 2 of the present invention, detecting the orientation of the fluorescent lamps in the lengthwise direction is possible by using as guidance a distance from a boundary between a non-phosphor layer area and a phosphor layer area to a constituent element commonly provided in fluorescent lamps.

According to the backlight unit manufacturing method of claim 3 of the present invention, detecting the orientation of the fluorescent lamps in the lengthwise direction is possible by using as guidance the boundary and a base of an electrode that is a constituent element generally provided in fluorescent lamps.

According to the backlight unit manufacturing method of claim 4 of the present invention, detecting the orientation of the fluorescent lamps in the lengthwise direction is possible by using as guidance the boundary and an outer tip of a lead wire that is a constituent element generally provided in fluorescent lamps.

Also, according to the fluorescent lamp of claim 5 of the present invention, for example, in the manufacturing method for a direct type backlight unit, it is possible to detect the lengthwise orientation of a glass bulb with use of the difference in the lengths of the non-phosphor layer areas, and arrange the fluorescent lamp in the housing of the backlight unit with reference to the orientation.

According to the fluorescent lamp of claim 6 of the present invention, for example, the distance from the boundary between the non-phosphor layer area and the phosphor layer area to the identifying mark can be used to more precisely detect the lengthwise orientation of the glass bulb.

Also, according to the fluorescent lamp of claim 7 of the present invention, for example, a plurality of identifying marks are provided in positions that are substantially equivalent in the lengthwise direction of the glass bulb, and are detectable from a single side independently of the revolution direction of the glass bulb, thereby enabling detecting the identifying marks from one direction with use of a sensor fixed in a single position, and simplifying the equipment structure pertaining to the sensor.

Also, according to the fluorescent lamp of claim 8 of the present invention, since there is a difference in length of, for example, greater than or equal to 2 [mm], even taking manufacturing errors and sensor precision into account, the orientation in the lengthwise direction of the glass bulb can be reliably detected.

Also, according to the fluorescent lamp of claim 9 of the present invention, since the base is affixed to a gas exhaust tube or to a portion of the glass bulb other than the pinch-sealed ends, the fluorescent lamp can be supported, while avoiding the pinch-sealed ends that experience great processing strain, and the load on the ends of the glass bulb can be suppressed more than conventional bead sealing. Employing a fluorescent lamp achieving the above effects in the lighting apparatus enables suppressing cases of hindrance to lighting the lamp, prolonging the lamp replacement cycle, and improving convenience.

Also, according to the fluorescent lamp of claim 13 of the present invention, a cold cathode fluorescent lamp can be achieved that enables improving spatter resistance by the addition of yttrium oxide to a low-cost nickel base material, and has a high degree of spatter resistance at a low cost.

Also, according to the fluorescent lamp of claim 14 of the present invention, the life of the cold cathode fluorescent lamp can be further lengthened since oxidization of the electrodes can be prevented.

Also, according to the fluorescent lamp of claim 15 of the present invention, the luminance efficiency can be improved at least 3[%] over the existing cold cathode fluorescent lamp since the charged pressure of the mixture gas and the drive current are set in the above range. Also, since argon gas is included in the mixture gas at greater than or equal to 20[%] partial pressure rate, there are no problems in luminance maintenance rate when used to replace existing cold cathode fluorescent lamps.

Also, according to the fluorescent lamp of claim 16 of the present invention, the luminous efficiency is improved by at least 5[%] over existing cold cathode fluorescent lamps.

Also, according to the fluorescent lamp of claim 17 of the present invention, the luminous efficiency is improved by at least 7[%] over existing cold cathode fluorescent lamps.

Also, according to the fluorescent lamp of claim 18 of the present invention, the luminous efficiency is improved by at least 10[%] over existing cold cathode fluorescent lamps.

BRIEF DESCRIPTION OF THE DRAWINGS

FIG. 1 is a perspective view of a schematic structure of a direct type backlight unit 1 pertaining to embodiment 1;

FIG. 3 shows manufacturing processes for the cold cathode fluorescent lamp 20;

FIG. 18A is a front view showing a cold cathode fluorescent lamp pertaining to variation 4 of embodiment 3 being installed in an external electrode type fluorescent lamp socket, FIG. 18B is a side view of FIG. 18A, FIG. 18C is a front view of the cold cathode fluorescent lamp being inserted into a cold cathode fluorescent lamp socket, and FIG. 18D is a side view of FIG. 18C;

FIG. 21 is a perspective view of a relevant portion of a backlight unit pertaining to embodiment 4;

FIG. 47 indicates values of coordinate points shown in FIG. 46;

FIG. 50A shows a schematic structure of a cold cathode fluorescent lamp 3220 having a portion cut away, FIG. 50B is a pattern diagram showing an area where a phosphor film 3308 has been formed, and FIG. 50C is a cross-sectional view of an electrode 3306;

FIG. 51 shows a manufacturing method for the electrode 3306;

FIG. 56A is a cross-sectional view showing another example of a fluorescent lamp pertaining to embodiment 12, and FIG. 56B shows a cross section taken along line I-I';

Figure 2A:
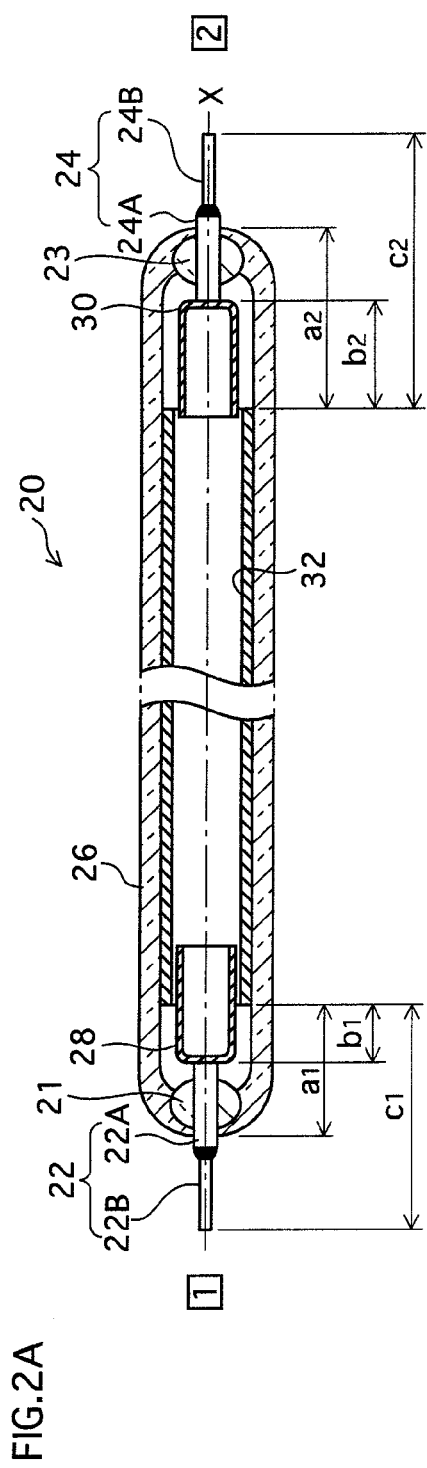
FIG. 2A is a cross-sectional view of a schematic structure of a cold cathode fluorescent lamp 20, including a tube axis X.

DESCRIPTION OF THE CHARACTERS 1 direct type backlight unit
20 fluorescent lamp
26, 26a, 26b glass bulb
32 phosphor film
33 phosphor film (marked for identification)
34, 36 boundary
70a, 70b, 70c, 71, 72 identifying mark

BEST MODE FOR CARRYING OUT THE INVENTION

Embodiment 1

Embodiment 1 pertaining to the present invention is described below with reference to the drawings.

1. Structure of the Direct Type Backlight Unit

FIG. 1 is a perspective view of a schematic structure of a direct type backlight unit 1 pertaining to the present embodiment. In FIG. 1, part of an optical sheet 16 has been cut away to show the interior structure.

The direct type backlight unit 1 includes a plurality of fluorescent lamps 20, a housing 10 that only has a light-extracting open side on a surface on the liquid-crystal panel side and that stores the plurality of fluorescent lamps 20 (hereinafter referred to simply as "lamps 20"), and the optical sheet 16 that covers the open side in the housing 10.

The lamps 20 have a straight tube shape, and are arranged such that axes in the lengthwise direction of the straight tube substantially conform to the lengthwise direction (horizontal direction) of the housing 10. Fourteen lamps 20 are alternated in the housing 10, having a predetermined interval therebetween in the width direction (vertical direction).

"Alternated" means that, in adjacent ones of the lamps 20 each having a first sealed portion and a second sealed portion, the first sealed portions are on opposite ends from each other, and the second sealed portions are on opposite ends from each other. In FIG. 1, the first sealed portions and the second sealed portions of the lamps 20 are distinguished by boxed numbers "1" and "2", respectively.

Note that these lamps 20 are lit by a drive circuit that is not depicted.

The housing 10 is made from, for example, polyethylene terephthalate (PET) resin, and a metal such as silver has been vacuum evaporated on an inner face 1 of the housing to form a reflective surface. Note that the housing 10 may be constituted from, for example, a metallic material such as aluminum instead of a resin.

The open side of the housing 10 is covered by the transparent optical sheet 16, and sealed closed so that foreign substances such as dust and dirt cannot enter. The optical sheet 16 has been formed by layering a diffusion plate 13, a diffusion sheet 14, and a lens sheet 15.

The diffusion plate 13 and the diffusion sheet 14 diffuse and scatter light emitted from the lamps 20. The lens sheet 15 aligns the light in a normal direction of the lens sheet 15, and as a result of this structure, the light emitted by the lamps 20 is caused to radiate evenly forward from the entire surface (light-emitting face) of the optical sheet 16. Note that PC (polycarbonate) resin can be used as the material of the diffusion plate 13.

2. Structure of Fluorescent Lamps

Figure 2B:
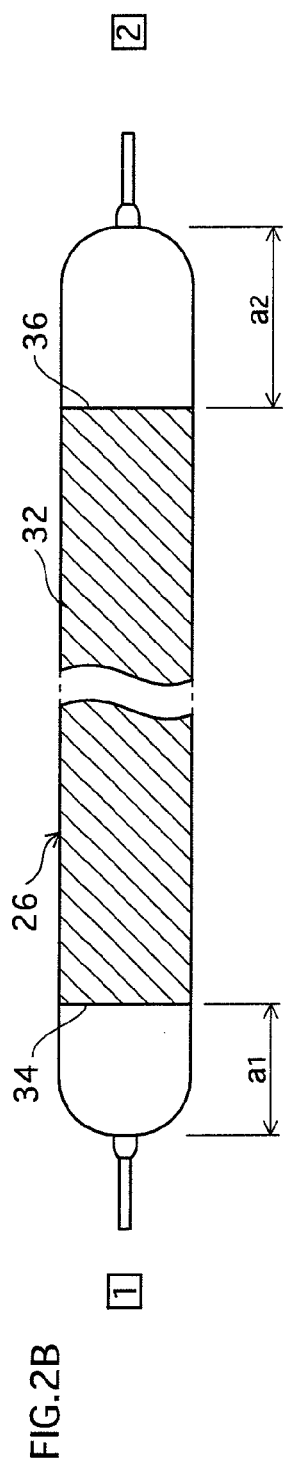
FIG. 2B is a pattern diagram showing an area in which a phosphor layer 32 has been formed on a glass bulb 26.
Figure 2C:
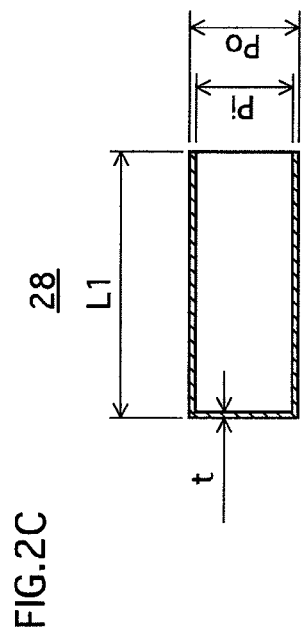
FIG. 2C is a cross-sectional view of an electrode 28.

Next, the structure of the fluorescent lamps 20 pertaining to the present embodiment is described with reference to FIG. 2. FIG. 2A is a cross-sectional view of a schematic structure of the fluorescent lamp 20, including a tube axis X. FIG. 2B is a pattern diagram showing an area in which a phosphor layer 32 has been formed. FIG. 2C is a cross-sectional view of an electrode 28.

The fluorescent lamps pertaining to the present embodiment are cold cathode fluorescent lamps (hereinafter referred to as "lamps 20"), and include a glass bulb (glass container) 26 having a straight tube shape of which the cross-section is substantially circular when sectioned perpendicular to the tube axis X. For example, the glass bulb 26 has a 3.0 [mm] outer diameter and a 2.0 [mm] inner diameter, and is made of borosilicate glass. The measurements of the lamps 20 described below are values corresponding to the measurements of the glass bulb 26, which has a 3.0 [mm] outer diameter and a 2.0 [mm] inner diameter. Needless to say, such values are an example and do not limit the present embodiment.

Mercury in the glass bulb 26 occupies a predetermined ratio of the cubic capacity of the glass bulb 26, for example, such that the glass bulb 26 is filled to 0.6 [mg/cc], and the glass bulb 26 is filled to a predetermined filling pressure, for example 60 [Torr] with a noble gas such as argon or neon. Note that a mixed gas of argon and neon (5 [%] Ar, 95 [%] Ne) is used as the noble gas.

Also, the phosphor layer 32 has been formed on an inner face of the glass bulb 26. The phosphor layer 32 includes red phosphor, green phosphor, and blue phosphor that convert ultraviolet radiation emitted from the mercury into red, green, and blue light respectively.

$Y_2O_3:Eu^{3+}$ (YOX) can be used as material for the red phosphor, $LaPO_4:Ce^{3+}, Tb^{3+}$ (LAP) as material for the green phosphor, and $BaMg_2Al_{16}O_{27}:Eu^{2+}$ (BAM-B, europium-activated barium-magnesium aluminate) as material for the blue phosphor.

The phosphor layer 32 is uneven in the lengthwise direction of the glass bulb 26, and is for example thicker towards the second sealed portion side than the first sealed portion side. This unevenness in film thickness influences the light emitting property of the lamps 20 when lit.

Furthermore, lead wires 22 and 24 extend outward from respective ends of the glass bulb 26. The lead wires 22 and 24 have been sealed to the respective ends of the glass bulb 26 via bead glasses 21 and 23.

The lead wire 22(24) is a trunk wire constituted from, for example, an inner lead wire 22A(24A) made of tungsten, and an outer lead wire 22B(24B) made of nickel. The inner lead wire 22A(24B) has a 1 [mm] wire diameter and a 3 [mm] total length, and the outer lead wire 22B(24B) has a 0.8 [mm] wire diameter and a 5 [mm] total length.

A hollow electrode 28(30) has been fixed to a tip of the inner lead wire 22A(24A). The fixing is performed by laser welding, for example.

The electrodes 28 and 30 have the same shape, and the measurements of each portion shown in FIG. 2C are as follows. The electrode length L1 is 5 [mm], the outer diameter pO is 1.70 [mm], the inner diameter pi is 1.50 [mm], and the thickness t is 0.10 [mm].

When the lamps 20 are lit, a discharge occurs in the tube portions of the bottomed tube-shaped electrodes 28 and 30 and between the electrodes 28 and 30.

As shown in FIG. 2B, on the first sealed portion side of the glass bulb 26, b2 is longer than b1 (b2>b1) where b1 is the distance from a boundary 34 (a border between the phosphor layer area, where the phosphor layer 32 exists, and the non-phosphor layer area, where the phosphor layer 32 does not exist) and the base of the electrode 28, and b2 is the distance from a boundary 36 to the base of the electrode 30. The base of the electrode referred to here is the base portion where the electrode 28 (30) is fixed to the lead wire 22 (24).

Note that as a result of the positions of members other than the phosphor layer 32, namely the electrodes 28 and 30 and lead wires 22 and 24, being provided symmetrically on both the left and the right ends, c2 is longer than c1 (c2>c1) where c1 and c2 are the distances from the boundaries 34 and 36 to outer tips of the outer lead wires 22B and 24B, respectively.

Also, a2 is longer than a1 (a2>a1) where a1 is the distance from the boundary 34 to the end on the first sealed portion side (length of the non-phosphor layer area) and a2 is the length from the boundary 36 to the end on the second sealed portion side.

Note that the ends of the glass bulb 26 may be variable in shape as a result of variations in the manufacturing process, and in the present embodiment, the ends refer to the outer tips in the lengthwise direction.

For example, the measurements thereof are as follows.

a1=8.0 [mm], a2=10.0 [mm], b1=5.0 [mm], b2=7.0 [mm], c1=14.0 [mm], and c2=16.0 [mm]

Since b2 is longer than b1 as described above, the lengthwise orientations of the fluorescent lamps 20 (the glass bulb 26) pertaining to the present invention can be detected by using a sensor to detect whether either b2 or 131 fits in a predetermined range, or by using the sensor to detect the distances b2 and b1 and then obtaining a difference between the two distances. It is also possible to suppress costs since the process and equipment for applying identifying marks is unnecessary.

Also, since the phosphor layer 32 has been formed around the entire circumference of the glass bulb 26, detection can be performed from a single direction regardless of the revolution direction (rotation direction) of the glass bulb 26, and the structure of the sensing equipment can be simplified.

Furthermore, using the distance from the boundary between the phosphor layer area and the non-phosphor area to structural parts of the lamps such as electrodes and lead wires for detection enables structural parts generally provided in lamps to be used effectively for detecting orientation.

Note that since distances c1, c2, a1, and a2 also differ, detection and identification can also be performed similarly with use of such distances.

3. Manufacturing Method for Cold Cathode Fluorescent Lamps

Next, regarding a manufacturing method for the cold cathode fluorescent lamps 20 having the structure described above, the method is described focusing particularly on details of the formation of the phosphor layer and both sealed portions.

Figure 4:
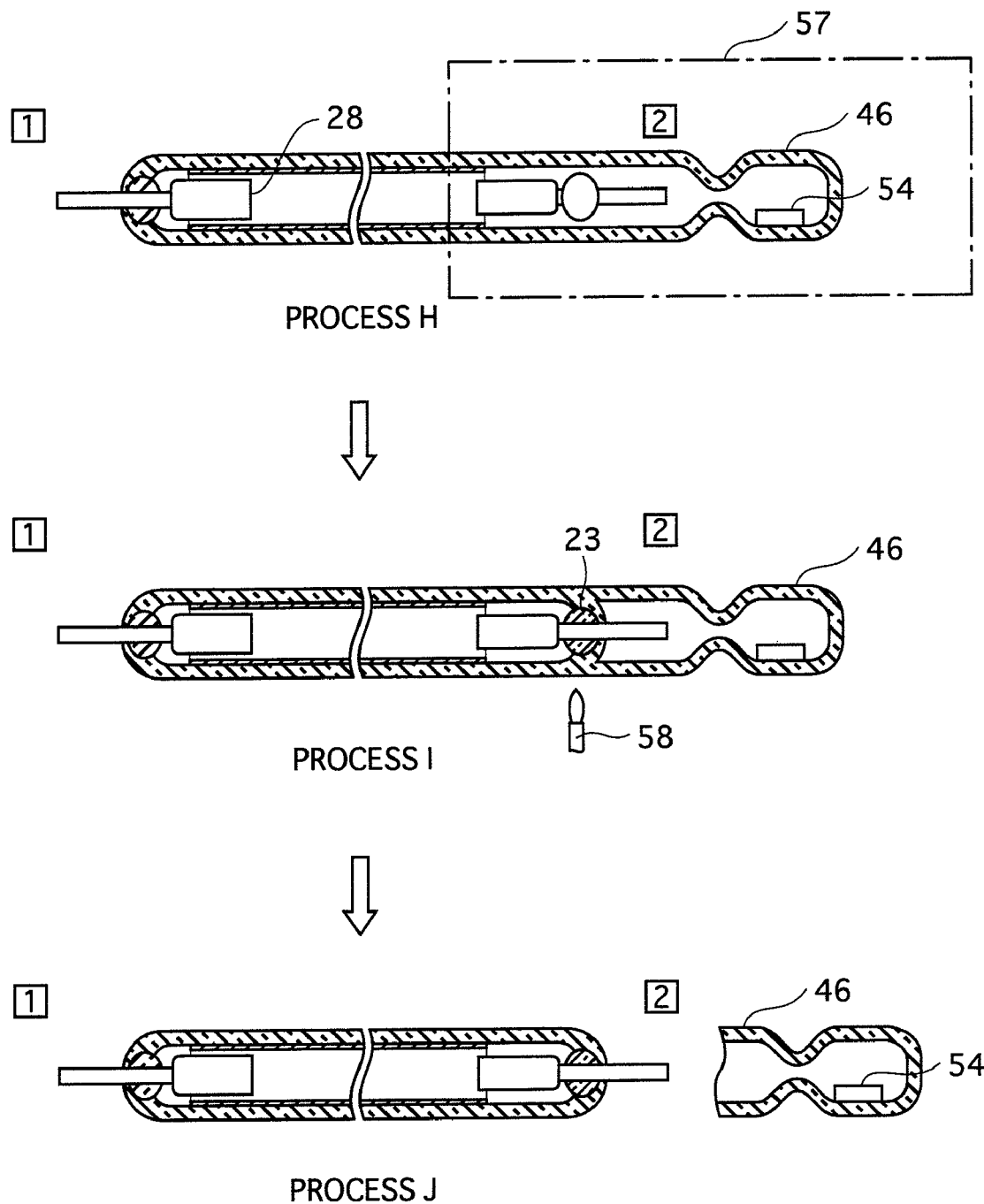
FIG. 4 shows manufacturing processes for the cold cathode fluorescent lamp 20.

FIGS. 3 and 4 show manufacturing processes for the fluorescent lamps 20.

First, a prepared straight tube shaped glass tube 46 is immersed into a tank containing a phosphor suspension liquid. Creating a negative pressure in the glass tube 46 allows the glass tube 46 to suction a portion of the phosphor suspension liquid from the tank, causing the phosphor suspension liquid to be applied to the inner face of the glass tube 46 (process A). A setting for this suction allows the liquid level to reach a predetermined height of the glass tube 46, by using an optical sensor 45 to detect the liquid level.

Due to the influence of viscosity, surface tension, etc., of the phosphor suspension liquid, the margin of error of the liquid level height is fairly large, ±0.5 [mm].

Next, after drying the phosphor suspension liquid applied to the inner face of the glass tube 46, a brush 47 is inserted into the glass tube 46, and any unnecessary phosphor is removed from the end of the glass tube 46 (process B).

Thereafter, the glass tube is transferred to a furnace that is not depicted, and calcination is performed to obtain the phosphor layer 32.

After inserting an electrode unit 37 including the electrode 30 and the bead glass 23 into the glass tube 46 in which the phosphor layer has formed, temporary fastening is performed (process C). Temporary fastening refers to heating, with use of a burner 48, an outer circumference portion of the glass tube 46 where the bead glass 23 is to be positioned, in order to affix the outer circumference portion of the bead glass 23 to the inner circumference face of the glass tube 46 that corresponds to the heated portion. Only one portion of the outer circumference of the bead glass 23 is affixed in order to preserve airflow in the tube axis direction of the glass tube 46. Note that the heating temperature is approximately 900[° C.] on the outer circumference surface of the glass tube 46.

Next, after inserting the electrode unit 38 including the electrode 28 and the bead glass 21 into the glass tube 46 from the opposite side, the outer circumference portion of the glass tube 46 where the bead glass 21 is positioned is heated with use of the burner 50, and the glass tube 46 is hermetically sealed (a first seal) (process D). The heating temperature is approximately 1100[° C.] on the outer circumference surface of the glass tube 46. Also, the margin of error from the setting value of the sealing position of the first seal of is, at most, 0.5 [mm].

The insertion position of the electrode unit 37 in process C and the insertion position of the electrode unit 38 in process D are adjusted so that the lengths from both ends of the sealed glass bulb 26 to the respectively extending non-phosphor layer areas are different from each other. The electrode unit 38 on the first sealed portion side is inserted more deeply respective to a position overlapping the phosphor layer 32 area than the electrode unit 37 on the second sealed portion side.

After heating, with use of a burner 52, a portion of the glass tube 46 that is closer to the end than the electrode 30 and forming a constricted portion 46A, a mercury pellet 54 is inserted into the glass tube 46 (process E). The mercury pellet 54 is formed by impregnating mercury into a titanium-tantalum-iron sinter.

Thereafter, gas is discharged from the glass tube 46 and the glass tube 46 is filled with the noble gas (process F). Specifically, the head of a gas exhaust apparatus, not depicted, is attached to the glass tube 46 on the mercury pellet 54 side. After ejecting the gas in the glass tube 46 to create a vacuum, the entire outer surface of the glass tube 46 is heated by a heating apparatus that is not depicted. The heating temperature is approximately 380[° C.] on the outer circumference surface of the glass tube 46. Accordingly, impure gas in the glass tube 46 is discharged, including impure gas that has infiltrated the phosphor layer 32. After heating is stopped, the glass tube 46 is filled with a predetermined amount of noble gas.

After the glass tube 46 has been filled with the noble gas, the mercury pellet 54 side end of the glass tube 46 is heated by a burner 56 and sealed (process G).

Subsequently, as shown in FIG. 4, the mercury pellet 54 is induction-heated by a high-frequency oscillation coil (not depicted) disposed in the surrounding area of the glass tube 46, and the mercury is flushed out of the sinter (mercury ejection process H). Thereafter, the glass tube 46 is heated in a furnace 57, and the flushed-out mercury is moved toward the electrode 28 on the first sealed portion side.

Next, the outer circumference portion of the glass tube 46 corresponding to the position where the bead glass 23 is heated by a burner 58, and the glass tube 46 is hermetically sealed (a second seal) (process I). The heating temperature is approximately 900[° C.] on the outer circumference of the glass tube 46. The margin of error for the setting value of the sealing position of the second seal is 0.5 [mm].

Subsequently, an end of the glass tube 46 that is farther towards the mercury pellet 54 side than the second sealed portion is cut away (process J).

After performing the processes described above, the fluorescent lamps 20 are completed.

4. Manufacturing Method for the Backlight Unit

The following describes particularly a process of detecting the orientation of a lamp with reference to FIG. 5 in the manufacturing process of the backlight unit.

Figure 5A:
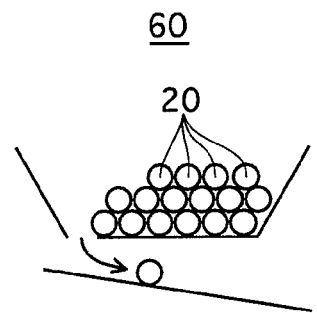
FIG. 5A is a diagrammatic view of a lamp feeder 60.
Figure 5B:
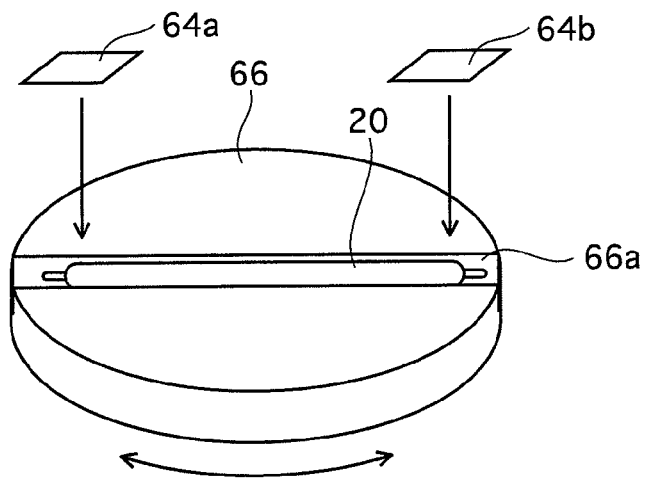
FIG. 5B shows the process of orienting the lamp.
Figure 5C:
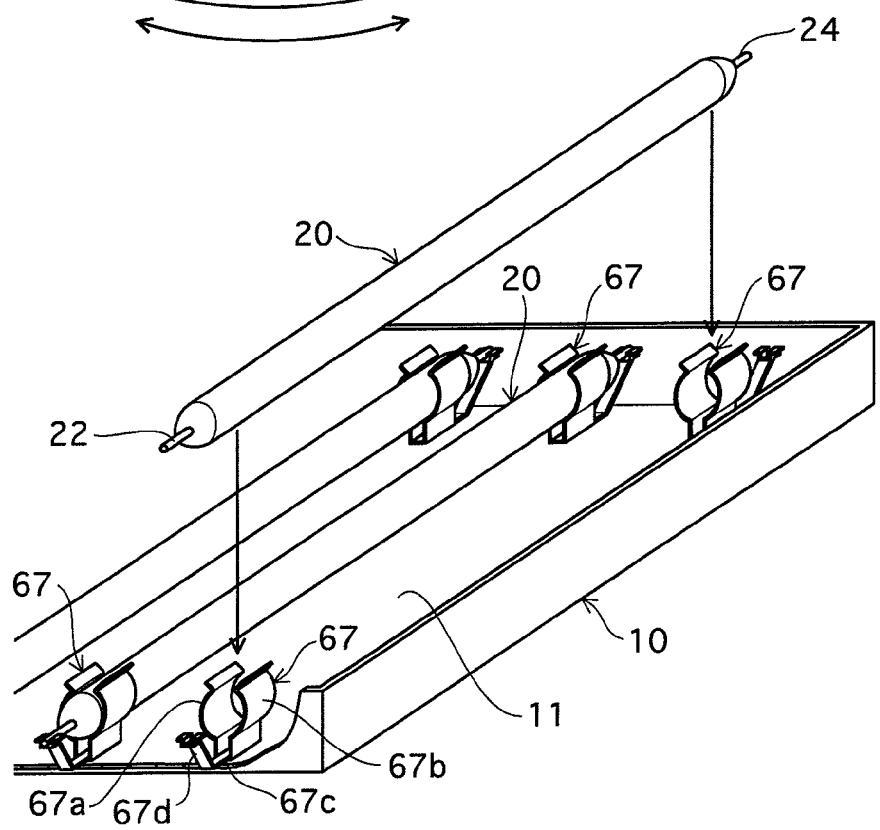
FIG. 5C shows a process of installing the lamp in a housing 10.

FIG. 5A is a diagrammatic view of a lamp feeder 60. FIG. 5B shows the process of orienting the lamp. FIG. 5C shows the process of installing the lamp in the housing 10.

The lamp feeder 60 is an apparatus for supplying the lamps 20 to a table 66 one at a time.

The table 66 includes a groove 66a in which one of the lamps 20 is disposed, and has a mechanism for rotating the table 66 360° in the direction indicated by the arrow.

The lamp 20 is disposed in the groove 66a, and sensors 64a and 64b have been disposed above positions corresponding to both ends of the lamp 20. A sensor may be disposed on only one side of the lamp 20.

The sensors 64a and 64b are, for example, image sensors that are a type of optical sensor, and detect the orientation of the lamp 20 by detecting a2 and a1 described above.

The lamp 20 is oriented by rotating the table 66 in accordance with an orientation, in the lengthwise direction of the lamp 20, that was detected by the sensors 64a and 64b.

The oriented lamp 20 is held by a gripping member that is not depicted gripping the lead wire 22(24), and fitted into a socket 67 so as to have an opposite lengthwise orientation from adjacent ones of the lamps 20.

As shown in FIG. 5C, sockets 67 have been disposed as a set in positions corresponding with mounting positions of the lamps 20 on a reflective plate 11 of the housing 10.

The sockets 67 are electrically conductive, and have been formed from folded sheets of, for example, stainless steel or phosphor bronze. The sockets 67 include gripping plates 67a and 67b, a clutch 67c that clutches the gripping plates 67a and 67b on the bottom ends thereof, and a connecting plate 67d that projects from the clutch 67c.

Concave portions conforming to the outer diameter of the lamp 20 are provided in the gripping plates 67a and 67b.

The connecting plate 67d extends from the clutch 67c in an outward direction from the housing 10, then extends diagonally to a predetermined height, and further extends in an outward direction of the housing 10. A free end of the connecting plate 67d forms, for example, a V-shape that conforms to the outer diameter of the lead wire.

The lamps 20 are held in the sockets 67 by the spring action of the gripping plates 67a and 67b into whose concave portions the ends of the lamps 20 have been fit. At the same time, the lead wires 22 and 24 are connected both physically and electrically to the connecting plates 67d by the spring action of the concave portions of the free ends of the connecting plates 67d into which the lead wires 22 and 24 of the lamps 20 have been fit.

5. Variations

Variation 1

To improve the precision of orientation, one or more identifying marks pertaining to an orientation in the lengthwise direction may be printed on the outer circumference of the glass bulb 26 in an area outside the phosphor layer 32 area. The following describes such a case as variation 1 of embodiment 1.

Figure 6A:
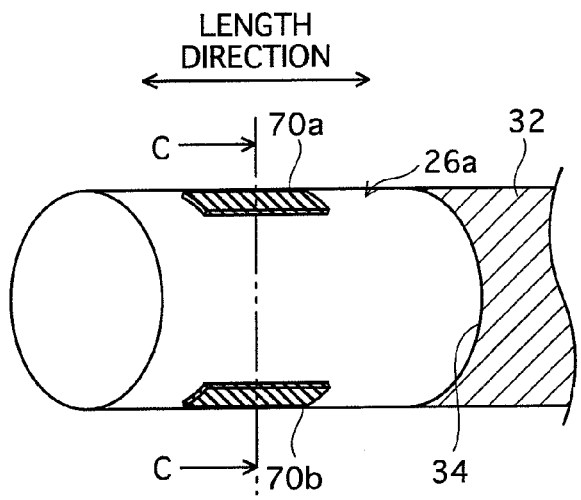
FIGS. 6A and 6B show a glass bulb 26a pertaining to variation 1 of embodiment 1, FIG. 6A being a pattern diagram of the glass bulb 26a on which identifying marks have been printed, and FIG. 6B showing a cross section taken along line C-C of FIG. 6A.
Figure 6B:
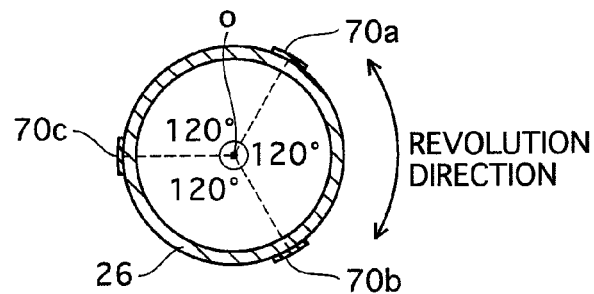

FIG. 6A shows a glass bulb 26a on which identifying marks have been printed, and FIG. 6B shows a cross section taken along line C-C of FIG. 6A.

Three identifying marks 70a, 70b, and 70c have been formed on the outer circumference of an end area of the glass bulb 26a.

The identifying marks 70a, 70b, and 70c are in substantially equivalent positions to each other in the lengthwise direction of the glass bulb 26a.

Note that the identifying marks 70a, 70b, and 70c are preferably formed on an outer circumference end area on the second sealed portion side whose non-phosphor layer area is longer than the first sealed portion side.

The identifying marks 70a to 70c are formed by, for example, screen-printing. Note that gravure printing or inkjet printing may be used in place of screen-printing.

In this way, using the glass bulb 26a on which the identifying marks 70a to 70c have been formed enables detecting an orientation in the lengthwise direction, for example by detecting a distance from the boundary 34 to the identifying marks 70a to 70c.

Also, when viewing a transverse section of the glass bulb 26a, central portions (main sections) of the identifying marks 70a to 70c are positioned at substantially 120[°] intervals from the center O of the glass bulb 26b. In this way, since the identifying marks 70a to 70c are positioned in such a way that a site targeted for measurement is visible regardless of the revolution direction (rotational direction) of the glass bulb 26a, one of the identifying marks 70a to 70c can be reliably detected from one direction with use of a sensor.

Note that printed characters may be used as the identifying marks 70a to 70c. The characters may be printed in the lengthwise direction of the glass bulb 26a or in the revolution direction of the glass bulb 26a. Also, lot numbers may be printed as the characters.

Variation 2

Also, a portion of the phosphor layer on the inner circumference (inner face) of the glass bulb 26a may be retained separately, and the retained portion may be used as the identifying mark of lengthwise direction orientation. The following describes such a case as variation 2 of the fluorescent lamp pertaining to embodiment 1.

Figure 7:
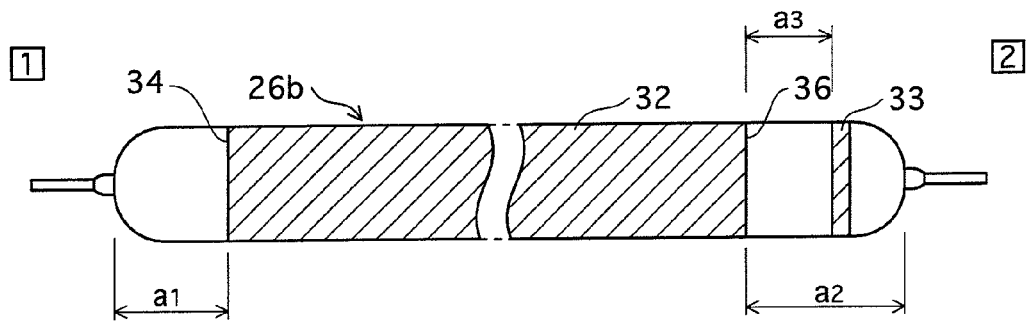
FIG. 7 shows a glass bulb 26b pertaining to variation 2 of embodiment 1.

As shown in FIG. 7, a phosphor layer 33 that is separate from the phosphor layer 32 has been formed on the second sealed portion side of the glass bulb 26b. Due to being in a position outside the discharge area between the electrodes 28 and 30, the phosphor layer 33 is a phosphor layer that does not substantially contribute to luminance.

In the present variation, for example, distance a3 from the boundary 36 to the phosphor layer 33 can be used for detection. Also, since the identifying mark is the phosphor layer, luminance caused by ultraviolet irradiation can be used for detection, and a sensor having a simple structure can be used.

Variation 3

Even when identifying marks are not separately applied to the glass bulb 26, orientation detection in the lengthwise direction can be realized by modifying the structural members originally provided in the lamps. The following describes such a case as variation 3 of embodiment 1.

Figure 8A:
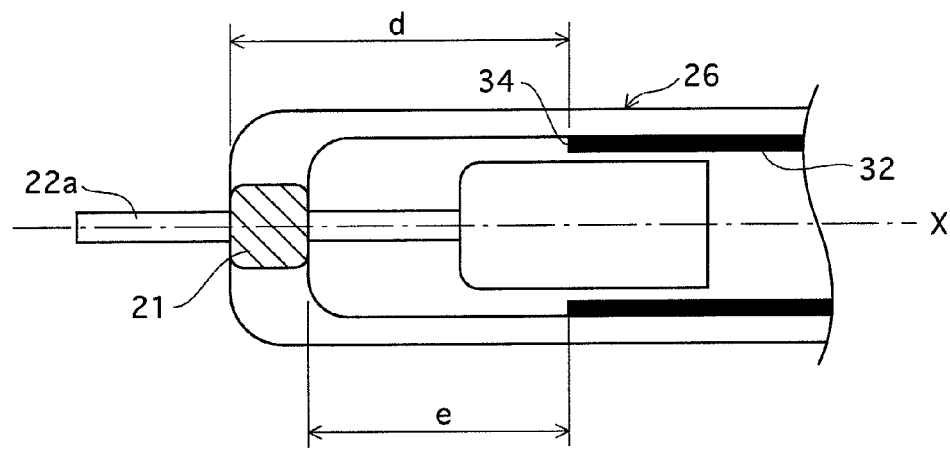
FIGS. 8A, 8B, and 8C show a glass bulb 26 pertaining to variation 3 of embodiment 1.
Figure 8B:
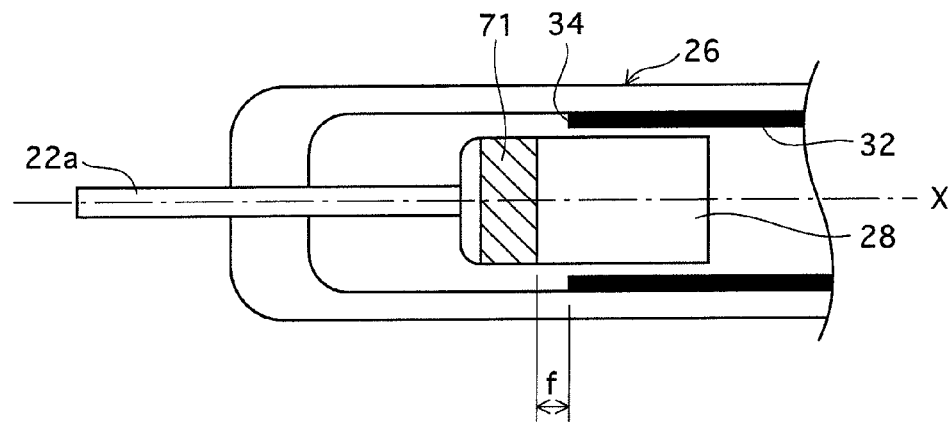
Figure 8C:
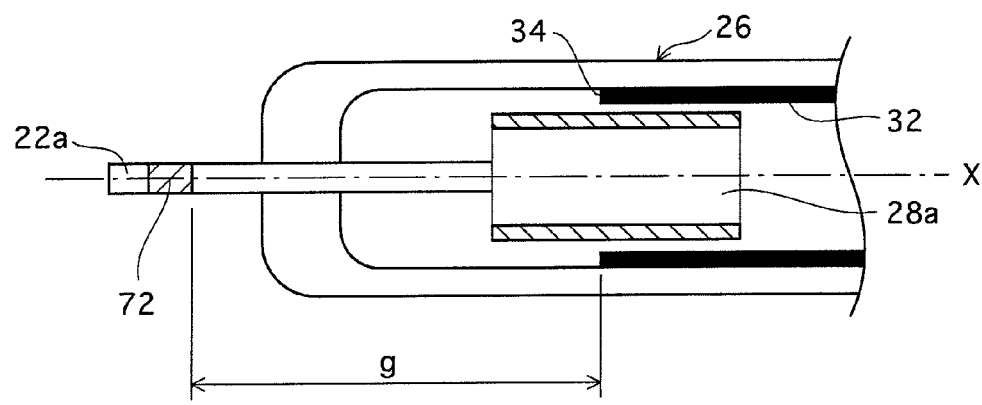

FIGS. 8A, 8B, and 8C are pattern diagrams showing a schematic structure of the glass bulb 26 pertaining to variation 3. FIG. 8A shows the exterior of the electrode 28, a bead glass, and a lead wire. FIG. 8B is a sectional view including the tube axis X of the glass bulb 26 and the phosphor layer 32, showing the exteriors of the lead wire 22a and the electrode 28. Also, FIG. 8C shows a section including the tube axis X in order to illustrate the shape of the electrode 28. Note that in FIGS. 8A, 8B, and 8C, similar structural elements to FIG. 2 have been given the same reference notations, and description thereof is omitted.

In the example of FIG. 8A, coloring is provided on the bead glass 21 for orientation detection (hatching in the drawing indicates coloration).

In such a case, distance d from the boundary 34 to the far end of the bead glass 21 and distance e from the boundary 34 to the near end of the bead glass 21 can be used for detection. Since more fade-resistant and vividly colored marks can be made on the bead glass 21 than on the outer circumference of the glass bulb 26, coloring the bead glass 21 enables improving sensor precision.

In the example of FIG. 8B, an identifying mark 71 has been applied to the lower center of the revolution direction of the cylinder-shaped electrode 28. In this example, distance f from the boundary 34 to the ring-shaped mark 71 can be used for detection. Since the identifying mark 71 can be detected from any direction regardless of the revolution direction of the glass bulb 26, the sensing equipment can be simplified.

In the example of FIG. 8C, the electrode 28a has an open-ended tube shape, unlike the bottomed-tube shape of the electrode 28. In this way, the shapes of electrodes that can be used are not limited to being a bottomed-tube shape, and can also be a tube or rod shape.

The electrode 28a has been secured by caulking the head of the lead wire 22a to the open ends of the electrode 28a.

Also, an identifying mark 72 has been applied in the revolution direction of the lead wire 22a. In this example, distance g from the boundary 34 to the identifying mark 72 can be used for detection. Similarly to the identifying mark 71, the identifying mark 72 can also be detected from any direction regardless of the revolution direction of the glass bulb 26.

Variation 4

Determining a position in the lengthwise direction of the lamp is also possible by forming a large diameter portion on both ends of the lamp. The following describes such a case as variation 4 of embodiment 1.

Figures 9A, 9B, 9C:
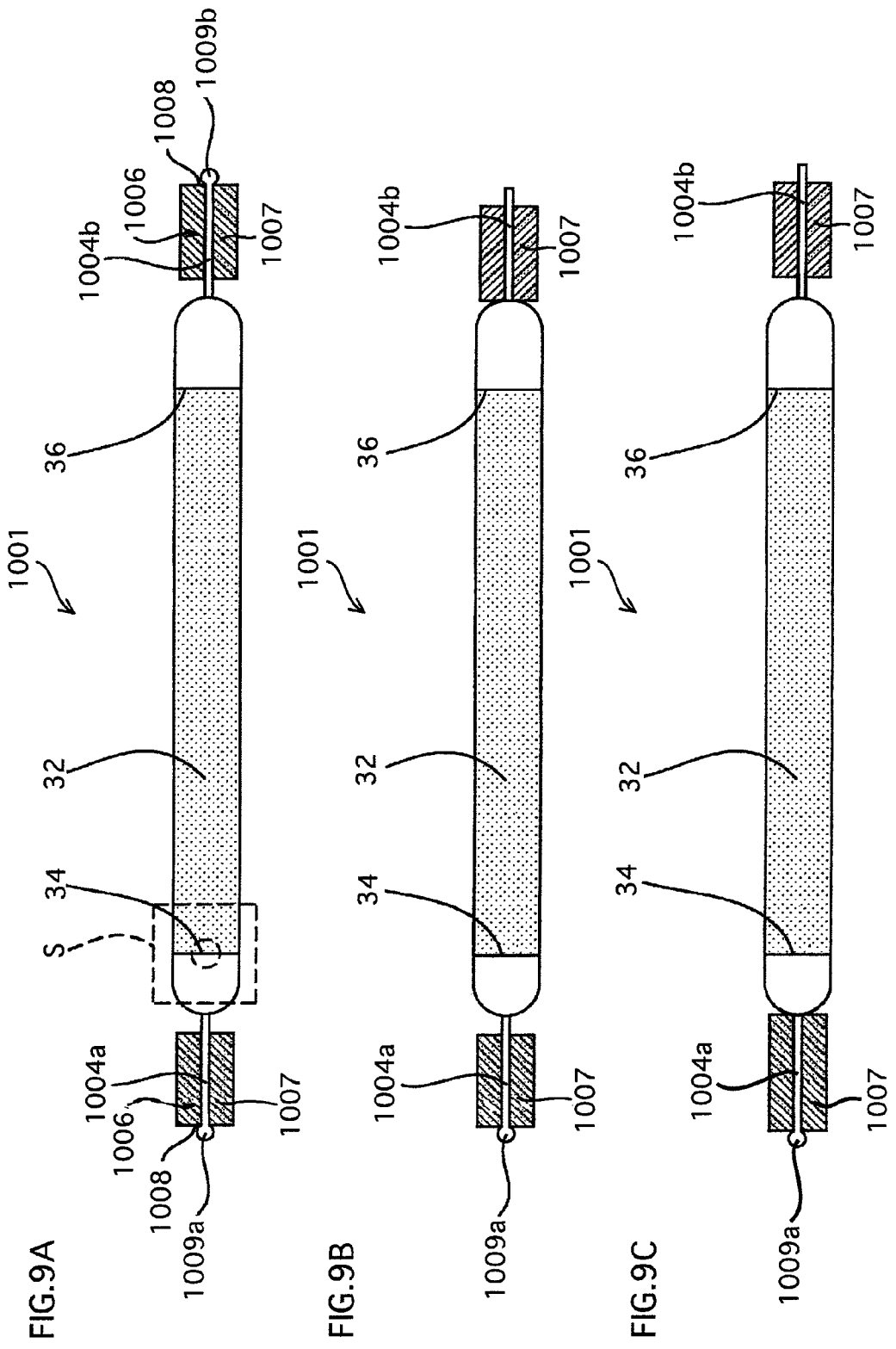
FIGS. 9A, 9B and 9C are top plan views of a cold cathode fluorescent lamp pertaining to variation 4 of embodiment 1.

As shown in FIG. 9A, large diameter portions 1009a and 1009b have been formed on ends of lead wires 1004a and 1004b in the fluorescent lamp 1001 pertaining to variation 4. The large diameter portions 1009a and 1009b have been formed by heat-welding the ends of the lead wires 1004a and 1004b and forming them into ball shapes. Note that the large diameter portions 1009a and 1009b may be formed by melting the ends of the lead wires 1004a and 1004b after precutting the ends of the lead wires 1004a and 1004b to lengths that take into account the formation of the large diameter portions 1009a and 1009b, or by melting uncut ends of the lead wires 1004a and 1004b.

The lead wires 1004a and 1004b are held by sockets 1006, and the large diameter portions have been disposed at lengths extending farther outward than the sockets 1006.

The sockets 1006 are shown schematically in FIG. 9, and are connected to the lamp when the lead wires 1004a and 1004b are fit into grooves 1007 that have been provided on upper faces of the sockets 1006.

The fluorescent lamp 1001 pertaining to the present variation is positioned in the lengthwise direction by latching the large diameter portions 1009a and 1009b, which protrude farther outward than the sockets 1006, to end faces 1008 of the sockets 1006 that face away from the fluorescent lamp 1001.

The lead wires 1004a and 1004b are set to project the same length from respective ends of the fluorescent lamp 1001, and since large diameter portions 1009a and 1009b have been formed on the ends of the lead wires 1004a and 1004b, end faces 1008 (outward-facing end faces) of the sockets 1006 that hold the lead wires 1004a and 1004b function as a means for determining the position of the lead wires 1004a and 1004b.

Accordingly, positioning not only one lead wire 1004a but also the other lead wire 1004b enables reliably preventing the boundaries 34 and 36 of the phosphor layer 32 from sliding out of position due to errors in mounting the fluorescent lamp 1001, and by observing the boundaries, precisely knowing whether the lead wires 1004a and 1004b (and the fluorescent lamp 1001) are mounted. Accordingly, simply moving a sensor S, which detects the boundary of the phosphor layer 32, across a plurality of the lamps in a direction orthogonal to the axis line to detect the boundary 34 enables reliably knowing the quality of the mounting of the fluorescent lamp 1001, and in case of a defect, correction beforehand.

Also, as shown in FIG. 9B, as a substitute for the large diameter portion 1009b, an end of the socket 1006 on the opposite side from the fluorescent lamp 1001 may be brought into contact with the glass bulb 26 on the lead wire 1004b side of the glass bulb 26, thus improving the stability of the mounting of the fluorescent lamp 1001.

Also, as shown in FIG. 9C, the fluorescent lamp 1001 may be secured by sandwiching the socket 1006 on the side of the lead wire 1004a of the glass bulb 26 between the large diameter portion 1009a and the glass bulb 26. In such a case, the fluorescent lamp 1001 can be positioned in the lengthwise direction on the lead wire 1004a side only.

6. Additional Matter (1) Difference in Length of Non-Phosphor Areas

As described above in embodiment 1, in the manufacturing process of the lamps 20, the margin of error for detecting the liquid level of the phosphor suspension liquid in the glass tube is, at most, ±0.5 [mm], and the margins of error for each of the first and second sealed portions after being sealed are anticipated to be, at most, ±0.5 [mm].

Also, if an image sensor having two million [pixels] is used as the sensor, since one [pixel] can be set to 0.1 [mm], measurement precision can be realized in units of 0.1 [mm].

In view of such factors, the orientation in the lengthwise direction can be reliably detected with use of the sensor, provided that the difference in length between the non-phosphor layer areas on the glass bulb end side and on the other side is greater than or equal to 2 [mm].

Note that if the difference in length between the non-phosphor layer areas on the glass bulb end side and on the other side is greater than or equal to 3 [mm], the orientation in the lengthwise direction can be detected more reliably with use of the sensor. In such a case, the image sensor may have a measurement precision of 0.5 [mm] units. Also, the upper limit of the difference in length is, for example, 8 [mm]. This is because if the difference in length is larger than 8 [mm], there is a long non-phosphor layer area that does not contribute to light emission, and maintaining an effective light emission length is difficult.

(2) Protective Layer

Although the fluorescent lamp described in embodiment 1 does not have a protective layer (protective film) on an inner face of the glass bulb to prevent depletion of mercury, etc., the present invention can also be applied to a fluorescent lamp that has a protective layer.

Specifically, the orientation in the lengthwise direction of the glass bulb can be detected by making a non-protective layer area extending from one end of the glass bulb and a non-protective layer area extending from the other end of different lengths, and detecting the difference in length with use of a sensor. In other words, the material of the layer formed on the inner face of the glass bulb is not limited to being a phosphor layer, and a protective layer can also be used.

(3) Types of Lamp

Although a cold cathode fluorescent lamp is described as an example in embodiment 1, the present invention can also be applied to a hot cathode fluorescent lamp or an external electrode type fluorescent lamp.

The external electrode type fluorescent lamp is a fluorescent lamp that does not have an electrode inside the glass bulb, and has electrodes on the outer circumference of both ends of the glass bulb. When the present invention is applied to the external electrode type fluorescent lamp, it is necessary to use a transparent material for the electrode or to position the electrode so as not to overlap with the phosphor layer, so that the boundary between the phosphor layer area and the non-phosphor layer area can be detected by a sensor.

Embodiment 2

Before describing the structures of embodiments 2 to 5, the background of arriving at the structures is described below.

Figure 19:
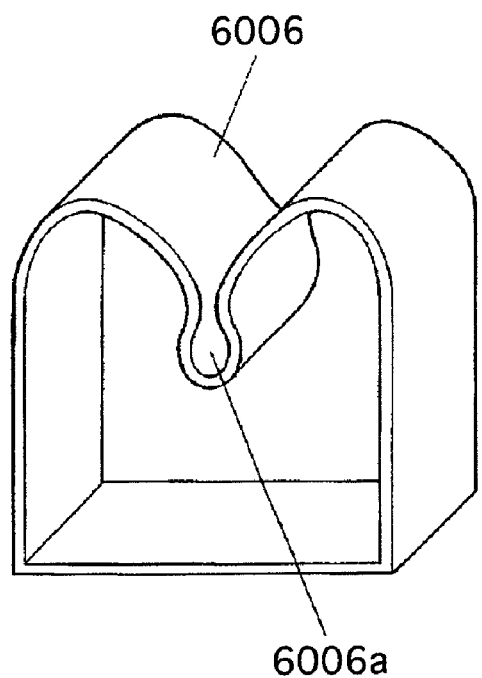
FIG. 19 is a perspective view of the socket for the cold cathode fluorescent lamp.

In recent years, in order to improve production efficiency in response to increased demand for liquid crystal display apparatuses, manufacturers of liquid crystal display apparatuses have been begun to automate insertion of cold cathode fluorescent lamps 6901 in backlight units. In the automatic insertion of the cold cathode fluorescent lamps 6901 shown in FIG. 20, ease of connecting a lead wire 6905 and a socket is important. To such purpose, a socket 6006 as shown in FIG. 19 is used. The socket 6006 is formed from sheets of stainless steel or phosphor bronze, and includes a fitting portion 6006a into which the lead wire 6905 has been fitted. The fitting portion 6006a is elastically deformed so as to be stretched open, and the lead wire 6905 is fit into the fitting portion 6006a. As a result, the lead wire 6905 that has been fitted into the fitting portion 6006a and gripped by the restoring force of the fitting portion 6006a does not readily detach. This structure enables easily fitting the lead wire 6905 into the fitting portion 6006a and preventing detachment thereof.

However, when the lead wire 6905 is fitted into the fitting portion 6006a, force is applied to a portion of the lead wire 6905 that projects from a tube end of a glass bulb 6902, such force including a component substantially perpendicular to the wire axis of the lead wire 6905. Since the fulcrum is an outward base portion 6905 (hereinafter referred to as the base portion 6905b of the lead wire) where the lead wire 6905 is attached to a glass bulb 6902 externally to a sealed portion 6902a, the sealed portion 6902a of the glass bulb 6902 bears the load, and cracks may form.

Figure 20:
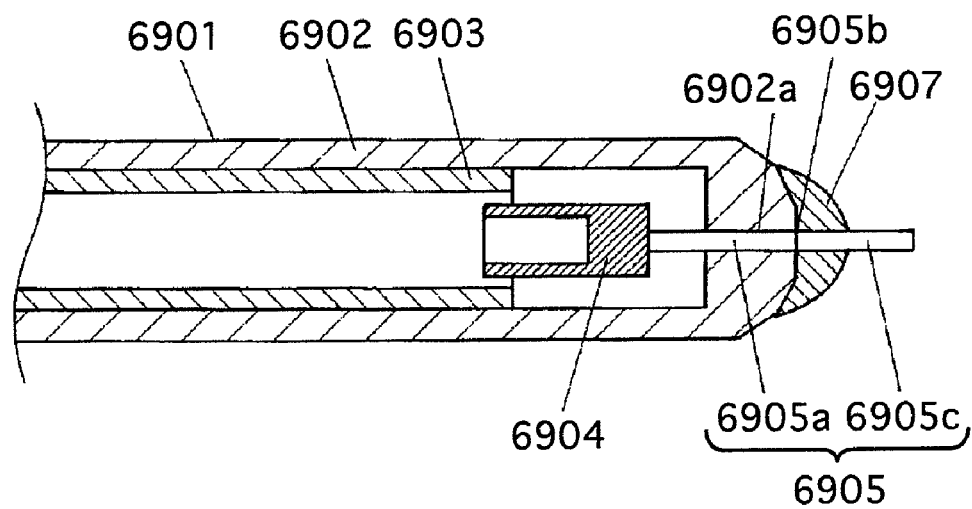
FIG. 20 pertains to conventional technology, and is an enlarged cross-sectional view of a relevant portion of a cold cathode fluorescent lamp that includes a glass tube and a heat-resistant sealing member on an outer side of a sealed portion of a lead wire.

To prevent such cracks from forming, a ceramic or resin heat-resistant sealing member 6907 has been proposed that covers the outside of the sealed portion 6902a as shown in FIG. 20 (for example, see Japanese Patent Application No. H10-112287).

However, cracks may form in the sealed portion 6902a of the glass bulb 6902 even if the ceramic or resin heat-resistant sealing member 6907 covers the outside of the sealing portion 6902a of the glass bulb 6902.

In view of the above problem, a fluorescent lamp is proposed in embodiments 2 to 3 that sufficiently prevents cracks from forming in a sealed portion of a glass bulb, for example when fitting a lead wire in a socket.

Figure 10:
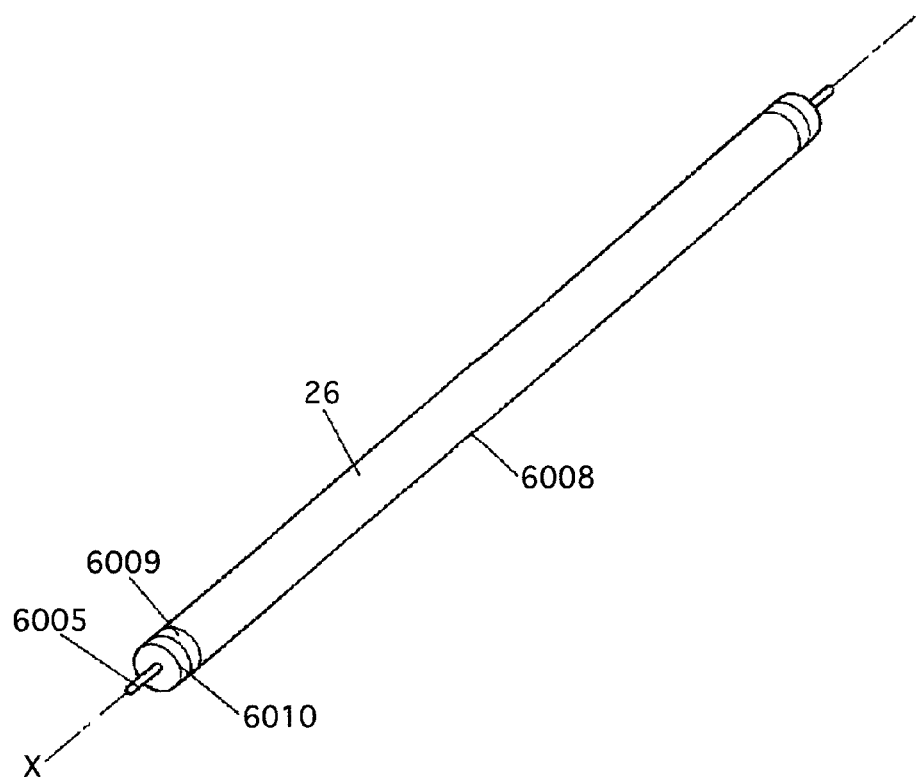
FIG. 10 is a perspective view of a fluorescent lamp pertaining to embodiment 2.
Figure 11:
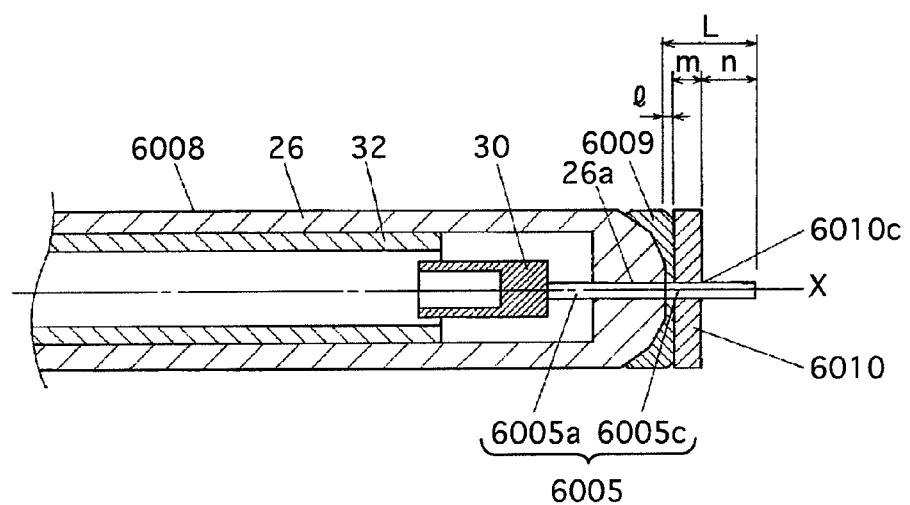
FIG. 11 is an enlarged cross-sectional view of a relevant portion of the lamp of FIG. 10.

The fluorescent lamp of embodiment 2 of the present invention is shown in FIG. 10. An enlarged cross-sectional view of a relevant portion of the lamp of FIG. 10 including the tube axis is shown in FIG. 11. As shown in FIG. 10, the fluorescent lamp pertaining to embodiment 2 is a straight tube shaped cold cathode fluorescent lamp 6008 for use in a backlight (hereinafter called a "lamp 6008"), and includes the glass bulb 26, electrodes (not depicted) provided in the glass bulb 26 on both ends thereof, the lead wire 6005 of which one end is connected to one of the electrodes and the other end extends outside a tube end of the glass bulb 26, and a member 6010 that is attached outside the tube end of the glass bulb 26 via a buffer 6009. Note that similarly to embodiment 1, the lengths of the non-phosphor layer 32 areas on one end of the glass bulb 26 and the other end are different from each other.

The glass bulb 26 is made of borosilicate glass, and a cross section sectioned perpendicular to the tube axis X direction is circular. The total length is 730 [mm], the outer diameter is 4 [mm], the inner diameter is 3 [mm], and the thickness is 0.5 [mm].

The lead wire 6005 includes, for example, a tungsten (W) inner lead wire 6005a and a nickel (Ni) outer lead wire 6005c that bonds easily to solder or the like, and a joint surface between the inner lead wire 6005a and the outer lead wire 6005c is in substantially the same plane as the outer surface of the glass bulb 26. Specifically, one end of the inner lead wire 6005a is electrically and mechanically connected to the bottom of the hollow electrode 30, and most of the other end that is trunked to the outer lead wire 6005c has been sealed to the glass bulb 26. Substantially an entirety of the outer lead wire 6005c is positioned outside the glass bulb 26. A cross section of the inner lead wire 6005a is substantially circular. The total length is 3 [mm] and the wire diameter is 1.0 [mm]. A cross section of the outer lead wire 6005c is substantially circular. The total length L is 10 [mm], and the wire diameter is 0.8 [mm].

Note that the structure of the lead wire 6005 is not limited to the above structure. For example, the inner lead wire 6005a and the outer lead wire 6005c may be structured as one wire that is not separated, or the inner lead wire 6005a or the outer lead wire 6005c may be composed of even more connected lines.

The substantially disc-shaped member 6010 has been mounted on an outer side of the tube end, specifically the end face, via the buffer 6009 that is composed of a heat-resistant elastic adhesive of epoxy resin or the like. The outer lead wire 6005c that projects out of the glass bulb 26 and extends in a straight line therefrom has been fitted in the member 6010. The member 6010 is, for example, formed from nickel (Ni). For example, the outer diameter is 4 [mm], and the thickness m is 5 [mm]. Furthermore, a through hole 6010c having a diameter of 0.8 [mm] is provided in a central portion of the member 6010 for the outer lead wire 6005c to be fitted therein. Here, the member 6010 has less elasticity than the buffer 6009. For example, the elasticity of Ni is approximately 200 [GPa], and the elasticity of a buffer 6009 composed of, for example, a heat-resistant elastic adhesive of epoxy resin is approximately 10 [Mpa]. Note that elasticity here indicates Young's modulus.

When the inner lead wire 6005a and the outer lead wire 6005c have been soldered together by, for example, laser welding, and a ball-shaped joint bulge has formed at the joined portion, the distance between the end of the member 6010 on the glass bulb 26 side and the tube end of the glass bulb 26 is preferably 0.5 [mm]. This is to cause the member 6010 to be securely attached on the outside of the end of the glass bulb 26 via the buffer 6009. Also, a preferable length of the portion of the lead wire 6005 that projects from the member 6010 is 5 [mm]. This is to ensure stability of contact with the socket 6006 (see FIG. 40).

Note that the buffer 6009 and the member 6010 are not limited to the above structures. For example, rubber (elasticity: approximately from 1.5 [MPa] to 5.0 [MPa]), polyethylene (elasticity: approximately 0.7 [GPa]) and the like can be used to form the buffer 6009. Although a highly adhesive material such as elastic adhesive is preferable for the buffer 6009, when adhesiveness is low between the buffer 6009 and the member 6010, joining the member 6010 and the outer lead wire 6005c with use of solder or the like helps affixing the member 6010 to the outer lead wire 6005c. Also, for example, aluminum (elasticity: approximately 70 [GPa]) or copper (elasticity: approximately 130 [GPa]) can be used as the member 6010. Note that the elasticity difference between the buffer 6009 and the member 6010 is preferably greater than or equal to one place value.

As described above, the structure of the fluorescent lamp pertaining to embodiment 2 enables preventing cracks from forming in the sealed portion 26a of the glass bulb 26, even if force including a component substantially perpendicular to the wire axis of the lead wire 6005 is applied thereto, for example when fitting the lead wire 6005 into the socket 6 or due to the shock of transfer after incorporating the lamps 6008 into the backlight unit. Specifically, since the fulcrum of the force exerted on the lead wire 6005 is the place where the lead wire 6005 and the member 6010 have been joined, the force is only transferred to the sealed portion 26a of the glass bulb 26 via the buffer 6009, thus enabling reducing the load on the sealed portion 26a.

As an aside, similarly to embodiment 1, a first sealed section side and a second sealed section side of the lamps 6008 can be distinguished by appropriately marking one or both of the members 6010, or changing the color of at least one portion of the members 6010.

Figure 12A:
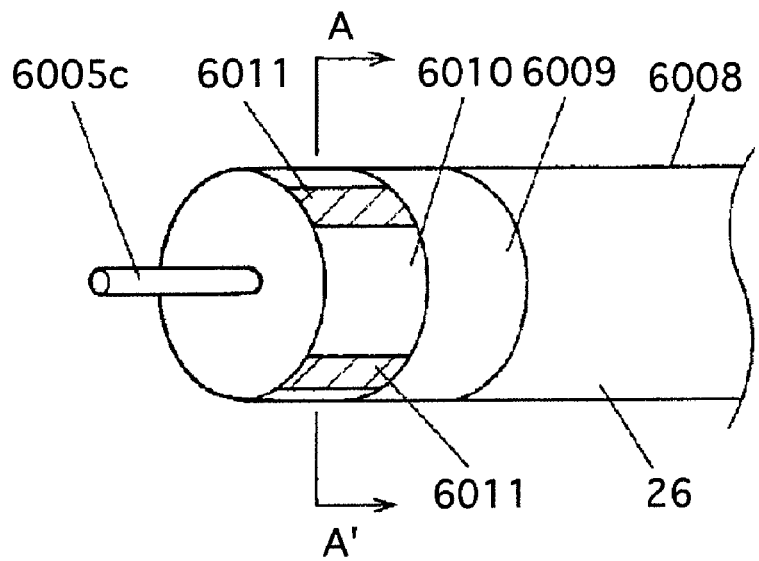
FIG. 12A is a perspective view of the fluorescent lamp of FIG. 10 on a member of which marking has been performed.
Figure 12B:
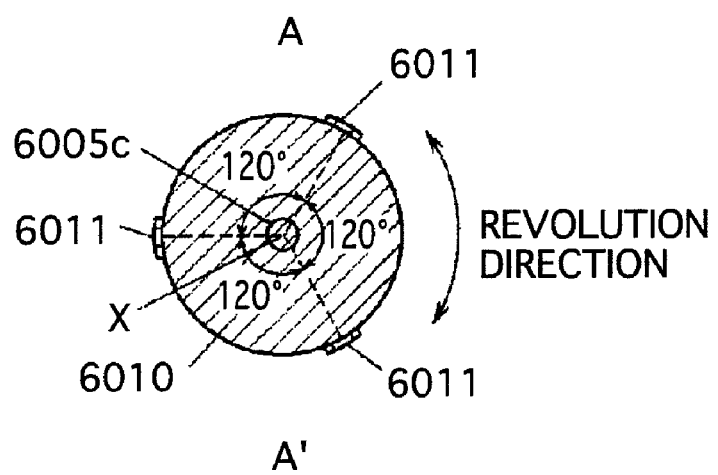
FIG. 12B shows a cross section taken along A-A' of FIG. 12A.

FIG. 12 shows an example of marking a side face of the member 6010 in the revolution direction. FIG. 12A is a perspective view of one end of the lamp 6008, and FIG. 12B shows a cross section taken along A-A'.

Also, when the difference in length of the members 6010 in the tube axis X direction is greater than or equal to 2 [mm], the orientation of the lamps 6008 can be detected by the difference in length.

Also, making the members 6010 at least partially different in color from each other and using a sensor to detect the difference in color enables increasing the reliability of detection over a case of detecting the mark 6011 with use of a sensor as described above.

Furthermore, detecting the manufacturer of a lamp is also possible when a lot number, manufacturing number or the like has been marked on the member 6010 on an end face on the opposite side from the glass bulb 26, or on a side face in the revolution direction.

Embodiment 3

Figure 13:
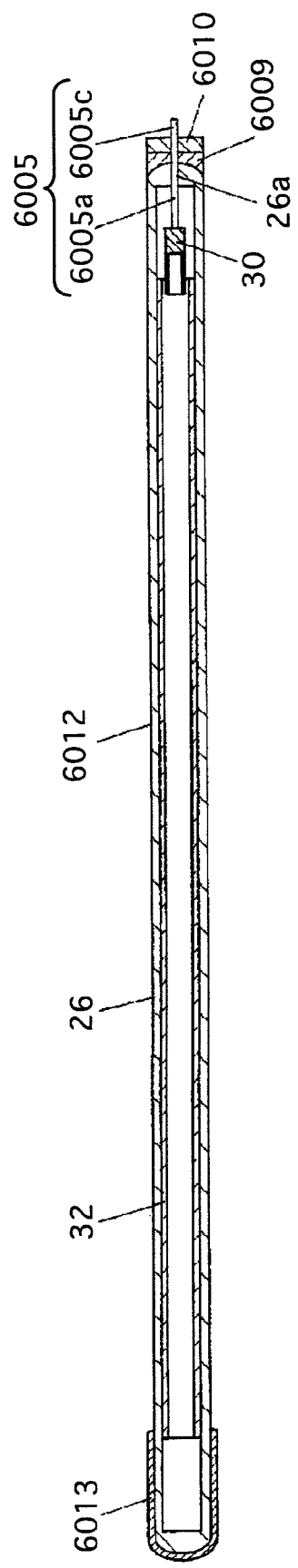
FIG. 13 is a cross-sectional front view of a fluorescent lamp pertaining to embodiment 3.

FIG. 13 is a cross-sectional view of a fluorescent lamp of embodiment 3 of the present invention including a tube axis thereof. A fluorescent lamp 6012 pertaining to the present embodiment is an external/internal electrode type fluorescent lamp (hereinafter referred to simply as "lamp 6012") that has been formed to combine the benefits of both a cold cathode fluorescent lamp and an external electrode-type fluorescent lamp. An external electrode 6013 has been formed on an end of the lamp 6012, and an internal electrode 30 similar to the electrode 30 of the fluorescent lamp pertaining to embodiment 2 has been disposed on the other end. Otherwise, the lamp 6012 has the same structure as the fluorescent lamp of embodiment 2. Also, similarly to embodiment 1, the lengths of the non-phosphor layer 32 areas are different on one end and on the other end of the glass bulb 26. Accordingly, in the following description of the external electrode 6013, members that are the same as in lamps 20 (see FIG. 2) have been given the same reference notations, and description thereof is omitted.

The external electrode 6013 is composed of, for example, aluminum leaf, and has been adhered to the glass bulb 26, with use of an electrically conductive adhesive formed by mixing a metallic powder with silicon resin (not depicted), so as to cover the outer circumference face of the end of the glass bulb 26. Note that fluoride resin, polyimide resin, epoxy resin or the like may be used instead of silicon resin in the electrically conductive adhesive. Also, the external electrode 6013 may be formed by ultrasonically dipping the solder.

Also, instead of being formed of aluminum leaf adhered to the glass bulb 26 with use of an electrically conductive adhesive, the external electrode 6013 may be formed by applying a silver paste to an entirety of the electrode forming portion of the glass bulb 26, or by covering the tube end of the glass bulb 26 with a metal base.

Also, although not depicted in FIG. 13, a protective film formed from, for example, yttrium oxide ($Y_2O_3$) may be provided on a portion of the inner face of the glass bulb that is opposite from the external electrode 6013. Providing the protective film enables preventing glass chipping and pinholes forming in the opposing portion of the glass bulb 26 due to bombardment by mercury ions.

Note that the protective film is not limited to the structure described above. For example, a metal oxide such as silica ($SiO_2$) or alumina ($Al_2O_3$) may be used. In particular, when the protective film is formed from yttrium oxide or silica, mercury does not readily adhere to the protective film, and mercury consumption is slight.

Also, the protective film is not an essential constituent element in the present invention, and forming the protective film is not necessary. Also, instead of being formed only on the portion of the inner face of the glass bulb 26 that opposes the external electrode, the protective film may be formed across the entirety of the inner face of the glass bulb 26.

As described above, the fluorescent lamp structure pertaining to embodiment 3 enables preventing cracks from forming in the sealed portion 26a of the glass bulb 26 even if force including a component substantially perpendicular to the wire axis of the lead wire 6005 is applied, for example when fitting the lead wire 6005 into the socket 6, or due to the shock of transfer after incorporating the lamps 6012 into the backlight unit. Specifically, since the fulcrum of the force exerted on the lead wire 6005 is the place where the lead wire 6005 and the member 6010 have been joined, the force is only transferred to the sealed portion 26a of the glass bulb 26 via the buffer 6009, thus enabling reducing the load on the sealed portion 26a.

Variations of Embodiments 2 to 3

Although described based on specific examples indicated in embodiments 2 to 3 described above, the present invention is of course not limited to the specific examples indicated in such embodiments. Variations such as the following are also included in the present invention.

1. Variation 1

Figure 14:
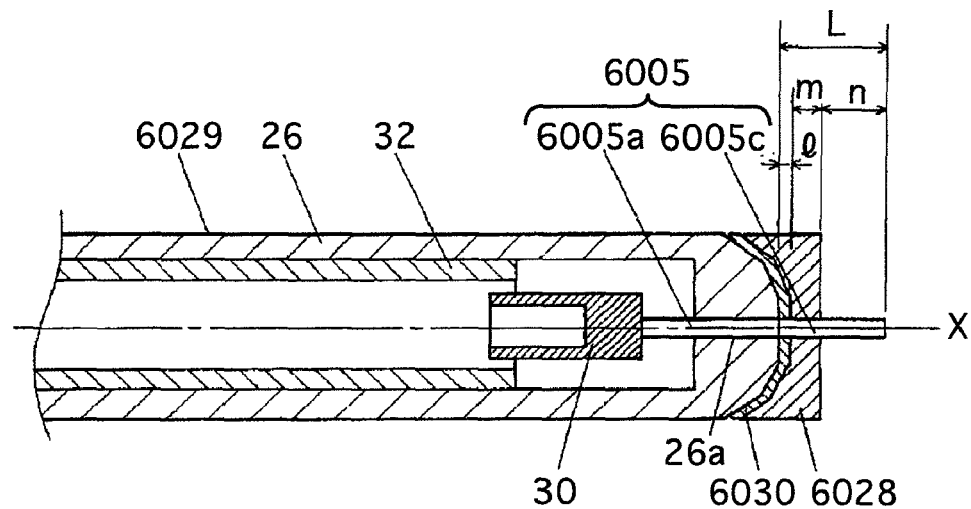
FIG. 14 is an enlarged cross-sectional view of a relevant portion pertaining to variation 1 of embodiments 2 to 3.

As one working example, the face of a member 6028 may have a concave shape on the glass bulb 26 side, as shown in FIG. 14. In such a case, the area of the end face of the glass bulb 26 side of the member 6028 is larger than when the face is substantially planar, thus enabling greater diffusion of force on the member 6028 that is transmitted from the member 6028 to the tube end of the glass bulb 26 when fitting the lead wire 6005 of the fluorescent lamp 6029 into the socket 6006, and further reducing the risk of cracks in the sealed portion 26a of the glass bulb 26. Also, since the tube end of the glass bulb 26 normally has a rounded shape, this structure enables fixing the member 6028 more securely than when the member 6028 has a planar end face on the glass bulb 26 side. Furthermore, using a resin-based adhesive for a buffer 6030 enables forming the resin-based adhesive in a thinner layer and improving adhesion between the member 6028 and the glass bulb 26.

2. Variation 2

Figure 15:
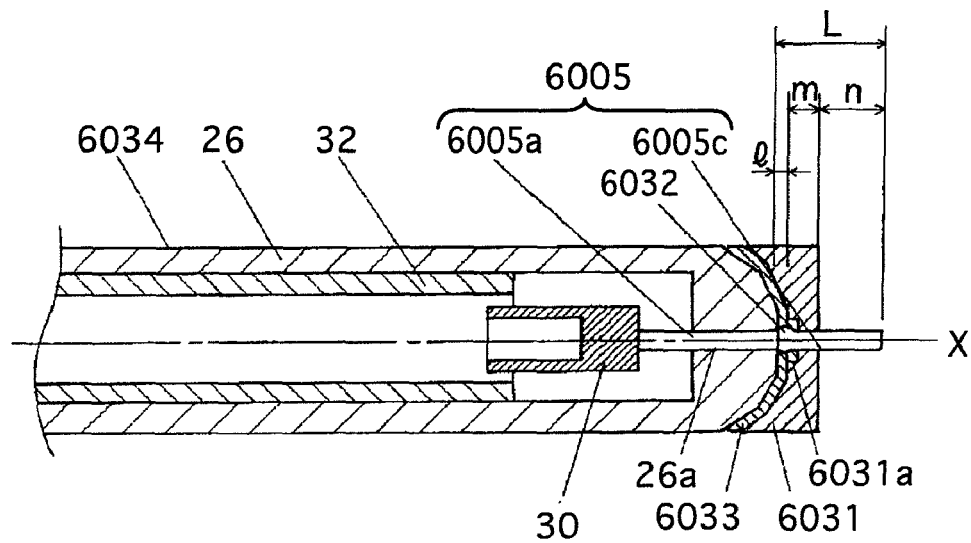
FIG. 15 is an enlarged cross-sectional view of a relevant portion pertaining to variation 2 of embodiments 2 to 3.

Also, as another working example, a concave part 6031a may be formed on a portion of the face of the member 6031 on the glass bulb 26 side, into which the lead wire 6005 has been fitting as shown in FIG. 15. Generally speaking, the inner lead wire 6005a and the outer lead wire 6005c have been joined by laser welding for example, and a ball-shaped joint bulge 6032 has formed at the joined portion. In view of this, as shown in FIG. 15, forming the concave part 6031a in the member 6031 enables fitting the joint bulge 6032 into the concave part 6031a and applying the buffer 6033 more thinly when elastic adhesive is used as the buffer 6033, thereby improving adhesiveness between the member 6031 and the glass bulb 26.

3. Variation 3

Figure 16:
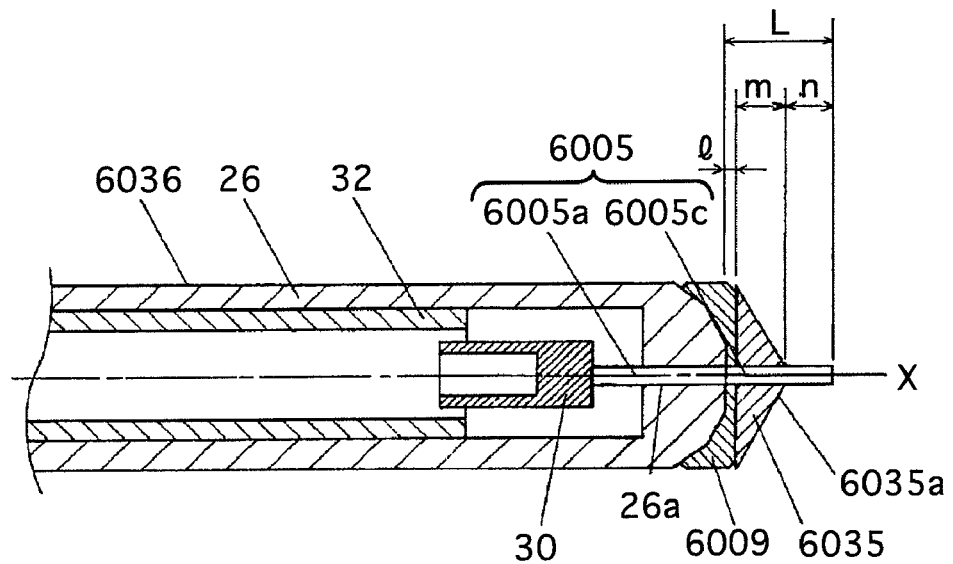
FIG. 16 is an enlarged cross-sectional view of a relevant portion pertaining to variation 3 of embodiments 2 to 3.

Also, as another working example, the member 6035 may be substantially conical in shape, and may be mounted to the glass bulb 26 in such a way that an incline 6035a is on the opposite side from the glass bulb 26, as shown in FIG. 16. This structure enables enlarging the marked area without increasing the measurements of the member 6035, and by marking the incline 6035a, increases detectability of the identifying marks. Also, when the member 6035 is formed of metal, for example, an excessive increase of heat dissipation effect can be suppressed more than when the member 6035 has a disc shape having a same thickness in the tube axis X direction, mercury quasi-clustering in the vicinity of the electrode 30 can be prevented from occurring due to a temperature drop in the vicinity of the electrode 30, and the life of the fluorescent lamps 6036 can be prolonged.

4. Variation 4

Figure 17:
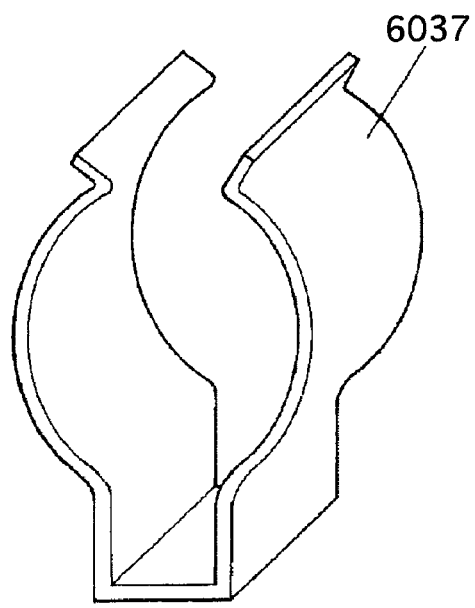
FIG. 17 is a perspective view of a socket for an external electrode type fluorescent lamp.

Also, as another working example, forming a member 6039 (see FIG. 18) from a conductive material and electrically connecting the outer lead wire 6005c to the member 6039 with use of solder, etc. enables fitting into an external electrode type fluorescent lamp socket 6037 as shown in FIG. 17. Also, when the electrically conductive material is metal, depending on the size thereof, an excessive rise in temperature of the electrode 30 can be suppressed due to the heat dissipation effect. FIGS. 18A, 18B, 18C, and 18D show the mounting conditions of a fluorescent lamp 6038 in the sockets 6006 and 6037. FIG. 18A is a front view showing the cold cathode fluorescent lamp 6038 being installed in the external electrode socket 6037, and FIG. 18B shows a side view of the socket. Also, FIG. 18C is a front view of the cold cathode fluorescent lamp 6038 being inserted into the cold cathode fluorescent lamp socket 6006 (see FIG. 40), and FIG. 18D shows a side view of the socket. As shown in FIGS. 18A to 18D, the fact that the member 6039 is conductive enables providing fluorescent lamps 6038 that are compatible with different types of sockets 6006 and 6037 for cold cathode fluorescent lamps and external electrode type fluorescent lamps.

Embodiment 4

Embodiments 4 to 9 provide a supportable fluorescent lamp that suppresses the load on the glass bulb ends and employs a sealing method that permits an electrical connection.

Before describing the structure of embodiment 4, the background of arriving at the structures is described below.

Conventionally, fluorescent lamps used in backlights for liquid crystal display apparatuses, etc. have been becoming more and more compact in response to the demand for compactness in liquid crystal display apparatuses, etc.

Conventional compact fluorescent lamps for backlights employ a so-called bead glass sealing technique in which the glass bulb ends that are constituent elements of the lamps are sealed during the manufacturing process with use of a cylindrical bead glass. A discharge lamp is supported in the lighting position of the housing by a lead-in wire projecting externally to the glass bulb from the bead sealed end, thereby electrically connecting the discharge lamp and the housing (see Japanese Patent Application 2005-183011 and Japanese Patent Application 2005-294019). Power is supplied to an electrode in the discharge lamp and the discharge lamp is lit through this lead-in wire.

Also, there is a fluorescent lamp in which a base of a bottomed cylinder is disposed so as to cover the so-called bead glass sealed end (see Japanese Patent No. 3462306, Japanese Utility Model Application No. S64-48851, and Japanese Patent Application Publication No. H07-262910), the lamp is supported in the housing by the base, and is electrically connected to an electrical contact on the housing side.

In recent years, even in liquid crystal display apparatuses, there is a demand for larger liquid crystal monitors for personal computers, liquid crystal television receivers, etc., and in response to this demand, there is also a demand for large-size, large-diameter fluorescent lamps for backlights.

The sealing process for a large-diameter glass bulb, in response to the demand for large size described above, requires newly preparing a large-diameter bead glass when bead glass sealing is employed. In addition to the difficulty of manufacturing a bead glass with a large outer diameter and a small inner diameter, bead glasses must also be prepared to have different measurements according to the variations of glass bead diameter, leading to higher cost. Therefore, the inventor is considering using so-called pinch sealing in place of bead sealing in the glass bulb sealing process.

Pinch sealing is well suited for sealing the above-described large-diameter bulb since a bead glass is not required.

However, when pinch sealing is employed on a fluorescent lamp for a backlight, after pinch-sealing the lead-in wire, it is necessary to seal the glass bulb end to a gas exhaust tube, the gas exhaust tube being a tube for supplying gas to, and discharging gas from, the glass bulb under normal pressure, and since a site where the lead-in wire can be disposed is smaller than when bead sealing is used, a thinner lead-in wire is necessary, thus increasing the risk of the lead-in wire bending or breaking, and being unable to support the discharge lamp.

In the pinch-sealing technique, the glass bulb end is covered by the base and pinch sealed, and the fluorescent lamp is supported by the base and electrically connected to the electrical contact on the housing side. Therefore, processing strain on the end is greater than in the bead sealing technique. When the end that experiences great processing strain is covered by the base, cracks develop along the end due to stress caused by differences in temperature in the base and the glass bulb end depending on whether the lamp is lit or unlit. There is a risk of a hindrance to lighting the lamp due to the discharge gas, which had been sealed inside the interior of the glass bulb, leaking from the cracked places.

Embodiment 4 was achieved in view of the above problem, and provides a fluorescent lamp that suppresses the load on the glass bulb end while being supported and electrically connected, and a lighting apparatus that includes such a fluorescent lamp.

The following describes a cold cathode fluorescent lamp and backlight unit (lighting apparatus) pertaining to embodiment 4 with use of the drawings. The present embodiment describes an example of a cold cathode fluorescent lamp as the fluorescent lamp.

1. Structure of Direct Type Backlight Unit

Since the structure of a direct type backlight unit 2005 pertaining to the present embodiment is basically similar to the structure of the backlight unit 1 shown in FIG. 1, description of the overall structure thereof has been omitted.

FIG. 21 is a perspective view of a relevant portion of the backlight unit 2005. On a bottom wall 11$a$ of an inner face 11 of the housing 10, a socket 2084 has been provided in a position corresponding to a peripheral area of the optical sheet 16, and bases 2072 of a cold cathode fluorescent lamp 2007 have been fitted into respective sockets 2084 so as to be held by, and electrically connected to, the sockets 2084.

2. Structure of the Cold Cathode Fluorescent Lamp

Figure 22A:
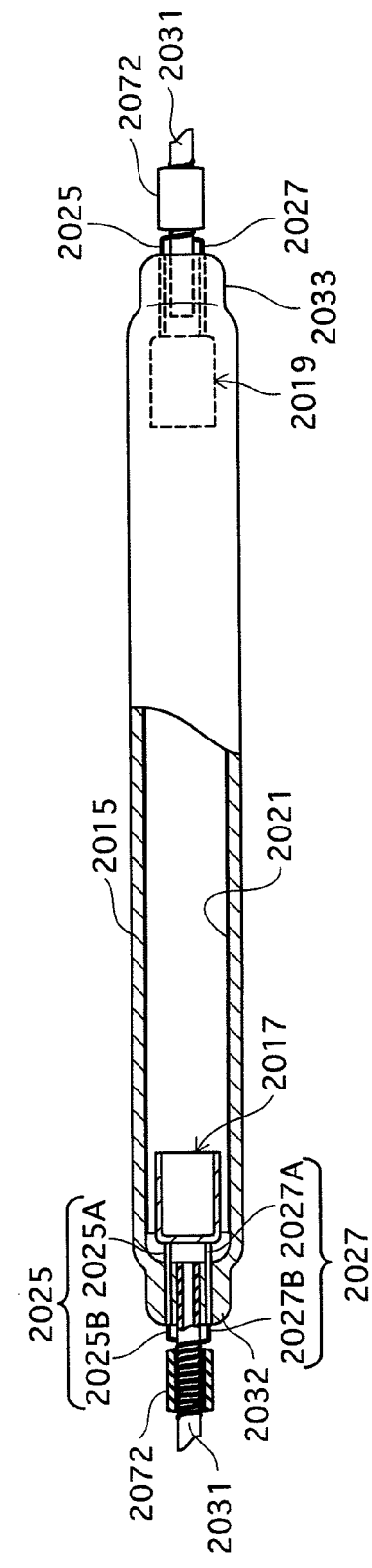
FIGS. 22A and 22B are enlarged views of relevant portions of a cold cathode fluorescent lamp pertaining to embodiment 4.
Figure 22B:
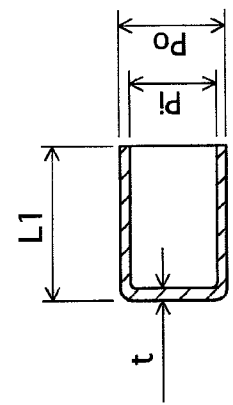

Next, the structure of the cold cathode lamp 2007 pertaining to the present embodiment (hereinafter simply referred to as "the lamp 2007") is described with reference to FIG. 22. FIG. 22A shows the overall structure of the cold cathode fluorescent lamp 2007 with one portion cut away. FIG. 22B shows a cross section of the electrodes 2017 and 2019.

The lamp 2007 includes a glass bulb (glass container) 2015 that has a straight tube shape whose cross section is substantially circular. For example, the glass bulb 2015 has a 6.0 [mm] outer diameter and a 5.0 [mm] inner diameter, and is made from soda glass or borosilicate glass. In the present embodiment, soda glass is used. The measurements of the lamp 2007 described below are values corresponding to the measurements of the glass bulb 2015 that has a 6.0 [mm] outer diameter and a 5.0 [mm] inner diameter. Needless to say, these values are an example and should not be construed as limiting the embodiment.

Mercury in the glass bulb 2015 occupies a predetermined ratio of the cubic capacity of the glass bulb 2015, for example, such that the glass bulb 2015 is filled to 0.6 [mg/cc], and the glass bulb 2015 is filled to a predetermined filling pressure, for example 20 [Torr] (20×133.32 [Pa]), with a noble gas such as argon or neon. Note that argon gas is used as the noble gas mentioned above.

Also, a phosphor layer 2021 has been formed on an inner face of the glass bulb 2015. The phosphor layer 2021 includes red phosphor, green phosphor, and blue phosphor that convert ultraviolet radiation emitted from the mercury into red, green, and blue light respectively.

The phosphor layer 2021 is formed from rare earth phosphor composed of, for example, a blue phosphor composed of europium-activated barium-magnesium aluminate [$BaMg_2Al_{16}O_{27}:Eu^{2+}$] (abbreviation: BAM-B), a green phosphor composed of cerium and terbium-activated lanthanum phosphate (LAP) [$LaPO_4:Ce^{3+},Tb^{3+}$] (abbreviation: LAP), and a red phosphor composed of europium-activated yttrium oxide [$Y_2O_3:Eu^{3+}$] (abbreviation: YOX).

The phosphor layer 2021 is uneven in the lengthwise direction of the glass bulb 2015, and is for example thicker towards the second sealed portion side than the first sealed portion side. This unevenness in film thickness influences the light emitting property of the lamps 2007 when lit.

Furthermore, pinch-sealed portions 2032 and 2033 have been formed on respective ends of the glass bulb 2015. Two lead-in wires 2025 and 2027 extend externally from the sealed portions 2032 and 2033 of the glass bulb 2015.

The lead-in wires 2025 and 2027 are trunk wires constituted from an inner lead wire 2025A (2027A) made of, for example, Dumet wire, and an outer lead wire 2025B (2027B) made of nickel. The inner lead wire 2025A (2027A) has a 0.3 [mm] wire diameter and a 10 [mm] total length, and the outer lead wire 2025B (2027B) has a 0.3 [mm] wire diameter and a 5 [mm] total length.

Note that also, for example, gas exhaust tubes 2031 whose outer diameters are 2.4 [mm] and inner diameters are 1.6 [mm] have been sealed to the sealed portions 2032 and 2033.

A hollow type nickel (Ni) electrode 2017 (2019) has been fixed to a tip of the inner lead wire 2025A (2027A). The fixing is performed by laser welding, for example.

The electrodes 2017 and 2019 have the same shape, and the measurements of each portion shown in FIG. 22B are as follows. The electrode length L1 is 12.5 [mm], the outer diameter pO is 4.70 [mm], the inner diameter pi is 4.20 [mm], and the thickness t is 0.10 [mm].

When the lamps 2007 are lit, electrical discharge occurs between an inner face of the tube of the bottomed-tube shaped electrode 2017 and an inner face of the tube of the similarly bottomed tube shaped electrode 2019.

The shapes of the electrodes 2017 and 2019 are not limited to this, and may be rod or plate shaped. Although the number of the lead-in wires 2025 and 2027 relative to the sealed portions 2032 and 2033 of the glass bulb 2015 may be one each, sealing two lead-in wires 2025 and 2027 each enables more reliably supporting the electrodes 2017 and 2019 with the lead-in wires 2025 and 2027 that are thinner than a case of bead-sealing, and is also preferable due to ease of positioning during manufacture when aligning the axis position of the electrodes 2017 and 2019 to the axis position of the glass bulb 2015.

The internal end of each gas exhaust tube 2031 is in contact with space in the glass bulb 2015, and is positioned closer to a sealed portion 2032 or 2033 side than the electrodes 2017 and 2019 that are mounted on the tips of the lead-in wires 2025 and 2027.

The external end of each gas exhaust tube 2031 projects to a predetermined distance externally from the sealed portions 2032 and 2033. For example, the ends extend to 8 [mm] from the outer ends of the sealed portions 2032 and 2033 respectively, and are tipped off and sealed.

Note that the glass bulb 2015 is not completely sealed at the previously described "sealed portions 2032 and 2033". After gas is supplied to and discharged from the inner space of the glass bulb 2015 under normal pressure via the gas exhaust tubes 2031 that have been sealed by the sealed portions 2032 and 2033, each outer end of the gas exhaust tube 2033 is sealed, and the glass bulb 2015 is completely sealed.

Also, the lead-in wires 2025 and 2027 that extend from the glass bulb 2015 are wound around respective portions extending externally from the sealed portions 2032 and 2033 of the gas exhaust tube 2033, the bases 2072 are fixed in such a way as to cover the lead-in wires 2025 and 2027 and the extending portions of the gas exhaust tube 2031 that the lead-in wires 2025 and 2027 are wound around, thereby hermetically sealing the respective bases 2072 of the lead-in wires 2025 and 2027 and the extending portions of the gas exhaust tube 2031.

Unlike supporting the cold cathode fluorescent lamps only by the lead-in wires and electrically connecting the lamps to the lead-in wires and an electrical contact on the housing side, this structure enables suppressing a load that would cause the lead wires 2025 and 2027 to break while supporting the lamps 2007 and electrically connecting the lamps 2007 to the lead-in wires 2025 and 2027 and the socket 2084 on the housing 10 side (see FIG. 21), since the bases 2072 are fixed respectively to the extending portions of the gas exhaust tube 2031 while contact is maintained with the lead-in wires 2025 and 2027.

Furthermore, employing this structure enables suppressing, more than in conventional bead sealing, the load on the glass bulb 2015 end that experiences great processing strain, and electrically connecting the lamp 2007 to the socket 2084 on the housing 10 side while supporting the cold cathode fluorescent lamp 2007.

The bases 2072 are sleeve-shaped, and although before being affixed, the inner diameter thereof is smaller than the outer diameter of the gas exhaust tube 2031 after the lead-in wires 2025 and 2027 have been wound, the inner diameter has been widened, and the gas exhaust tube 2031 has been fitted affixed by elastic force. The method for affixing the bases 2072 is not limited to this, and instead affixing may be performed with use of solder or an electrically conductive adhesive when, before being affixed, the inner diameter of the bases 2072 is larger than the outer diameter of the gas exhaust tube 2031 after the lead-in wires 2025 and 2027 have been wound. Also, the bases 2072 are not limited to the shape described above, and may be cap-shaped.

Forming a slit in the sleeve-shaped bases 2072 from one open side end to another open side end parallel to the sleeve axis direction is preferable, and facilitates insertion and fixing by elastic force.

Although in the present embodiment, the lead-in wires 2025 and 2027 have been wound around the projecting portions of the gas exhaust tube 2031 and the bases 2072 have been affixed thereon, the present invention is not limited to this, and the bases 2072 may be affixed to the extending portions of the gas exhaust tube 2031 when the unwound lead-in wires 2025 and 2027 extend from the sealed portions 2032 and 2033 of the glass bulb 2015.

Winding the lead-in wires 2025 and 2027 around the extending portions of the gas exhaust tube 2031 enables more reliable electrical connection between the lead-in wires 2025 and 2027 and respective bases 2072 than when the bases 2072 are affixed onto the lead-in wires 2025 and 2027 that, unwound, extend outward. In particular, using sleeve-shaped bases 2072 that have slits enables preventing the bases 2072 from failing to enclose the lead-in wires 2025 and 2027, and is preferable from the standpoint of improving yield.

Affixing the bases 2072 to the gas exhaust tube 2031 with use of solder or electrically conductive adhesive enables reducing the load to the gas exhaust tube 2031 farther than insertion and affixation by elastic force, and is therefore preferable. Affixation with use of electrically conductive adhesive enables reducing the heat load on the gas exhaust tube 2031 farther than affixing with solder, and is therefore preferable.

In the present embodiment, the bases 2072 are separate from the sealed portions 2032 and 2033 of the glass bulb 2015, and are affixed to respective ends of the gas exhaust tubes 2031 while covering the lead-in wires 2025 and 2027.

Specifically, the bases 2072 are affixed at a distance greater than or equal to 0.5 [mm] from one end of the glass bulb 2015 on the sealed portion 2032 and 2033 sides.

Processing strain on the portions of the gas exhaust tube 2031 covered by the sealed portions 2032 and 2033 of the glass bulb 2015 occurs during formation of the sealed portions 2032 and 2033. Since the gas exhaust tube 2031 and the glass bulb 2015 are fundamentally different-materials, a large number of tiny air gaps are likely to exist at the point of contact. Accordingly, when the lead-in wires 2025 and 2027 have been wound around the gas exhaust tube 2031 so as to bring the bases 2072 into contact with the sealed portions 2032 and 2033, stress occurs at the point of contact due to a temperature difference occurring between the bases 2072 and the gas exhaust tube 2031 when the lamps are lit or extinguished, and cracks readily develop on the point of contact due to the generated stress. There are cases in which the sockets 2084 cannot support the cold cathode fluorescent lamps, and discharge gas that fills the interior of the glass bulb leaks from the cracks, thereby hindering lighting the lamps.

Since the bases 2072 in the present embodiment are affixed while the end on the glass bulb 2015 side is separate from the sealed ends 2032 and 2033 of the glass bulb 2015, generation of the stress described above can be suppressed, the cracks at the point of contact can be suppressed, the cold cathode fluorescent lamps 2007 can be supported by the sockets 2084 of the housing 10, and a discharge gas leak as described previously can be suppressed, and therefore such a structure is preferable.

The present embodiment is also preferable since the bases 2072, being sleeve-shaped, are mounted without covering the ends on the respective sides of the gas exhaust tube 2031 external to the glass bulb 2015, unlike when the bases 2072 are cap-shaped.

Since the ends of the gas exhaust tubes 2031 outside the glass bulb 2015 are tipped off and sealed after gas is supplied to, and discharged from, the space inside the glass bulb 2015 as described above, processing strain occurs on the ends. When the bases 2072 are made to cover the ends that experience processing strain, stress occurs on the ends due to a difference in temperature between the bases 2072 and the gas exhaust tube 2031 when the lamp is lit or extinguished, cracks develop easily on the ends due to the stress, and there are cases when discharge gas leaks out of the cracks in the glass bulb, leading to hindrances in lighting the lamps.

Since the sleeve-shaped bases 2072, when affixed to the gas exhaust tube 2031, do not cover the ends of the gas exhaust tube 2031 on the outer ends of the glass bulb 2015, the stress described above can be suppressed, the development of cracks at the contact point can be suppressed, and discharge gas leaks as described above can be suppressed, so the present embodiment is preferable.

Embodiment 4 Summary

As described above, since the bases 2072 are affixed to respective protruding portions of the gas exhaust tube 2031 so as to cover the lead-in wires 2025 and 2027, the present embodiment enables supporting and electrically connecting the cold cathode fluorescent lamp 2007 to the lead-in wires 2025 and 2027 and the socket 2084 on the housing 10 side, and suppressing the load on the lead-in wires 2025 and 2027 more than when the cold cathode fluorescent lamps are supported by lead-in wires and the cold cathode fluorescent lamps are electrically connected to the lead-in wires and an electrical contact on the housing 10 side.

Furthermore, since employing this structure when affixing the bases 2072 enables avoiding the sealed portions 2032 and 2033 formed by pinch-sealing, the load on the end of the glass bulb 2015, on which processing strain is great, can be suppressed more than in conventional bead sealing, and the cold cathode fluorescent lamp 2007 can be supported and electrically connected to the lead-in wires and the socket 2084 on the housing 10 side.

Accordingly, the cold cathode fluorescent lamp 2007 pertaining to the present embodiment suppresses the load on the lead-in wires 2025 and 2027 and the end of the glass bulb 2015 while being supported and electrically connected.

Also, since in the present embodiment, the bases 2072 are separated from the sealed portions 2032 and 2033 of the glass bulb 2015 and are affixed to respective portions of the gas exhaust tube 2031 in a state of covering the lead-in wires 2025 and 2027, stress on the gas exhaust tube 2031 can be suppressed, the load on the gas exhaust tube 2031 can be suppressed, and the cold cathode fluorescent lamps 2007 can be electrically connected and supported more reliably.

Moreover, since the sleeve-shaped bases 2072, when affixed to the gas exhaust tube 2031, do not cover the ends of the gas exhaust tube 2031 on the outer ends of the glass bulb 2015, stress on the gas exhaust tube 2031 can be suppressed, the load on the gas exhaust tube 2031 can be suppressed, and the cold cathode fluorescent lamps 2007 can be electrically connected and supported more reliably.

Variations of Embodiment 4

Figure 23A:
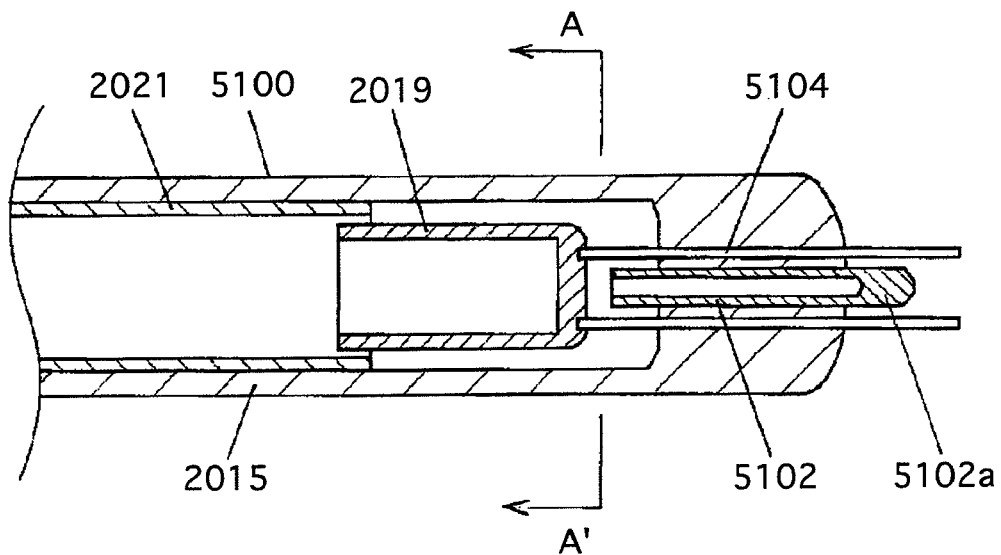
FIGS. 23A and 23B pertain to variation 1 of embodiment 4, FIG. 23A being an enlarged cross-sectional front view of a relevant portion of a fluorescent lamp of variation 1, and FIG. 23B showing a cross section taken along A-A' of FIG. 23A.
Figure 23B:
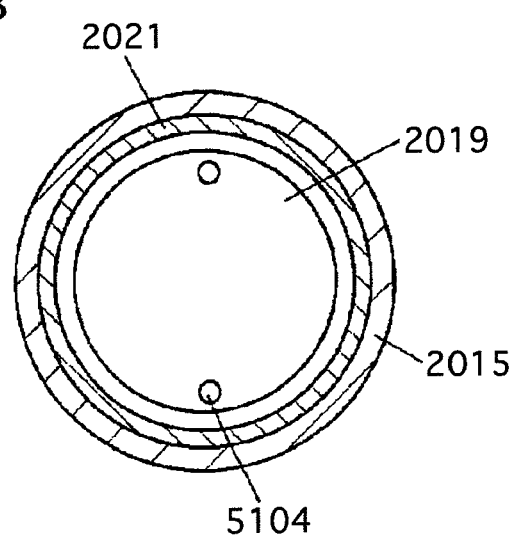

Variations of embodiment 4 are described below.
Variation 1
As shown in FIG. 23, a cold cathode fluorescent lamp 5100 of variation 1 has a hole provided in advance in a position where lead wires 5104 are anticipated to join to an outer face of the bottom of the electrode 2019. After inserting the lead wires 5104 into the hole, the electrode 2019 and the lead wires 5104 are joined by laser welding or the like.

Figure 24:
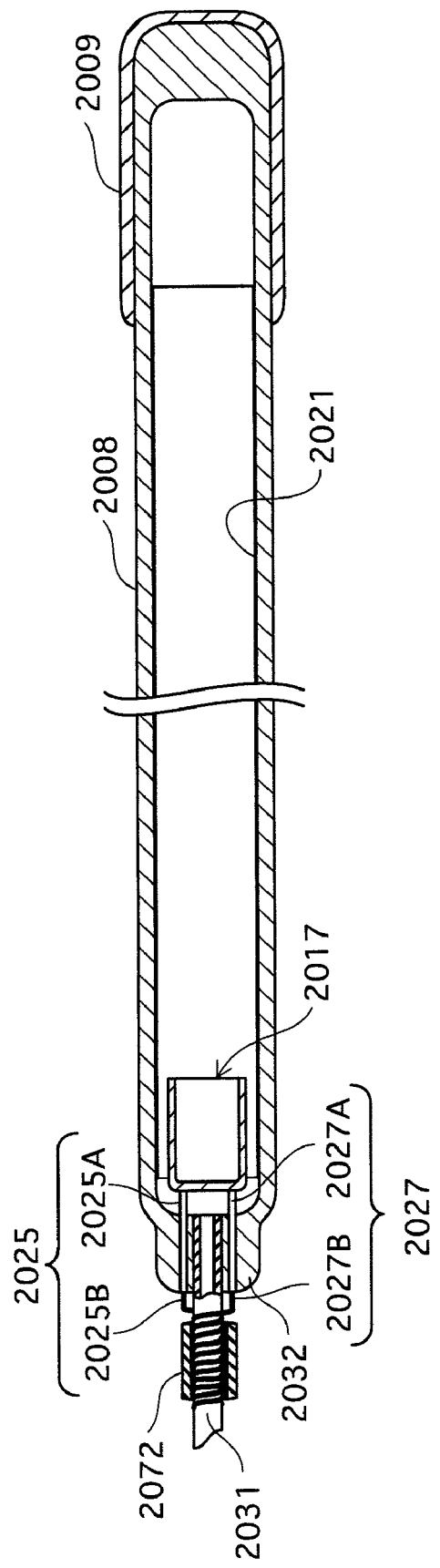
FIG. 24 is a cross-sectional front view of a fluorescent lamp pertaining to embodiment 4, including a tube axis.

This structure enables improving the stability of the joint between the electrode 2019 and the lead wires 5104.
Variation 2
As shown in FIG. 24, a fluorescent lamp 2008 of variation 2 (hereinafter, may be referred to simply as "lamp 2008") is an internal/external electrode fluorescent lamp that has an external electrode 2009 on an exterior face of one end and an internal electrode 2019 in the interior of the other end.

The lamp 2008 has the external electrode 2009 on the external face of one end, and except for this accompanying structure, has a structure substantially the same as the cold cathode fluorescent lamp depicted in FIG. 22. Accordingly, the details of the external electrode 2009 and the accompanying structure are described, and description of other parts is omitted.

The external electrode 2009 is formed from, for example, aluminum leaf, and has been adhered to the glass bulb 2015, with use of an electrically conductive adhesive formed by mixing a metallic powder with silicon resin (not depicted), so as to cover the outer circumference face of the end of the glass bulb 2015. Note that fluoride resin, polyimide resin, epoxy resin or the like may be used instead of silicon resin in the electrically conductive adhesive.

Also, the external electrode 2009 may be formed by applying silver paste on the outer circumference of an electrode shaping portion of the glass bulb 2015, instead of sticking the aluminum leaf to the glass bulb 2015 with use of the electrically conductive adhesive, and a metallic base may be fitted on the end of the glass bulb 2015.

Also, although not depicted in FIG. 24, a protective film formed from, for example, yttrium oxide ($Y_2O_3$) may be provided in an area on an inner face of the glass bulb 2015 where the external electrode 2009 is formed. Providing the protective film enables preventing glass chipping and pinholes forming in the opposite side portion of the glass bulb 26 due to bombardment by mercury ions.

Note that the protective film may be a metal oxide such as silica ($SiO_2$) or alumina ($Al_2O_3$) in place of yttrium oxide. In particular, when the protective film is formed from yttrium oxide or silica, mercury does not readily adhere to the protective film, and mercury consumption is slight.

In other words, the protective film is not an essential constituent element in the present invention, and may be not formed at all, or may be formed across the entirety of the inner face of the glass bulb 2015.

Note that although in the example shown in FIG. 24, the gas exhaust tube 2031 is only provided on the internal electrode 2017 side, the gas exhaust tube 2031 may instead be provided only on the external electrode 2009 side, or gas exhaust tubes 2031 may be provided on both sides.

Figure 25A:
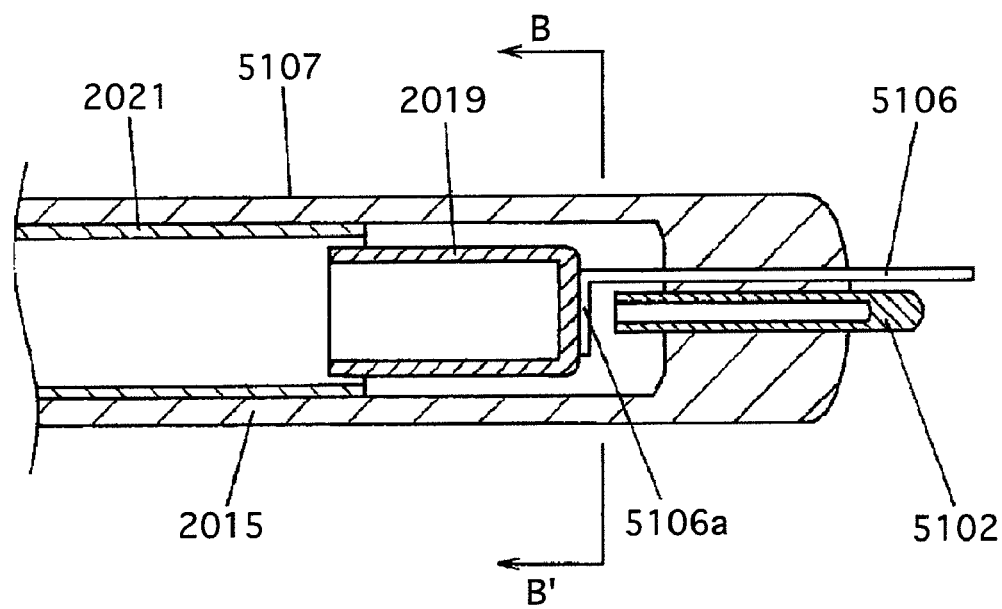
FIGS. 25A and 25B are figures pertaining to variation 3 of embodiment 4, FIG. 25A being a cross-sectional enlarged front view of a relevant portion of a fluorescent lamp, and FIG. 25B showing a cross section taken along B-B'.
Figure 25B:
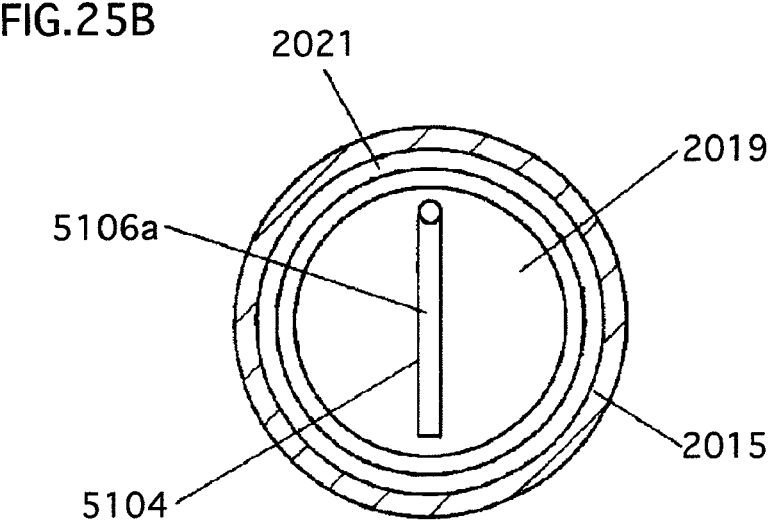

Variation 3
FIG. 25A is a cross-sectional enlarged front view of a relevant portion of a fluorescent lamp 5107 pertaining to variation 3 including the tube axis, and FIG. 25B shows a cross section taken along B-B'. In the fluorescent lamp 5107, an end of one lead wire 5106 extending in a tube axis direction is bent in an L-shape in a direction parallel to the outer face of the bottom of the electrode 2019, and substantially an entirety of this bent portion 5106*a* is in contact with the outer face of the bottom of the electrode 2019. This structure enables enlarging the contact area between the lead wire 5106 and the outer face of the bottom of the electrode 2019, and increasing the stability of the joint between the lead wire 5106 and the electrode 2019.

Figure 26A:
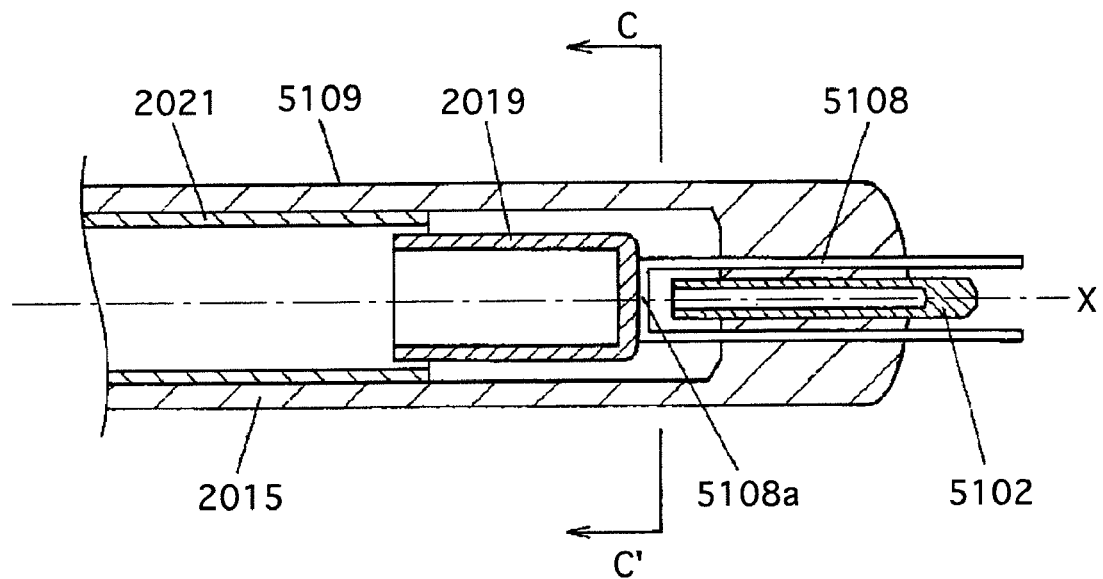
FIGS. 26A and 26B pertain to variation 4 of embodiment 4, FIG. 26A being an enlarged cross-sectional front view of a relevant portion of a fluorescent lamp, and FIG. 26B showing a cross section taken along line C-C'.
Figure 26B:
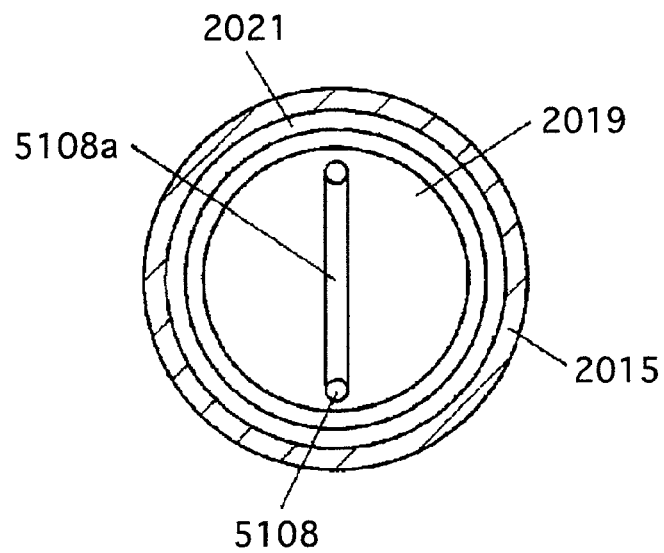

Variation 4
FIG. 26A is an enlarged cross-sectional front view of a relevant portion of a fluorescent lamp pertaining to variation 4, including the tube axis of variation 2, and FIG. 26B shows a cross section taken along C-C'. In such a case, one lead wire 5108 is folded into a U-shape having three straight parts, and substantially an entirety of an intermediate part 5108*a*, which is between the two folded parts, has been joined together with an outer face of the bottom of the electrode 2019. In other words, the lead wire 5108 has either linear or surface contact with the intermediate part 5108*a* of the electrode 2019. This structure increases the contact area between the lead wire 5108 and the outer face of the bottom of the electrode 2019, and enables increasing the stability of the joint between the lead wire 5108 and the electrode 2019. Also, the two straight parts of the lead wire 5108 excluding the intermediate part 5108*a* are sealed in the glass bulb 2015, and are supported by the glass bulb 2015. This structure enables suppressing axis slippage in the electrode 2019 that is supported by the glass bulb 2015, specifically, preventing the central axis in the lengthwise direction of the electrode 2019 from tilting away from the tube axis X of the glass bulb 2015.

Variation 5
Variation 5 differs from variation 4 in the shape of the lead wire. Specifically, variation 5 is different in that the intermediate part 5110*a* that is between the two folded parts of the straight U-shaped lead wire 5110, while remaining parallel to the outer face of the bottom of the electrode 2019, bends in a zigzag shape.

Figure 27A:
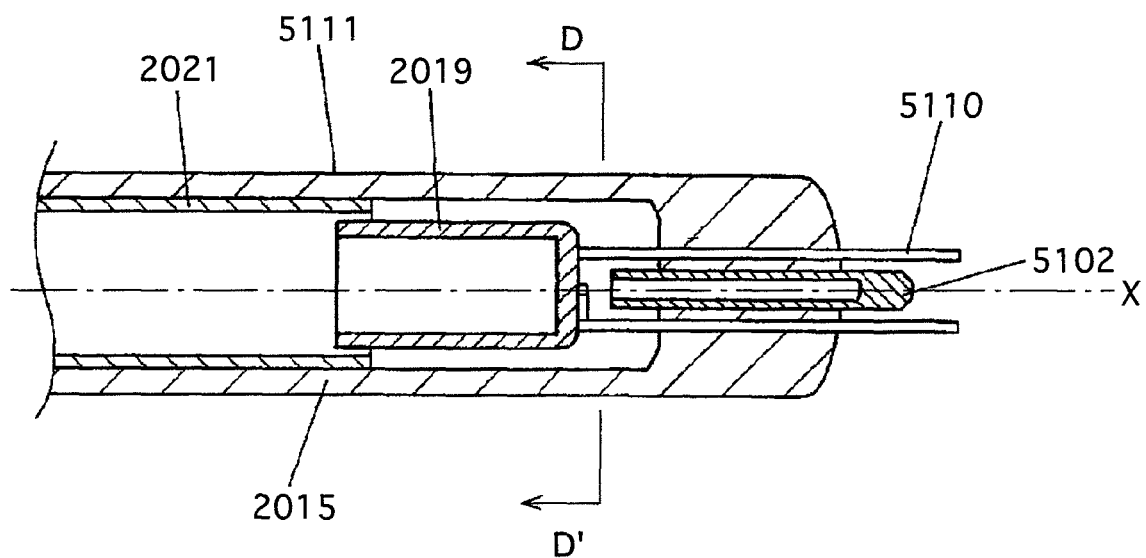
FIGS. 27A and 27B pertain to variation 5 of embodiment 4, FIG. 27A being an enlarged cross-sectional front view of a relevant portion of the fluorescent lamp, and FIG. 27B showing a cross section taken along line D-D'.
Figure 27B:
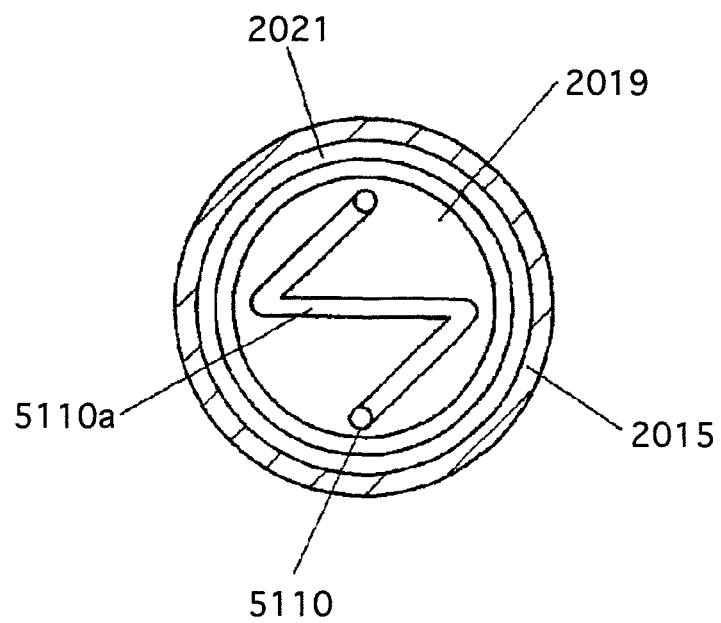

FIG. 27A is an enlarged cross-sectional front view of a relevant portion of a fluorescent lamp pertaining to variation 5, including the tube axis thereof, and FIG. 27B shows a cross section taken along D-D'. In such a case, one lead wire 5110 is first folded into a U-shape having three straight parts, and further an intermediate part 5110*a* that is between the two folded parts bends twice, so as to form a zigzag shape while remaining parallel to the outer face of the bottom of the electrode 2019. In other words, the intermediate part 5110*a* is folded substantially in a Z-shape. This structure further enables increasing the contact area between the lead wire 5110 and the outer face of the bottom of the electrode 2019, thereby further increasing the stability of the joint between the lead wire 5110 and the bottom face of the electrode 2019, and preventing the central axis in the lengthwise direction of the electrode 2019 from tilting away from the tube axis X of the glass bulb 2015. Note that although the lead wire 5110 shown in FIGS. 27A and 27B is folded twice while the intermediate part 5110*a* that is between the two folded parts remains parallel to the outer face of the bottom of the electrode 2019, the number of times the lead wire 5110 is folded and the shape after being folded are not limited to these. For example, the intermediate part 5110*a* may form a concentrically circular path around the outer face of the bottom of the electrode 2019, or may form a star or spiral shape.

Variation 6

The fluorescent lamp pertaining to variation 6 differs from the fluorescent lamp pertaining to variation 1 in the shape of the electrode and the connection condition between the electrode and the lead wire. Specifically, variation 6 is different in that the electrode 2019 has a convex part 2019*a* that projects from the outer face of the bottom of the electrode, and the lead wire 5110 is joined substantially linearly or surface-to-surface to the side face of the convex part 2019*a*.

Figure 28A:
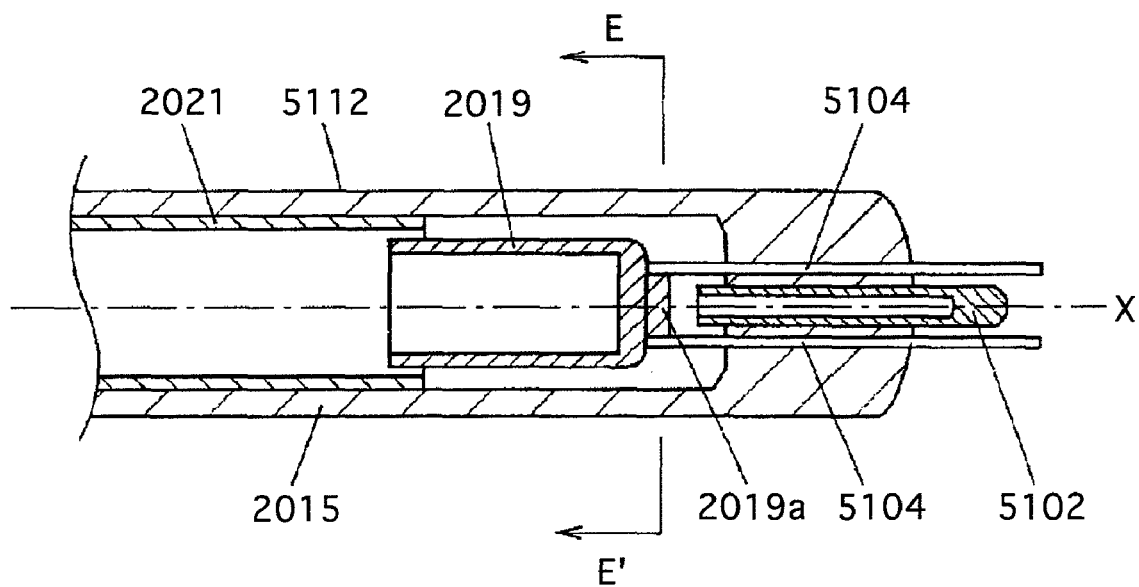
FIGS. 28A and 28B pertain to variation 6 of embodiment 4, FIG. 28A being an enlarged cross-sectional front view of a relevant portion of the fluorescent lamp, and FIG. 28B showing a cross section taken along E-E'.
Figure 28B:
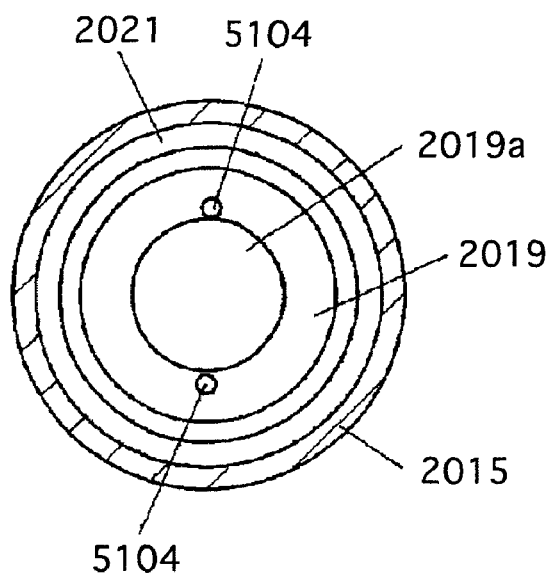

FIG. 28A is an enlarged cross-sectional front view of a relevant portion of a fluorescent lamp pertaining to variation 6, including the tube axis thereof, and FIG. 28B shows a cross section taken along E-E'. In variation 6, the electrode 2019 has a column-shaped convex part 2019*a* that projects from the outer face of the bottom of the electrode, and two lead wires 5104 are joined to the respective side faces of the convex part 2019*a*. This increases the area of the surface contact between the lead wires 5104 and the outer side of the bottom of the electrode 2019, and enables increasing the stability of the connection between the lead wires 5104 and the electrode 2019. Note that in FIG. 28, the lead wires 5104 appear to be connected to the side faces of the convex part and to the bottom face of the electrode, and the lead wires 5104 may also be connected to one end face of the glass bulb 2015 and to the bottom face of the electrode. In such a case, the stability of the connection between the lead wires 5104 and the electrode 2019 can be improved further over a case of connection only to the side faces of the convex part. Also, a groove having a width as large as the wire diameter of the lead wires 5104 may be formed in the side face of the convex part 2019*a*, and fitting the lead wires 5104 into the groove to form a connection enables preventing the position of the connection between the lead wires 5104 and the electrode 2019 from slipping.

Variation 7

The fluorescent lamp pertaining to variation 7 differs from variation 6 in the shape of the lead wire and the connection condition between the electrode and the lead wire. Specifically, variation 7 differs in that the lead wire is wound around the side face of the convex part of the electrode.

Figure 29A:
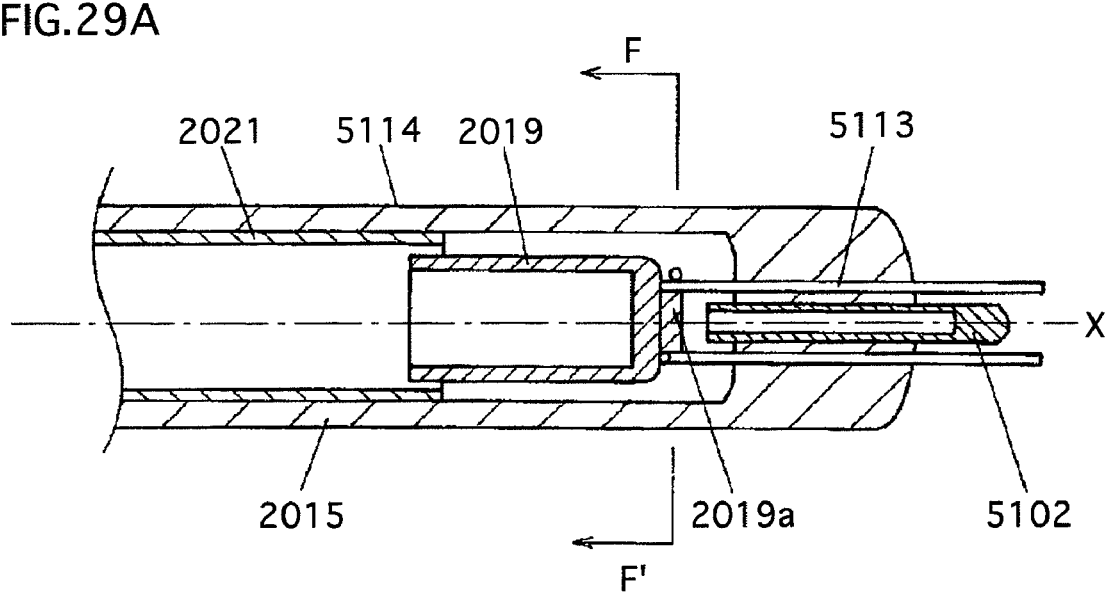
FIGS. 29A and 29B pertain to variation 7 of embodiment 4, FIG. 29A being an enlarged cross-sectional view of a relevant portion of the fluorescent lamp, and FIG. 29B showing a cross section taken along F-F'.
Figure 29B:
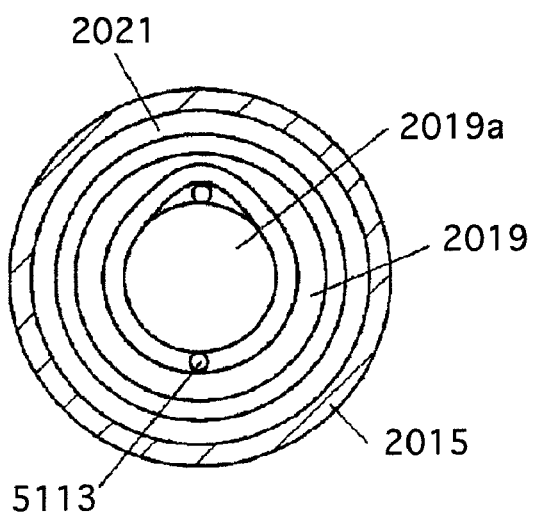

FIG. 29A is an enlarged cross-sectional view of a relevant portion of a fluorescent lamp pertaining to variation 7, including the tube axis thereof, and FIG. 56B shows across section taken along F-F'. In variation 7, the electrode 2019 has a column-shaped convex part 2019*a* that projects from the outer face of the bottom of the electrode, and lead wires 5113 have been wound around the side face of the convex part 2019*a* so that the electrode 2019 and the lead wires 5113 are connected substantially linearly or surface-to-surface. This further increases the stability of the connection between the lead wires 5113 and the electrode 2019, and enables preventing the central axis of the electrode 2019 in the lengthwise direction from tilting away from the tube axis X of the glass bulb 2015. Note that the number of times that the lead wires 5113 is wound around the convex portion 2019*a* and the direction of winding, etc. are not limited to the arrangement shown in FIGS. 29A and 29B.

Variation 8

Variation 8 of the fluorescent lamp differs from variation 4 in the shape of the electrode and the connection condition between the electrode and the lead wire. Specifically, variation 8 differs in that a convex part having a groove on an end face has been formed on the outer side of the bottom of the electrode, and the lead wire has been inserted into the groove to be connected either linearly or surface-to-surface to the electrode.

Figure 30A:
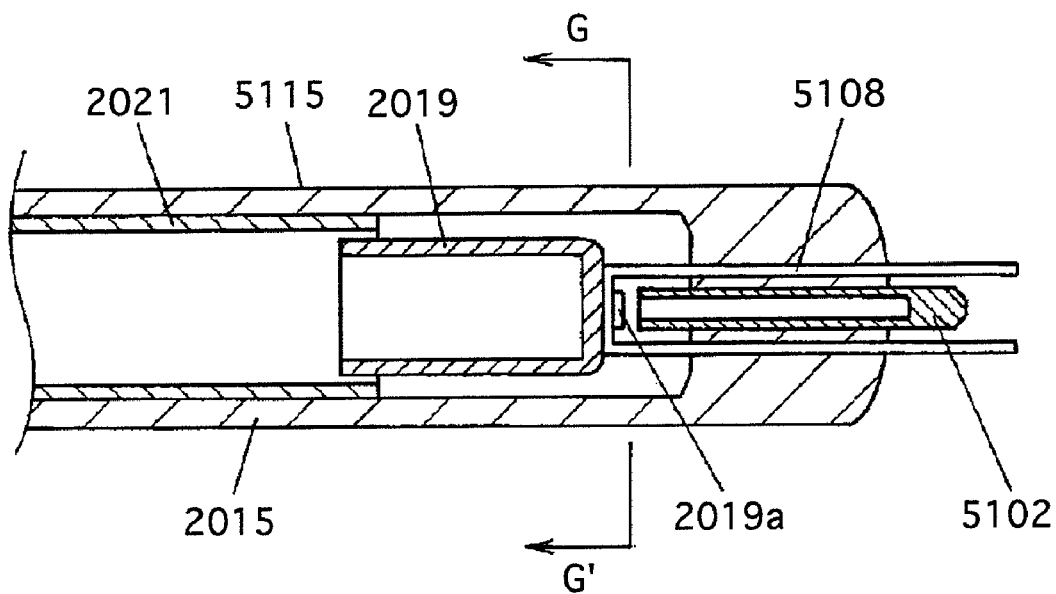
FIGS. 30A and 30B pertain to variation 8 of embodiment 4, FIG. 30A being an enlarged cross-sectional front view of a relevant portion of a fluorescent lamp, and FIG. 30B showing a cross section taken along G-G'.
Figure 30B:
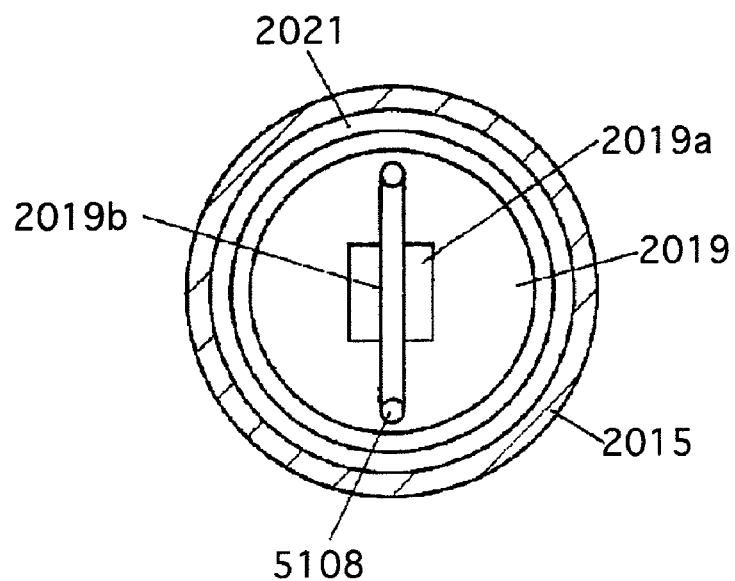

FIG. 30A is an enlarged cross-sectional front view of a relevant portion of a fluorescent lamp pertaining to variation 8, including the tube axis thereof, and FIG. 30B shows a cross section taken along G-G'. Variation 8 includes a convex part shaped as a rectangular solid that extends from the outer side of the bottom of the electrode 2019, and a groove 2019*b* has been formed on an end face thereof. The intermediate part 5108*a*, which is substantially the same as in variation 4, has been inserted into the groove 2019*b*, and the electrode 2019 and the lead wire 5108 are connected, by welding, for example. The width of the groove 2019*b* is, for example, substantially the same as the wire diameter of the lead wire, for example, 0.4 [mm].

Note that after inserting the intermediate part 5108*a* of the lead wire 5108 into the groove 2019*b*, the lead wire 5108 and the electrode 2019 can easily be connected by caulking the convex part from outside. Furthermore, welding after caulking enables further strengthening the connection between the lead wire 5108 and the electrode 2019.

Also, the convex portion 2019*a* may also be a columnar shape, a spindle shape, a tetrahedron, a hexahedron, etc., in addition to a rectangular solid shape. Particularly in the case of a rectangular solid shape or a cube, a jig used to perform caulking is more stable and less likely to slip when a groove is provided parallel to the side face and caulking is performed after inserting the lead wire 5108 into the groove.

Variation 9

Variation 9 of the fluorescent lamp differs from variation 8 in the position of the groove in the convex portion of the electrode. Specifically, variation 9 differs in that instead of being provided on the end face of the convex part, the groove is provided on the side face thereof.

Figure 31A:
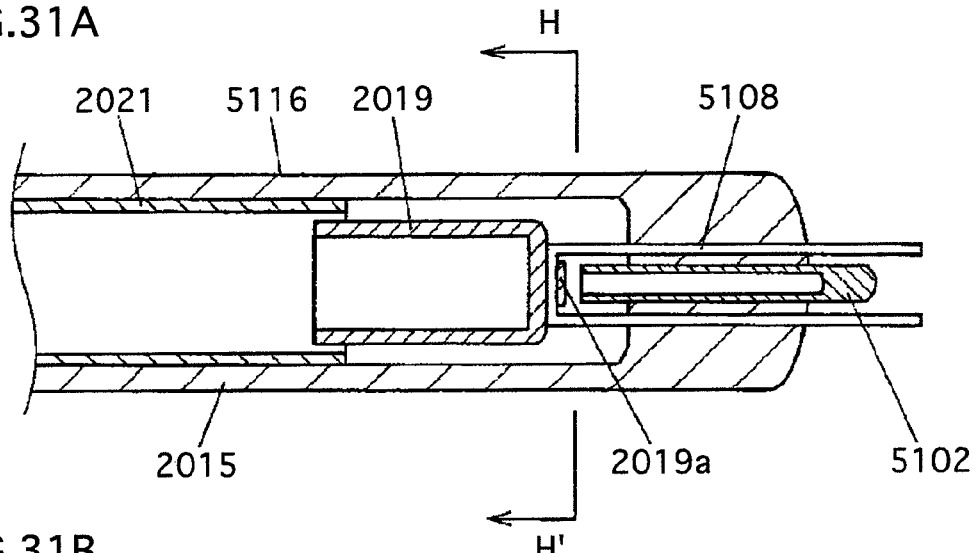
FIGS. 31A, 31B and 31C pertain to variation 9 of embodiment 4, FIG. 31A being an enlarged cross-sectional front view of a relevant portion of a fluorescent lamp, FIG. 31B being an enlarged cross-sectional bottom view of a relevant portion of the fluorescent lamp, and FIG. 31C showing a cross section taken along H-H'.
Figure 31B:
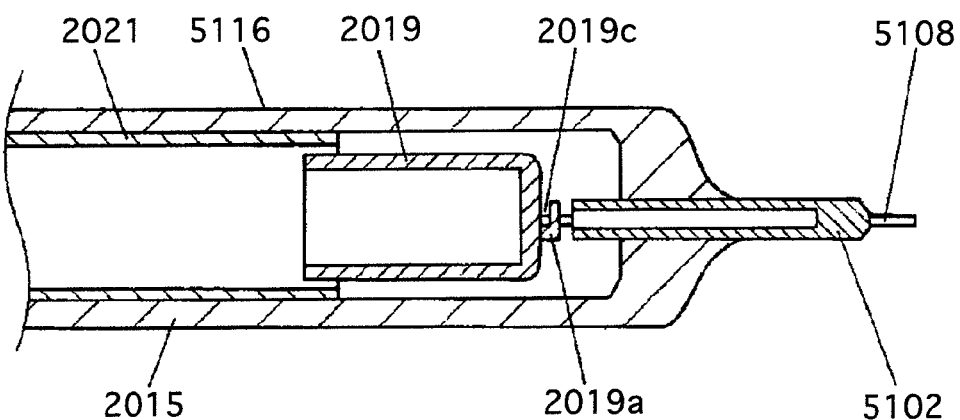
Figure 31C:
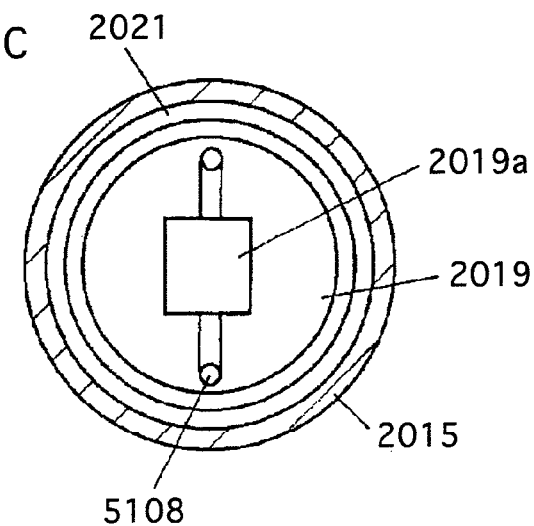

FIG. 31A is an enlarged cross-sectional front view of a relevant portion of a fluorescent lamp pertaining to variation 9, including the tube axis thereof, FIG. 31B is an enlarged cross-sectional bottom view of a relevant portion of the fluorescent lamp, and FIG. 31C shows a cross section taken along H-H'. In variation 9, instead of the groove 2019*b* being formed in the end face of the convex portion 2019*a* as in variation 8, a groove 2019*c* has been formed in the side face of the convex portion 2019*a*. The lead wire 5108 is substantially the same as in variation 4, the intermediate part 5108*a* has been inserted in the groove 2019*c*, and the electrode 2019 and the lead wire 5108 have been connected, by welding for example.

Such a case enables strengthening the connection between the electrode 2019 and the lead wire 5108 in the direction of the tube axis of the glass bulb 2015.

Variation 10

The fluorescent lamp of variation 10 pertaining to embodiment 4 of the present invention differs from variation 8 in the shape of the groove in the convex portion of the electrode. Specifically, variation 10 is different in that shapes of opposing inner faces of the groove are concavo-convex.

Figure 32A:
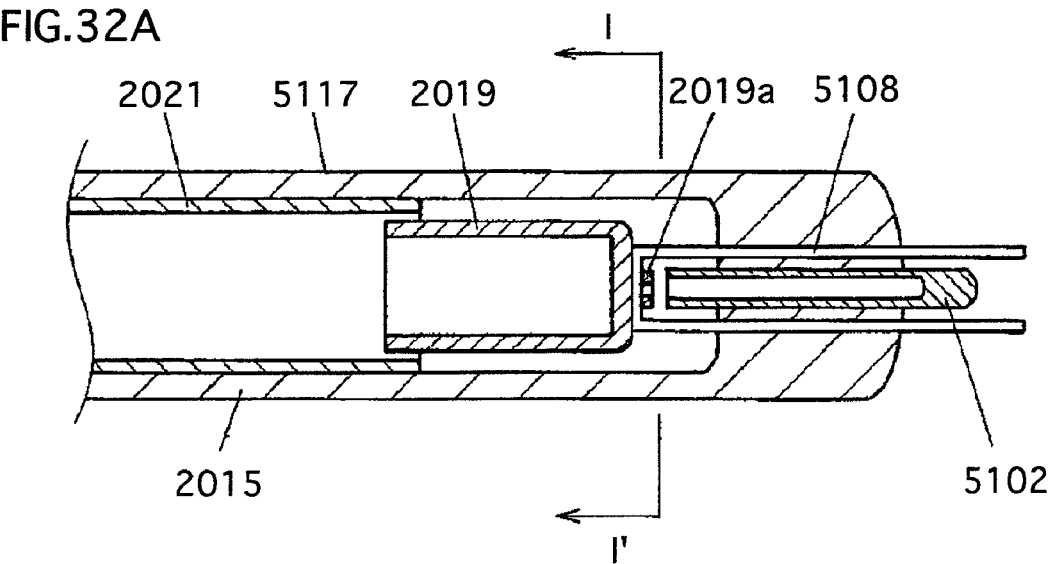
FIGS. 32A, 32B, and 32C pertain to variation 10 of embodiment 4, FIG. 32A being an enlarged cross-sectional front view of the fluorescent lamp, FIG. 32B being an enlarged cross-sectional bottom view, and FIG. 32C showing a cross section taken along I-I'.
Figure 32B:
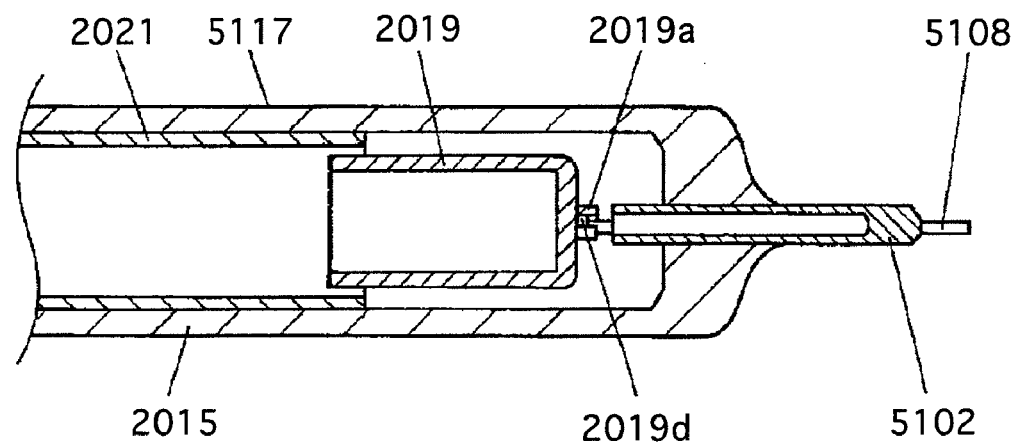
Figure 32C:
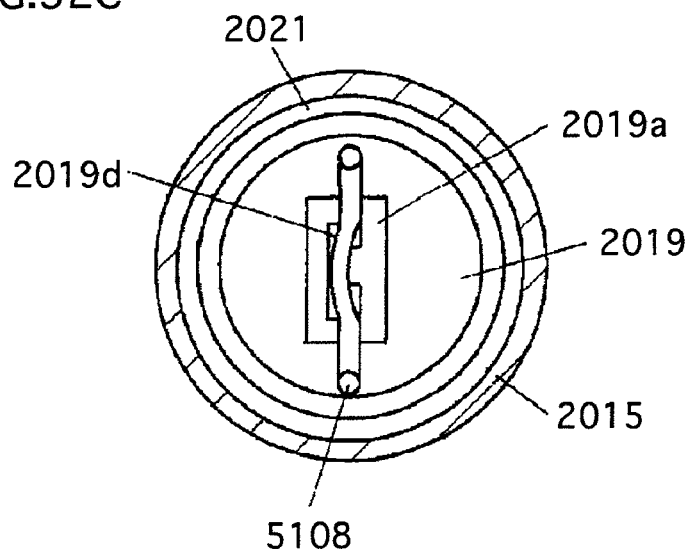

FIG. 32A is an enlarged cross-sectional front view of a relevant portion of a fluorescent lamp pertaining to variation 10, including the tube axis thereof, FIG. 32B is an enlarged cross-sectional bottom view, and FIG. 31C shows a cross section taken along I-I'.

Variation 10 has a convex part 2019*a* that is substantially the same as in variation 8. Furthermore, although similarly to variation 7, a groove 2019*d* has been formed in an end face of the convex part 2019*a*, the shapes of the opposing inner faces are concavo-convex.

The lead wire 5108 is substantially the same as in variation 2, the intermediate part 5108*a* has been inserted into the groove 2019*d*, and is gripped by the concavo-convex inner faces of the grooves 2019*d*.

This enables further strengthening the connection between the electrode 2019 and the lead wire 5108.

Variation 11

The fluorescent lamp of variation 11 differs from variation 9 in the shape of the groove in the convex portion of the electrode. Specifically, variation 11 differs in that the shapes of the opposing inner faces of the groove are concavo-convex.

Figure 33A:
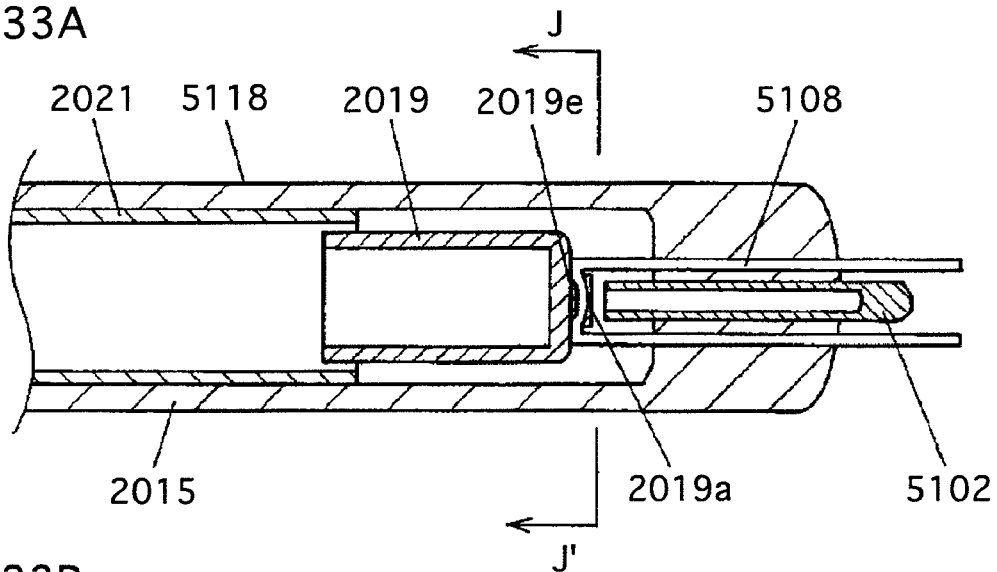
FIGS. 33A, 33B, and 33C pertain to variation 11 of embodiment 4, FIG. 33A being an enlarged front cross-sectional view of a relevant portion of a fluorescent lamp, FIG. 33B being an enlarged cross-sectional bottom view of the fluorescent lamp, and FIG. 33C showing a cross section taken along J-J'.
Figure 33B:
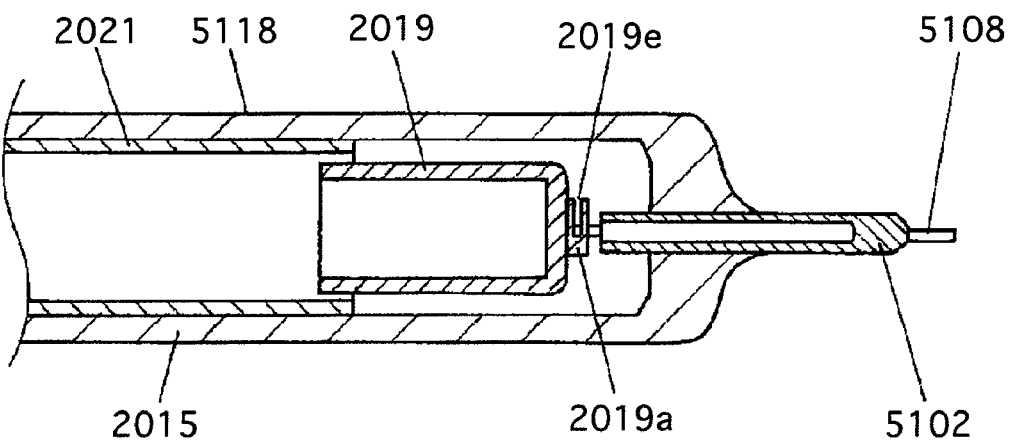
Figure 33C:
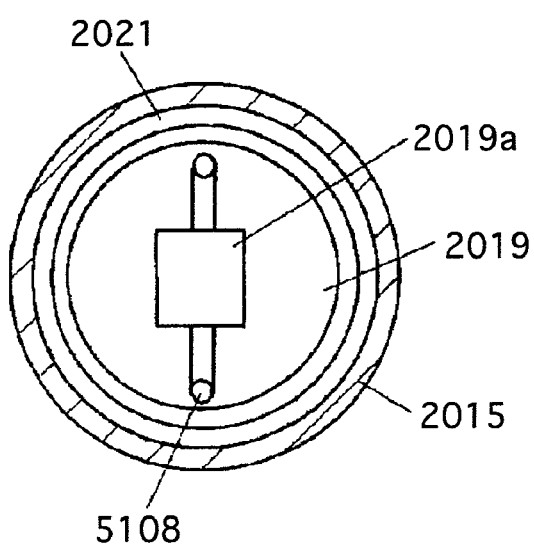

FIG. 33A is an enlarged front cross-sectional view of a relevant portion of a fluorescent lamp pertaining to variation 11, including the tube axis thereof, FIG. 33B is an enlarged cross-sectional bottom view, and FIG. 33C shows a cross section taken along J-J'.

Variation 11 has a convex portion 2019*a* that is substantially the same as in variation 10. Furthermore, although similarly to variation 7, the groove 2019*d* has been formed in a side face of the convex portion 2019*a*, the shapes of the opposing inner faces in the groove are concavo-convex.

The lead wire 5108 is substantially the same as in variation 2, the intermediate part 5108*a* has been inserted in the groove 2019*d*, and is gripped by the convexo-concave inner faces of the groove 2019*e*.

This enables further strengthening the connection between the electrode 2019 and the lead wire 5108 in an axis direction of the glass bulb 2015.

Embodiment 5

Since the present embodiment differs from embodiment 4 in employing a hot cathode fluorescent lamp as the fluorescent lamp in place of a cold cathode fluorescent lamp, only the differences from embodiment 4 are described, and description of other structures is omitted.

Figure 34:
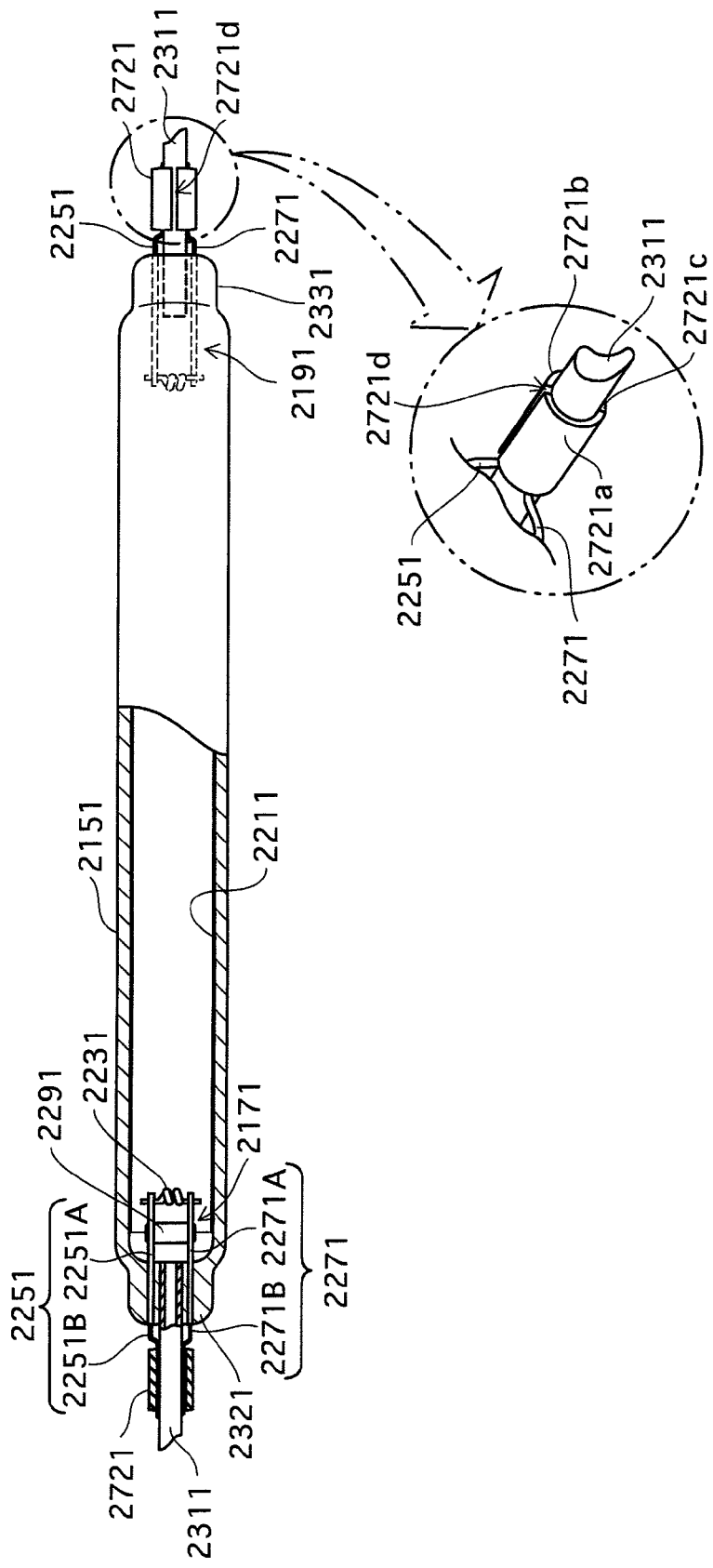
FIG. 34 is an enlarged view of a relevant portion of a hot cathode fluorescent lamp pertaining to embodiment 5.

FIG. 34 is an enlarged view of the relevant portion of a hot cathode fluorescent lamp 2071 pertaining to the present embodiment. As shown in FIG. 34, the hot cathode fluorescent lamp 2071 has been formed by filling a straight tube shaped glass bulb 2151 with a discharge medium and disposing electrodes 2171 and 2191 in proximity to the ends of the glass bulb 2151.

In the present embodiment, lead-in wires 2251 and 2271 extending out of the glass bulb 2151 are substantially linearly connected to portions of a gas exhaust tube 2311 that extend out of the sealed portions 2321 and 2331 of the glass bulb 2151, respectively. Bases 2721 have been affixed so as to cover these projecting portions of the gas exhaust tube 2311 and the lead-in wires 2251 and 2271, and the lead-in wires 2251 and 2271 are in close contact with the bases 2721 and the gas exhaust tube 2311.

As shown in the enlarged view of the relevant portion in FIG. 34, the bases 2721 are constituted from conductive parts 2721*a* and 2721*b* and an insulating part 2721*c*, and have a slit 2721*d*. The insulating part 2721*c* and the slit 2721*d* electrically insulate the conductive parts 2721*a* and 2721*b* in the sleeve-shaped base 2721. For example, on one end, the lead-in wire 2251 is in close contact with the conductive part 2721*b* of the base 2271 and the gas exhaust tube 2311, and on the other end, the lead-in wire 2271 is in close contact with the conductive part 2721*a* of the base 2721 and the gas exhaust tube 2311. By employing this structure, when power is supplied from the socket 2084 on a housing 8 side (see FIG. 21) upon lighting the lamp, power can be passed through a filament 2231 and the filament 2231 can be heated without causing a short circuit between the lead-in wires 2251 and 2271, and subsequently can prompt electrical discharge to occur between the electrodes 2171 and 2191. Note that the sleeve shape of the base 2721 is maintained even after affixing the base 2721. In other words, the base 2721, when affixed, has the slit 2721*d*. Since this structure is employed in the base 2721, the conductive parts 2721*a* and 2721*b* can remain electrically insulated from each other even after the base is affixed.

Solder or electrically conductive adhesive is used in the method for affixing the bases 2721. Affixing with use of an electrically conductive adhesive is preferable, since this results in a lower heat load on the gas exhaust tube 2331 than when affixed with use of solder.

When the base is affixed with use of solder or conductive adhesive, a base may be used that has been formed by joining together a material that has a property of electrically insulating the conductive parts 2721*a* and 2721*b* from each other. When such a base is used, since there is no slit, mechanical strength of the base can be improved over the base 2721 having the slit 2721*d*.

Embodiment 5 Summary

Although the hot cathode fluorescent lamp 2071 is used as the fluorescent lamp in the present embodiment unlike the cold cathode fluorescent lamp used in embodiment 4, similarly to embodiment 4, the bases 2721 respectively cover the lead-in wires 2251 and 2271 while being affixed to the projecting portions of the gas exhaust tube 2311, and therefore the present embodiment enables suppressing, more than in conventional bead sealing, the loads on the lead-in wires 2251 and 2271 and on the glass bulb 2151 experiencing great processing strain while supporting the hot cathode fluorescent lamp 2071, and electrically connecting the hot cathode fluorescent lamp 2071 to the socket 2084 on the housing 10 side.

Accordingly, similarly to embodiment 4, the hot cathode fluorescent lamp 2071 pertaining to the present embodiment suppresses the load on the lead-in wires 2251 and 2271 and the end of the glass bulb 2151 while being supported and electrically connected.

Also, similarly to embodiment 4, in the present embodiment, since the bases 2721 have been separated from the sealed portions 2321 and 2331 of the glass bulb 2151 and affixed to respective portions of the gas exhaust tube 2311 while covering the lead-in wires 2251 and 2271, the hot cathode fluorescent lamps 2071 can be electrically connected and supported more reliably.

In addition, similarly to embodiment 4, the present embodiment uses the sleeve-shaped base 2721, and since the base 2721 has been affixed to the gas exhaust tube 2311 without covering the outer end of the gas exhaust tube 2311, the hot cathode fluorescent lamps 2071 can be electrically connected and supported more reliably.

Embodiment 6

The main characteristics of the present embodiment pertain to the arrangement position, etc. of the base that is a structural member of the cold cathode fluorescent lamp, and since other structures are substantially similar to embodiment 4, only the characteristic portions are described, and further description is omitted.

Figure 35:
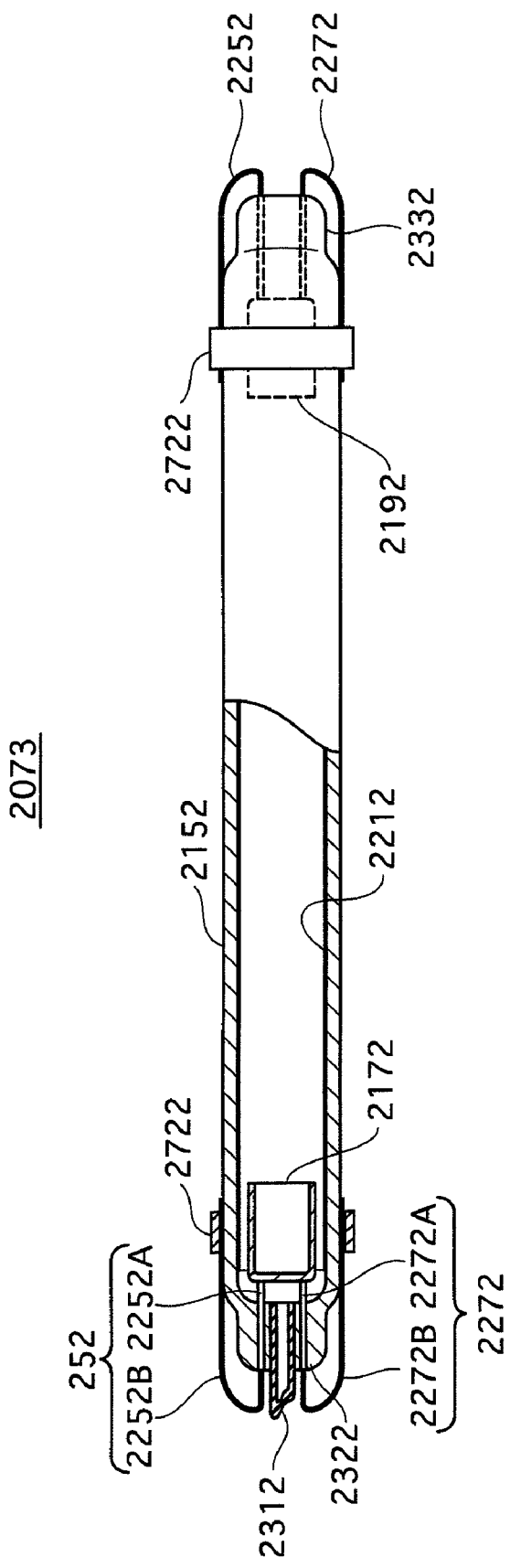
FIG. 35 is an enlarged view of a relevant portion of a cold cathode fluorescent lamp pertaining to embodiment 6.

FIG. 35 is an enlarged view of a relevant portion of the cold cathode fluorescent lamp 2073 (hereinafter may be simply called "lamp 2073") in the present embodiment. As shown in FIG. 35, there is a shorter distance from the sealed portions 2322 and 2332 of the glass bulb 2152 to the end of the gas exhaust tube 2312 on the outer side of the glass bulb 2152 in the cold cathode fluorescent lamps 2073 than in embodiment 4, and the cold cathode fluorescent lamps 2073 are tipped off and sealed similarly to embodiment 4.

In the present embodiment, lead-in wires 2252 and 2272 that project out from the glass bulb 2152 have been folded, and the bases 2722 are in contact with the glass bulb body, specifically in a position that covers the electrodes 2172 and 2192 enclosed by the glass bulb 2152 and avoids the sealed portions 2322 and 2332 of the glass bulb 2152 and the vicinity thereof. In this position, the lead-in wires 2252 and 2272 are in close contact with the glass bulb 2152 and the bases 2722.

Affixing the bases 2722 to portions of the glass bulb 2152 that cover the electrodes 2172 and 2192 and avoid the sealed portions 2322 and 2332 of the glass bulb 2152 while maintaining contact with the lead-in wires 2252 and 2272 enables the cold cathode fluorescent lamps 2073 to be supported and electrically connected to the lead-in wires 2252 and 2272 and the socket 2084 on the housing 10 side, and suppresses creating a load that would break the lead-in wires 2252 and 2272 more than when the cold cathode fluorescent lamps are supported by the lead-in wires and are electrically connected to the lead-in wires and the electrical contact on the housing side.

Furthermore, employing this structure enables suppressing, more than in conventional bead sealing, the load on the glass bulb 2152 that experiences great processing strain while supporting the cold cathode fluorescent lamps, and electrically connecting the cold cathode fluorescent lamps 2073 to the socket 2084 on the housing 10 side.

Also, employing this structure is preferable since the length in the lengthwise direction of the gas exhaust tube 2312 can be made smaller than in embodiment 4, and the rate of the portion of the cold cathode fluorescent lamp 2073 that does not emit light can be made smaller.

Although the bases 2722 have been affixed to portions of the glass bulb 2152 that cover the electrodes 2172 and 2192 respectively, since the size of gaps from the electrodes 2172 and 2192 to the inner face of the glass bulb 2152 is extremely small, phosphor layers 2212, even if formed on inner faces of the glass bulb 2152 that are opposite from outer walls of the tube-shaped electrodes 2172 and 2192, do not emit light.

Since disposing the bases 2722 and the lead-in wires 2252 and 2272 further inward in the glass bulb 2152 than the ends of the electrodes 2172 and 2192 on the glass bulb 2152 side blocks light emission from the lamps 2073, the basis 2722 and the lead-in wires 2252 and 2272 are preferably disposed further outward in the glass bulb 2152 than the inner ends of the electrodes 2172 and 2192.

The base 2722 is sleeve-shaped, and although the inner diameter thereof, before being affixed, is smaller than the total of the wire diameter of one of the lead-in wires 2252 and 2272 and the outer diameter of the glass bulb 2152, the base 2722 is spread open, fit around one of the lead-in wires 2252 and 2272 and affixed thereto by elasticity. The method for affixing the base 2722 is not limited to this, and the base 2722 may also be affixed with use of solder or conductive adhesive.

Although in the present embodiment, the lead-in wires 2252 and 2272 are held between the bases 2722, and portions of the glass bulb 2152 cover the electrodes 2172 and 2192 such that the axis direction of the lead-in wires 2252 and 2272 is the same as the axis direction of the glass bulb 2152, the present invention is not limited to this. The lead-in wires 2252 and 2272 may be wound around portions of the glass bulb 2152 that cover the electrodes 2172 and 2192, and held between the portions of the glass bulb 2152 and the bases 2722.

Holding the lead-in wires 2252 and 2272 between the above portions of the glass bulb 2152 and the bases 2722 enables a more reliable electrical connection to the bases 2722 than a case in which the lead-in wires 2252 and 2272 are held in an extended state. In particular, using sleeve-shaped bases 2722 that have slits enables preventing the bases 2722 from failing to enclose the lead-in wires 2252 and 2272, and is preferable from the standpoint of improving yield.

Affixing the bases 2722 to the glass bulb 2152 with use of solder or conductive adhesive is preferable, since the load on the glass bulb 2152 can be reduced over a case of fastening with use of elasticity, and using conductive adhesive is preferable since the heat load on the glass bulb 2152 can be reduced over a case of using solder.

Embodiment 6 Summary

As described above, in the present embodiment, since the bases 2722 have been affixed to portions of the glass bulb 2152 that cover the electrodes 2172 and 2192 while maintaining contact with the lead-in wires 2252 and 2272 and avoiding the sealed portions 2322 and 2332 of the glass bulb 2152, the cold cathode fluorescent lamps 2073 can be supported and electrically connected to the lead-in wires 2252 and 2272 and the socket 2084 on the housing 10 side, and a load that would break the lead-in wires 2252 and 2272 can be suppressed more than when the cold cathode fluorescent lamps are supported by the lead-in wires and are electrically connected to the lead-in wires and the electrical contact on the housing side.

Furthermore, employing this structure enables suppressing, more than in conventional bead sealing, the load on the glass bulb 2152 that experiences great processing strain, while supporting the cold cathode fluorescent lamp 2083 and electrically connecting the cold cathode fluorescent lamp 2073 to the socket 2084 on the housing 10 side.

Accordingly, in the cold cathode fluorescent lamp 2073 pertaining to the present embodiment, the load on the lead-in wires 2252 and 2272 and the end of the glass bulb 2152 is suppressed while the cold cathode fluorescent lamp 2073 is supported and electrically connected.

Also, employing this structure is preferable since the length of the gas exhaust tube 2312 can be made smaller in a longitudinal direction than in embodiment 4, and the percentage of the portion of the cold cathode fluorescent lamp 2073 that does not emit light can be made smaller.

Embodiment 7

Since the present embodiment differs from embodiment 6 only in employing a hot cathode fluorescent lamp as the fluorescent lamp in place of a cold cathode fluorescent lamp, only portions that differ are described below.

Figure 36:
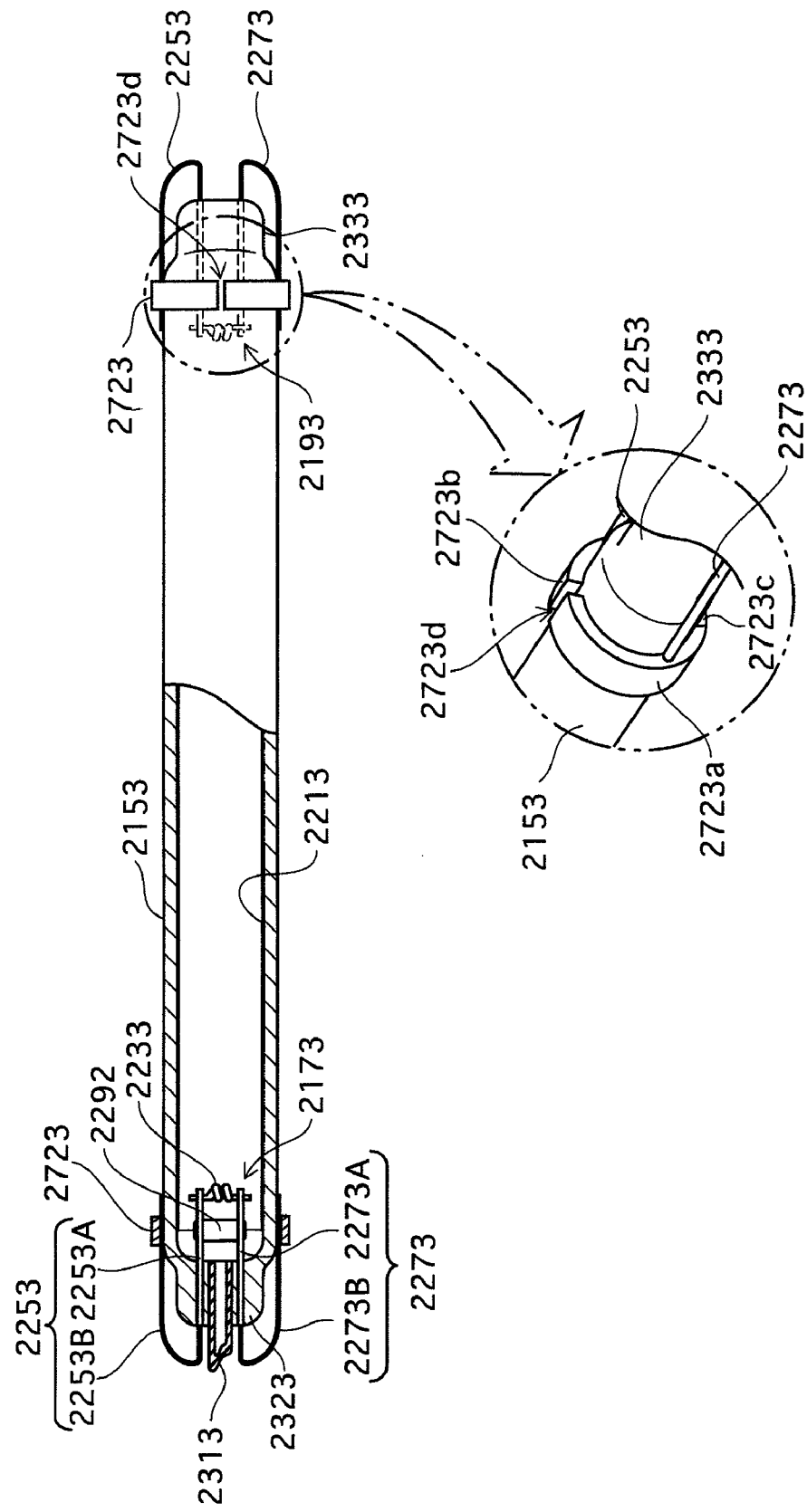
FIG. 36 is an enlarged view of a relevant portion of a hot cathode fluorescent lamp pertaining to embodiment 7.

FIG. 36 is an enlarged view of a relevant portion of the hot cathode fluorescent lamp 2074 pertaining to the present embodiment. As shown in FIG. 36, in the hot cathode fluorescent lamp 2074, the straight tube shaped glass bulb 2153 is filled with a discharge medium, and electrodes 2173 and 2193 have been disposed in the vicinity of the ends of the glass bulb 2153.

In the present embodiment, lead-in wires 2253 and 2273 that project out from the glass bulb 2153 have been folded, and the bases 2723 have been affixed to the glass bulb 2153 body, specifically in a position that covers the electrodes 2172 and 2192 enclosed by the glass bulb 2153 and avoids the sealed portions 2323 and 2333 of the glass bulb 2153 and the vicinity thereof. The lead-in wires 2253 and 2273 are in close contact with the bases 2723 and the glass bulb 2153.

The electrodes 2173 and 2193 include glass stems 2292 that respectively support the lead-in wires 2253 and 2273 in the inner space of the glass bulb 2153, and a filament 2233 that joins the inner ends of the lead-in wires 2253 and 2273 to each other. The bases 2723 have preferably been affixed to the body of the glass bulb 2153 so as to cover the stems 2292 that constitute the electrodes 2173 and 2193.

This is because, since there is a wider gap between the filament 2233 and the inner face of the glass bulb 2153 than in embodiment 6, the phosphor layer 2213, if formed on an inner face of the glass bulb 2153 opposing the electrodes 2173 and 2193, would contribute to light emission.

Electrons contributing to light emission are generated between the filaments 2233 of electrodes 2173 and 2193, and since there is a wider gap between the filaments 2233 and the inner face of the glass bulb 2153 than in embodiment 6, electrons contributing to light emission are highly likely to enter the gap. Accordingly, the bases 2723 and the outward ends of the lead-in wires 2253 and 2273 are preferably disposed as far toward the ends of the glass bulb 2153 (the sealed ends 2323 and 2333) as possible while still being able to be reliably affixed to the glass bulb 2153.

Although in the present embodiment, the bases 2723 are preferably disposed as described above, if the bases 2723 can be reliably affixed to a non-phosphor layer 2213 area that exists on the glass bulb 2153, affixing the bases 2723 to that area is most preferred.

As shown in the partial enlarged view of FIG. 36, the bases 2723 are constituted from conductive parts 2723*a* and 2723*b* and an insulating part 2723*c*, and also have a slit 2723*d*. The insulating part 2723*c* and the slit 2723*d* electrically insulate the conductive parts 2723*a* and 2723*b* in the sleeve-shaped bases 2723. For example, on one end, the lead-in wire 2253 is in close contact with the conductive part 2723*b* of the base 2723 and the glass bulb 2153, and on the other end, the lead-in wire 2273 is in close contact with the conductive part 2723*b* of the base 2723 and the glass bulb 2153. By employing this structure, when power is supplied from the socket 2084 on the housing 10 side upon lighting the lamp, power can be passed through a filament 2233 and the filament 2233 can be heated without causing a short circuit between the lead-in wires 2253 and 2273, and subsequently can prompt electrical discharge to occur between the electrodes 2172 and 2192. Note that the sleeve shape of the base 2723 is maintained even after affixing the base 2723. In other words, the base 2723, when affixed, has the slit 2723*d*. Since this structure is employed in the base 2723, the conductive parts 2723*a* and 2723*b* can remain electrically insulated from each other even after the base is affixed.

Solder or electrically conductive adhesive is used in the method for affixing the bases 2723. Affixing with an electrically conductive adhesive is preferable, since this results in a lower heat load on the glass bulb 2153 than when affixed with use of solder.

Embodiment 7 Summary

Although the hot cathode fluorescent lamp 2074 is used as the fluorescent lamp in the present embodiment unlike the cold cathode fluorescent lamp 2073 used in embodiment 6, similarly to embodiment 6, the bases 2723 have been affixed to the glass bulb 2153 body, specifically locations that respectively cover the electrodes 2173 and 2193 enclosed by the glass bulb 2153 while avoiding the sealed portions 2323 and 2333 of the glass bulb 2153 and the vicinity thereof, and therefore the present embodiment enables suppressing, more than in conventional bead sealing, the loads on the lead-in wires 2253 and 2273 and on the glass bulb 2153 that experience great processing strain while supporting the hot cathode fluorescent lamp 2084, and electrically connecting the hot cathode fluorescent lamp 2074 to the socket 2084 on the housing 10 side.

Accordingly, similarly to embodiment 6, the hot cathode fluorescent lamp 2074 pertaining to the present embodiment is supportable and electrically connectable, and suppresses the load on the lead-in wires 2253 and 2273 and the end of the glass bulb 2153.

Embodiment 8

Characteristic features of the present embodiment are that the bases have been omitted from the constituent elements of the cold cathode fluorescent lamps, and to supply power to the electrodes enclosed in the glass bulb, the lead-in wires that project out from the glass bulb have been directly brought into contact with the socket that is the electrical contact on the backlight unit side. Since other aspects of the structure are substantially similar to embodiment 4, only the characteristic portion is described, and description of other parts is omitted.

Figure 37:
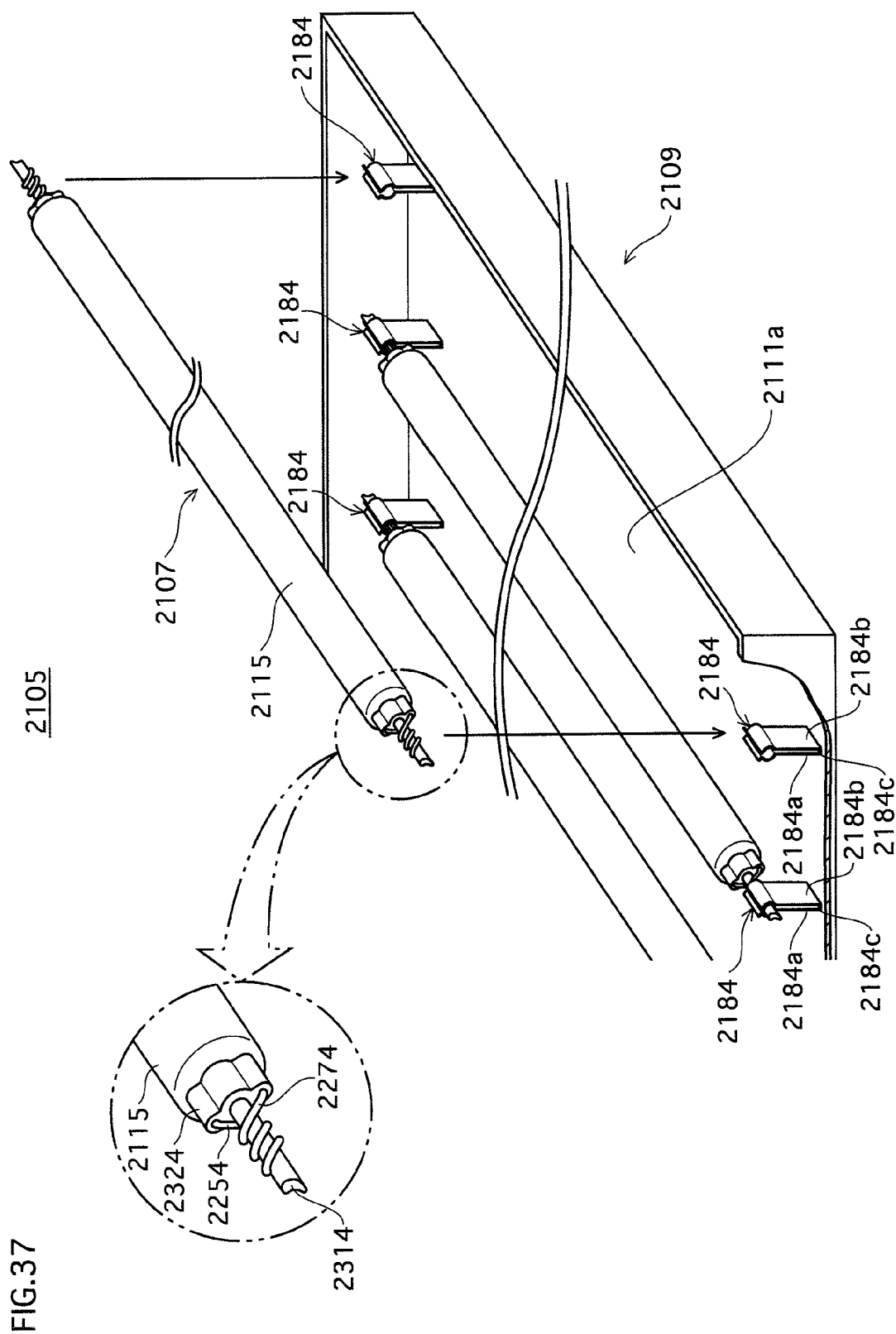
FIG. 37 is a perspective view of a relevant portion of a backlight unit pertaining to embodiment 8.

FIG. 37 is a perspective view of a relevant portion of a backlight unit 2105, and one portion of an optical sheet or the like has been omitted to show the interior thereof. As shown in FIG. 37, on a bottom wall 2111*a* of a housing 2109 that is part of the backlight unit 2105, a socket 2184 has been provided in a position corresponding to a peripheral area of the optical sheet or the like.

Also, lead-in wires 2254 and 2274 that extend from the sealed portions 2324 and 2334 of the glass bulb 2155 end that is part of the cold cathode fluorescent lamp 2107 are wound around the similarly extending gas exhaust tube 2314, and the extending portions of the gas exhaust tube 2314 having the lead-in wires 2254 and 2274 wound thereon are fitted into the sockets 2184, so that the cold cathode fluorescent lamp 2107 is held by, and electrically connected to, the housing 2109.

One of each set of the sockets 2184 has been set to be unipolar, and the two lead-in wires 2254 and 2274 that extend from both ends of the glass bulb 2115 can be set to be unipolar.

Each of the sockets 2184 in the backlight unit 2105, due to having respective extending portions of the gas exhaust tube 2314 fit therein while maintaining contact with the lead-in wires 2254 and 2274, support the cold cathode fluorescent lamps 2107 and electrically connect to the lead wires 2254 and 2274, and a load that would break the lead-in wires 2254 and 2274 can be suppressed more than when the cold cathode fluorescent lamps are supported by the lead-in wires and are electrically connected to the lead-in wires and the electrical contact on the housing side.

Furthermore, this structure enables the cold cathode fluorescent lamps 2107 to be supported by the sockets 2184 and electrically connected thereto, and a load on the end of the glass bulb 2115 that experiences processing strain can be suppressed more than in conventional bead sealing.

Although in the present embodiment, the extending portions of the gas exhaust tube 2314 having the lead-in wires 2254 and 2274 wound thereon have been fitted into the sockets 2184 of the housing 2109, the present invention is not limited to this, and the lead-in wires 2254 and 2274 may be joined to the sockets 2184 while the lead-in wires 2254 and 2274 extend from the sealed portions 2324 and 2334 of the glass bulb 2115. In such a case, inserting the lead-in wires 2254 and 2274 into the sockets 2184 after being temporarily fastened to a double-sided insulating tape having a width that is smaller than the length in the lengthwise direction of the sockets 2184 that has been wound around the gas exhaust tube 2314 is preferable since the lead-in wires 2254 and 2274 can be reliably inserted into the sockets 2184.

Winding the lead-in wires 2254 and 2274 around the extending portions of the gas exhaust tube 2314 enables reliable electrical connection to the sockets 2184, particularly since the sockets 2184 are sleeve-shaped and the lead-in wires 2254 and 2274 can be prevented from spilling out. Therefore, winding the lead-in wires 2254 and 2274 is preferable, from a standpoint of increasing yield, over inserting unwound, extended lead-in wires 2254 and 2274 and the gas exhaust tube 2314 into the sockets 2184 at the same time.

Although in the present embodiment, pressure is applied to the sockets 2184, and the pressure is used to fasten together the sockets 2184 and the extended portions of the gas exhaust tube 2314 on which the lead-in wires 2254 and 2274 have been wound, fastening with use of solder or conductive adhesive is preferable since the load on the gas exhaust tube 2314 can be reduced over a case of fastening with the pressure, and using conductive adhesive is preferable over using solder since the heat load on the gas exhaust tube 2314 can be reduced.

In the present embodiment, the sockets 2184 are separated from the sealed portions 2324 and 2334 of the glass bulb 2115. The gas exhaust tube 2314 has been fitted into the inner face of the sockets 2184, which is in contact with the lead-in wires 2254 and 2274.

Specifically, ends of the sockets 2184 on the sides closest to the sealed portions 2324 and 2334 are 0.5 [mm] or more away from the sealed portions 2324 and 2334 of the glass bulb 2115, and the gas exhaust tube 2314 has been fitted into the sockets 2184.

There is processing strain on portions of the gas exhaust tube 2314 that are covered by the sealed portions 2324 and 2334 of the glass bulb 2115 when the sealed portions 2324 and 2334 are being formed. Since the gas exhaust tube 2314 and the glass bulb 2115 are fundamentally different materials, a large number of tiny air gaps are likely to exist at the point of contact. Accordingly, when the gas exhaust tube 2314 is fitted into the sockets 2184 so that the sockets 2184 are in contact with the sealed portions 2324 and 2334, there is stress on the connected portions due to differences in temperature in the sockets 2184 and the gas exhaust tube 2314 depending on whether the lamp is lit or unlit. The stress may cause cracks to develop easily, and discharge gas filling an inner part of the glass bulb may leak from the cracks, hindering lighting the lamp.

The present embodiment is preferable since the sockets 2184 are separated from the sealed portions 2324 and 2334 of the glass bulb 2115, thereby enabling suppressing stress; development of cracks, and the discharge gas leak described above.

The present embodiment, since the sockets 2184 have a sleeve shape, is preferable over having a cap-shaped socket, since the socket is affixed without covering the ends of the gas exhaust tube that are outside of the outer ends of the glass bulb 2314.

Since the outer ends of the gas exhaust tubes 2314 are tipped off and sealed after gas is supplied to, and discharged from, the space inside the glass bulb 2015 as described above, processing strain occurs on the ends. When the cap-shaped sockets 2184 are made to cover the ends that experience processing strain, stress occurs on the ends due to a difference in temperature between the sockets 2184 and the gas exhaust tube 2314 when the lamp is lit or extinguished, cracks develop easily on the ends due to the stress, and there are cases when discharge gas leaks out of the cracks in the glass bulb, leading to hindrances in lighting the lamps.

The present embodiment is preferable since the sleeve-shaped sockets 2184 are used, and the gas exhaust tube 2314 has been fitted therein without the sockets 2184 covering the end of the gas exhaust tube 2314 on the outside of the glass bulb 2115, thereby enabling suppressing the occurrence of stress, the development of cracks at the point of contact, and the discharge gas leak described above.

Embodiment 8 Summary

As described above, in the present embodiment, the sockets 2184 are in contact with the lead-in wires 2254 and 2274, the extending portions of the gas exhaust tube 2314 have been fitted in the sockets 2184, and the cold cathode fluorescent lamps 2107 are supported by, and electrically connected to, the sockets 2184 of the housing 2109 while a load on the lead-in wires 2254 and 2274 is suppressed more than when the cold cathode fluorescent lamps are supported by the lead-in wires and electrically connected to the lead-in wires and an electrical contact on the housing side.

Furthermore, employing this structure enables the cold cathode fluorescent lamps 2107 to be supported and electrically connected to the sockets 2184 of the housing 2109, and the load on the end of the glass bulb 2115 that experiences processing strain can be suppressed more than in conventional bead sealing.

Accordingly, the backlight unit 2105 pertaining to the present embodiment can suppress the load on the lead wires 2254 and 2274 and the ends of the glass bulb 2115, and electrically connect and support the cold cathode fluorescent lamps 2107.

Also, in the present embodiment, since the sockets 2184 of the housing 2109 have been separated from the sealed portions 2324 and 2334 of the glass bulb 2115, have the gas exhaust tubes 2314 fit therein, and have contact with the lead-in wires 2254 and 2274, stress on the gas exhaust tubes 2314 can be suppressed, the load can be suppressed on the gas exhaust tube 2314, and the cold cathode fluorescent lamps 2107 can be more reliably electrically connected and supported.

Additionally, since the present embodiment uses a sleeve-type socket 2184, which is affixed to the gas exhaust tube 2031 so as not to cover the ends of the gas exhaust tube 2031 on the outer ends of the glass bulb 2015, stress on the gas exhaust tube 2314 can be suppressed, the load on the gas exhaust tube 2314 can be suppressed, and the cold cathode fluorescent lamps 2107 can be electrically connected and supported more reliably.

Embodiment 9

Since the present embodiment differs from embodiment 8 only in employing a hot cathode fluorescent lamp as the fluorescent lamp in place of a cold cathode fluorescent lamp, only portions that differ are described below.

Figure 38:
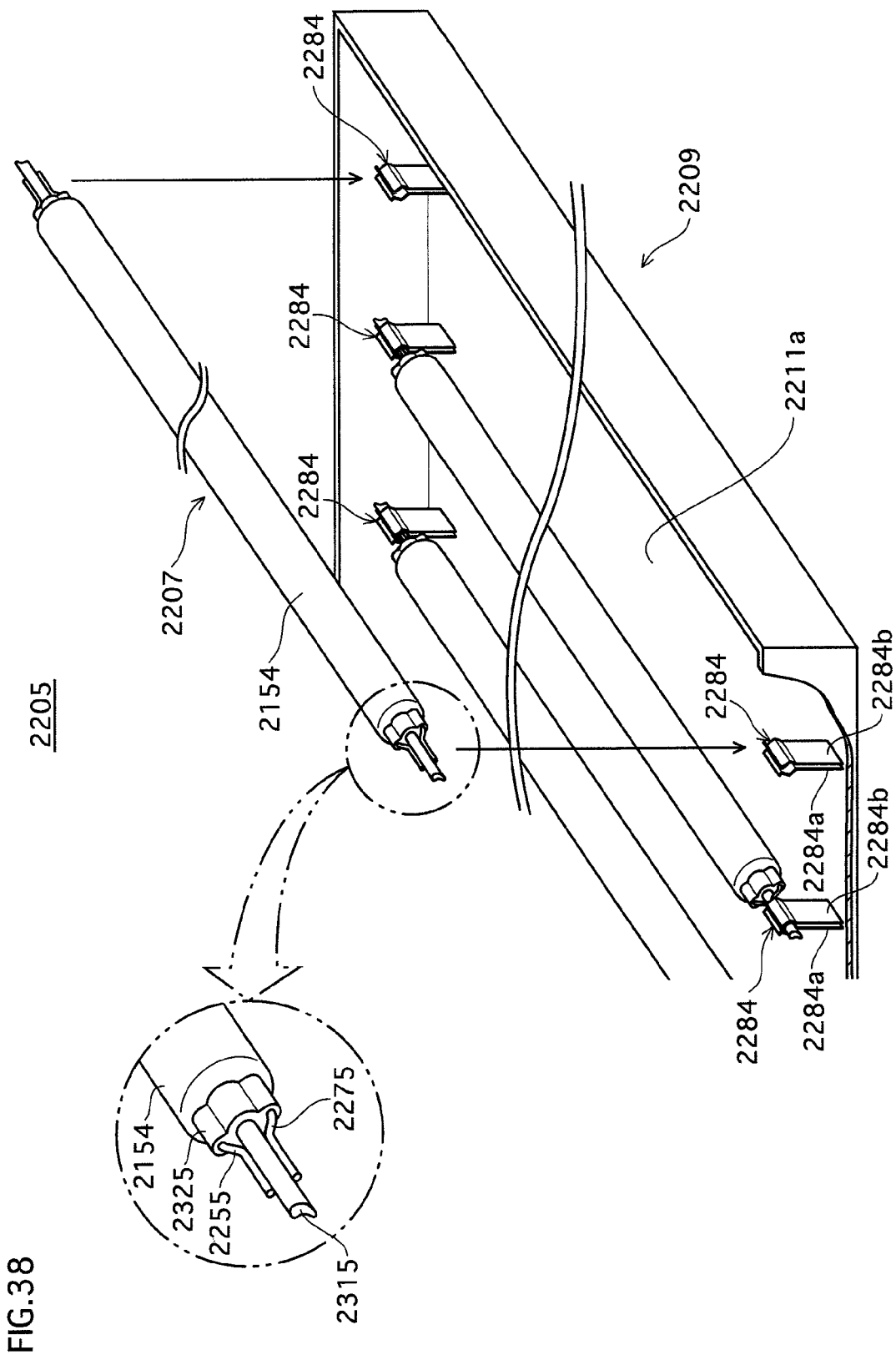
FIG. 38 is a perspective view of a relevant portion of a backlight unit pertaining to embodiment 9.

FIG. 38 is a perspective view of a relevant portion of a backlight unit 2205 of the present embodiment, and an optical sheet or the like has been cut away to show the interior.

In the present embodiment, a hot cathode fluorescent lamp 2207 is used, and lead-in wires 2255 and 2275 extending from sealed portions 2325 and 2335 of the ends of a glass bulb 2154 that constitutes the hot cathode fluorescent lamp conform to similarly extending gas exhaust tubes 2315. Extending portions of the gas exhaust tube 2315 parallel to the lead-in wires 2255 and 2275 have been fit into sockets 2284, and the hot cathode fluorescent lamp 2207 is electrically connected to, and supported by, a housing 2209.

In such a case, a double-sided insulating tape having a width that is smaller than the length of the sockets 2284 is wound around the gas exhaust tube 2315, the lead-in wires 2255 and 2275 are temporarily fastened to the tape, and the lead-in wires 2255 and 2275 are inserted into the sockets 2284. This prevents the lead-in wires 2255 and 2275 from spilling out, enables the lead-in wires 2255 and 2275 to be reliably inserted into the sockets 2284, and is preferable from the standpoint of increasing yield.

In the present embodiment, each of the sockets 2284 has a two-piece structure, and a current pathway can be formed between the two lead-in wires 2255 and 2275 extending from respective ends of the glass bulb 2154 and filaments (not depicted) of electrodes enclosed in the glass bulb 2154. The structure of the sockets 2284 is not limited to this, and may physically be a single piece that is electrically insulated so that the current pathway can be formed.

Also, in the present embodiment, a cross section of portions of the pieces of the sockets 2284 that support the lead-in wires 2255 and 2275 and the gas exhaust tube 2315, taken perpendicular to the axis of the gas exhaust tube 2315, has a curved shape. Specifically, in the supporting portions of the pieces of the sockets 2284, inner walls facing the lead wires 2255 and 2275 and the gas exhaust tube 2315 fold inward, and the lead-in wires 2255 and 2275 conforming to the surface of the gas exhaust tube 2315 have been fitted into the inwardly folding inner walls. By having this structure, the present embodiment enables suppressing short circuits in the lead-in wires 2255 and 2275 between the pieces that form the sockets 2284 more than when the cross section of portions of the supporting pieces of the sockets 2284 taken perpendicular to the axis of the gas exhaust tube 2315 has a circular arc shape.

Since the sockets 2284 maintain contact with the lead-in wires 2255 and 2275 and respective extending portions of the gas exhaust tube 2315 have been fitted into each of the sockets 2284, this structure enables suppressing a load that would cause the lead wires 2255 and 2275 to break, and supporting the hot cathode fluorescent lamps 2207 with the socket 2284 and electrically connecting the lamps 2207 to the lead-in wires 2255 and 2275 and the socket 2284, more than a case in which hot cathode fluorescent lamps are supported by the lead-in wires, and the lamps are electrically connected to the lead-in wires and an electrical contact on the housing side.

Furthermore, employing this structure enables the hot cathode fluorescent lamps 2207 to be supported by, and electrically connected to, the sockets 2284 and suppressing a load on ends of the glass bulb 2154 that experience processing strain more than a case of conventional bead sealing.

Although in the present embodiment, pressure is applied to the socket 2284, and the pressure is used to fasten together the socket 2284 and the extended portions of the gas exhaust tube 2314 on which the lead-in wires 2255 and 2275 have been wound, fastening with use of solder or conductive adhesive is preferable since the load on the gas exhaust tube 2314 can be reduced over a case of fastening with the pressure, and using conductive adhesive is preferable over using solder since the heat load on the gas exhaust tube 2314 can be reduced.

Embodiment 9 Summary

As described above, since the sockets 2284 maintain contact with the lead-in wires 2255 and 2275 and respective extending portions of the gas exhaust tube 2315 have been fitted into the sockets 2284, the present embodiment enables supporting the hot cathode fluorescent lamps 2207, electrically connecting the hot cathode fluorescent lamps 2207 to the lead-in wires 2255 and 2275 and the socket 2284, and suppressing the load on the lead wires 2255 and 2275 more than a case in which hot cathode fluorescent lamps are supported by the lead-in wires, and the lamps are electrically connected to the lead-in wires and an electrical contact on the housing side.

Furthermore, employing this structure enables suppressing, more than in conventional bead sealing, the load on the glass bulb 2154 that experiences great processing strain, and electrically connecting the hot cathode fluorescent lamp 2207 to the lead-in wires and the socket 2284 of the housing 2209 while supporting the hot cathode fluorescent lamp 2207.

Accordingly, the backlight unit 2205 pertaining to the present embodiment can suppress the load on the lead wires 2255 and 2275 and the ends of the glass bulb 2154, and electrically connect and support the hot cathode fluorescent lamps 2207.

Also, similarly to embodiment 5, in the present embodiment, since the sockets 2284 of the housing 2209 have been separated from the sealed portions 2325 and 2335 of the glass bulb 2154 and respective portions of the gas exhaust tube 2315, which maintains contact with the lead-in wires 2255 and 2275, have been fitted in the sockets 2284, the hot cathode fluorescent lamps 2071 can be electrically connected and supported more reliably.

Moreover, since the present embodiment, similarly to embodiment 5, uses sleeve-shaped sockets 2284 that do not cover the ends of the gas exhaust tube 2315 on the outer ends of the glass bulb 2154 when affixed to the gas exhaust tube 2315, stress on the gas exhaust tube 2315 can be suppressed, the load on the gas exhaust tube 2315 can be suppressed, and the hot cathode fluorescent lamps 2207 can be electrically connected and supported more reliably.

Supplementary Remarks on Embodiments 4 to 9

Alternating the Lamps

Figure 39:
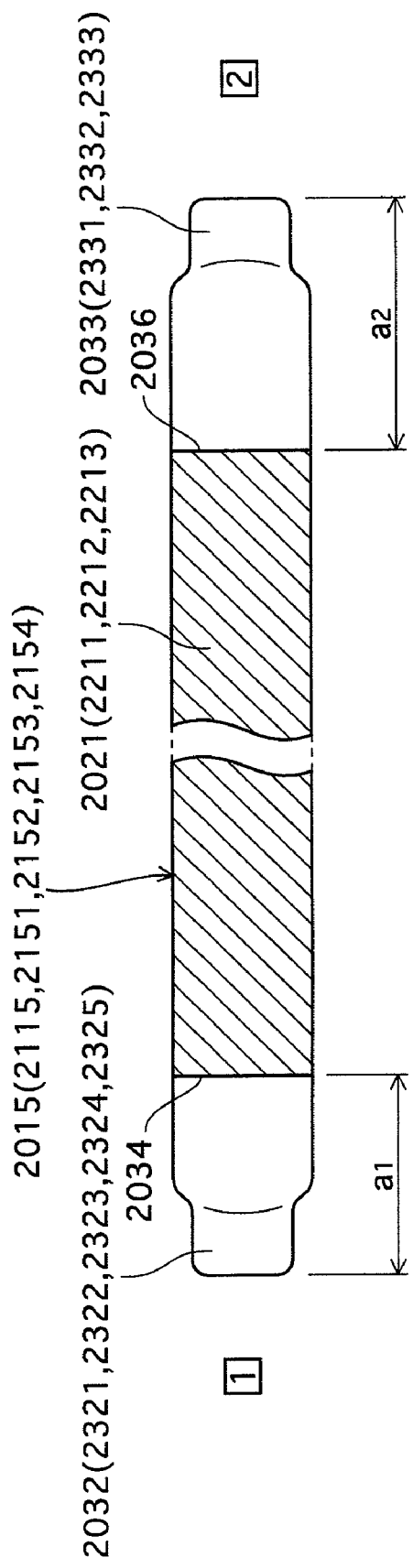
FIG. 39 is a pattern diagram showing areas where phosphor layers have formed on the glass bulb.

FIG. 39 is a pattern diagram showing areas where phosphor layers have formed on the glass bulb.

Since the areas of phosphor layer formation are described with reference to FIG. 39, description is omitted of other constituent elements indicated in the above embodiments, such as the bases 2072, 2721 and 2722, the gas exhaust tubes 2031, 2311, 2312, 2313, 2314, and 2315, and lead-in wires 2025 and 2027.

As shown in FIG. 39, similarly to embodiment 1, a2 is longer than a1 (a2>a1) when a1 is the distance from a boundary 2034 (a boundary between a phosphor layer 2021 (2211, 2212, 2213) area and a non-phosphor layer area) to an end on a first sealed portion 2032 (2321, 2322, 2323, 2324, 2325) side (length of the non-phosphor layer area), and a2 is the length from a boundary 2036 to an end on a second sealed portion 2033 (2331, 2332, 2333) side.

The measurements are, for example, as follows.

a1=8.0 [mm], a2=10.0 [mm].

As described in embodiment 1, the differing distances a1 and a2 can be used for detecting the orientation of a lamp.

Manufacturing Method for Cold Cathode Fluorescent Lamps

Next, regarding a manufacturing method for the cold cathode fluorescent lamps 2007 (2071, 2073, 2074, 2107, 2207) having the structure described above, the method is described focusing particularly on details of the formation of the phosphor layer and both sealed portions. Although the example of a cold cathode fluorescent lamp is used in the following description, needless to say, the manufacturing method is also applicable when a hot cathode fluorescent lamp is used.

Figure 40:
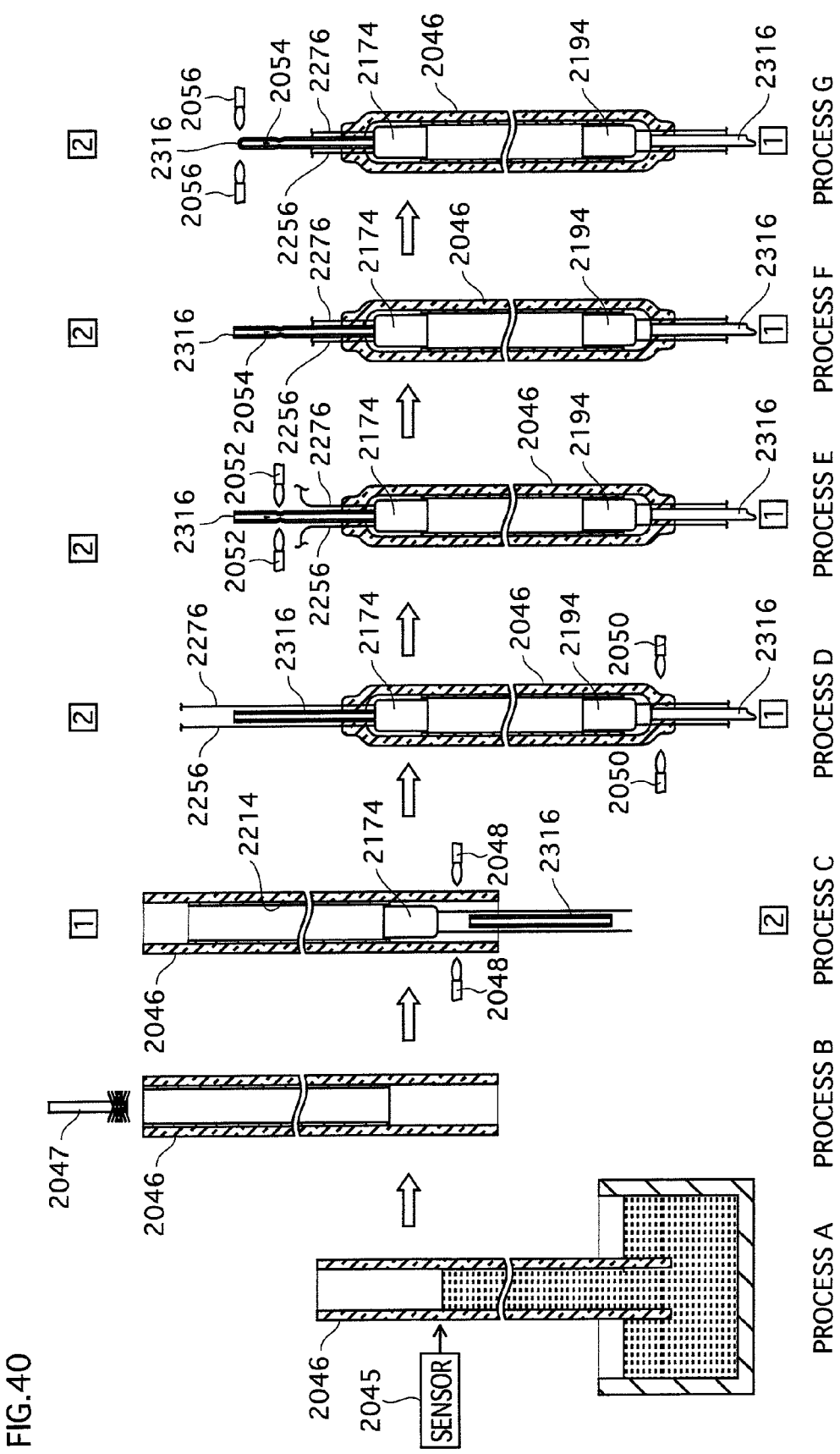
FIG. 40 is an outline process drawing showing a manufacturing process for a cold cathode fluorescent lamp.
Figure 41:
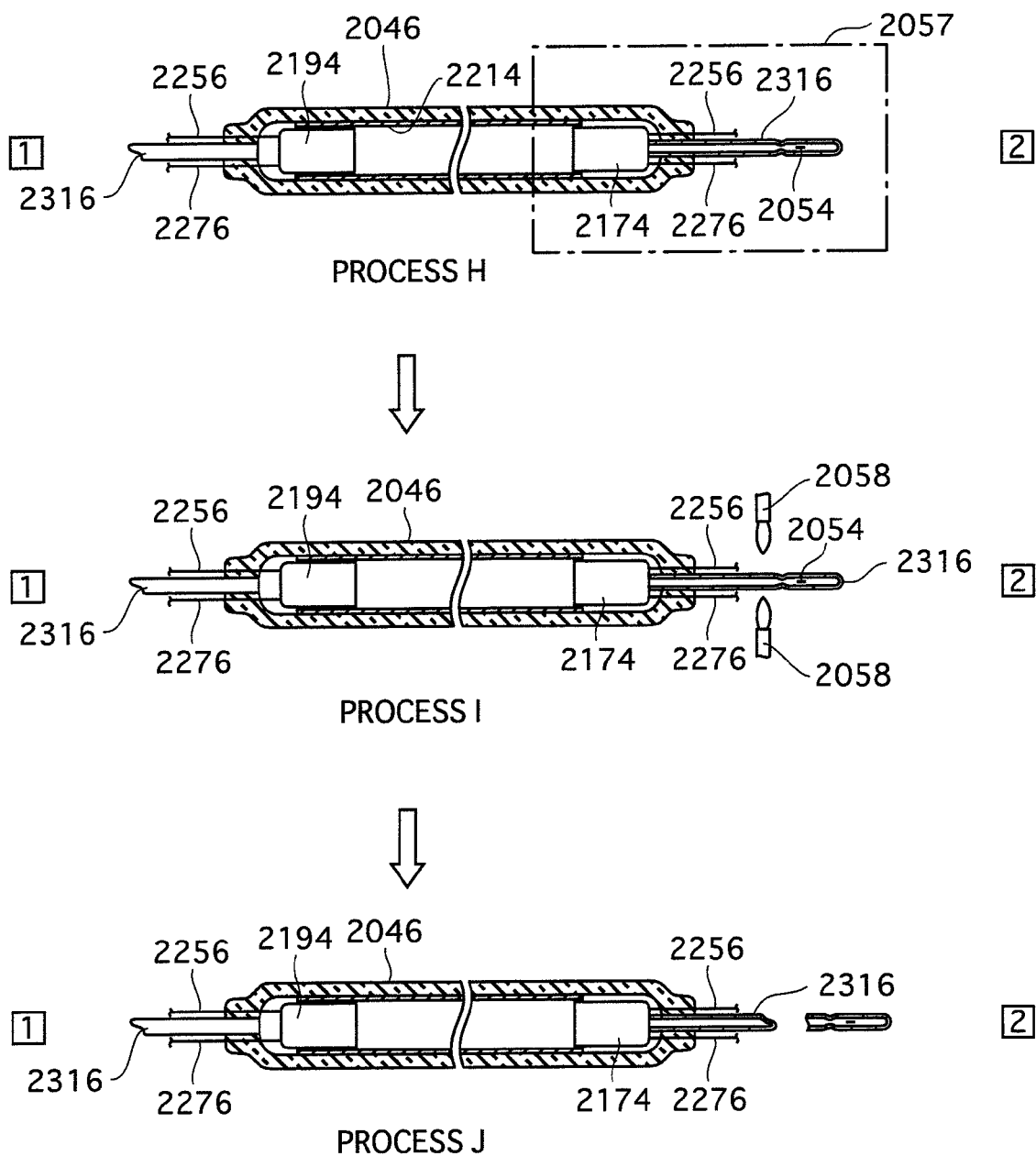
FIG. 41 is an outline process drawing showing a manufacturing process for a cold cathode fluorescent lamp.

FIGS. 40 and 41 are outline process drawings showing a manufacturing process for cold cathode fluorescent lamps 2020. The manufacturing process shown in FIGS. 40 and 41 is similar in most aspects to the process shown in FIGS. 3 and 4. Following is a simple description of the aspects in common, and a detailed description of differing aspects such as how a gas exhaust tube 2316 is inserted and pinch sealed.

First, a prepared straight tube shaped glass tube 2046 is immersed into a tank containing a phosphor suspension liquid. Creating a negative pressure in the glass tube 2046 allows the glass tube 2046 to suction a portion of the phosphor suspension liquid from the tank, causing the phosphor suspension liquid to be applied to the inner face of the glass tube 2046 (process A).

Next, after drying the phosphor suspension liquid applied to the inner face of the glass tube 2046, a brush 2047 is inserted into the glass tube 2046, and any unnecessary phosphor in a phosphor layer 2214 is removed from the end of the glass tube 2046 (process B).

After inserting an electrode 2174 and the gas exhaust tube 2316 in the glass tube 2046 on which the phosphor layer 2214 has been formed, while preserving airflow in the tube axis direction of the gas exhaust tube 2316, one end (on the second sealed portion side) of the glass tube 2046 is heated by a burner 2048 and pinch sealed (process C).

Also, the margin of error from a setting value of the position of the seal is 0.5 [mm].

Next, after inserting the electrode 2194 and the gas exhaust tube 2316 into the glass tube 2046 from the opposite open side, the other end is pinch sealed. Thereafter, the end of the gas exhaust tube 2316 in which airflow is preserved in a tube axis direction is tipped off to be airtight (process D).

Also, the margin of error is 0.5 [mm] from a setting value of the seal position, the same as on the opposite side.

The insertion position of the electrode 2174 in process C and the insertion position of the electrode 2194 in process D are adjusted so that the lengths from both ends of the sealed glass tube 2046 to the respectively extending non-phosphor layer 2214 areas are different from each other. The electrode 2194 on the first sealed portion side is inserted more deeply respective to a position overlapping the phosphor layer 2214 than the electrode 2174 on the second sealed portion side. After heating, with use of a burner 2052, an end (second sealed portion) of the gas exhaust tube 2316 in which airflow has been preserved and forming a constricted portion, a mercury pellet 2054 is inserted into the gas exhaust tube 2316 (process E). The mercury pellet 2054 is formed by impregnating mercury into a titanium-tantalum-iron sinter.

Thereafter, gas is discharged from the glass tube 2046 and the glass tube 2046 is filled with the noble gas (process F). Specifically, the head of an gas exhaust apparatus, not depicted, is attached to the glass tube 2046 on the mercury pellet 2054 side. After discharging the gas in the glass tube 2046 to create a vacuum, the entire outer surface of the glass tube 2046 is heated by a heating apparatus that is not depicted. The heating temperature is approximately 380[° C.] on the outer circumference surface of the glass tube 2046. Accordingly, impure gas included in the glass tube 2046 is discharged, including impure gas that has infiltrated the phosphor layer 2214. After heating is stopped, the glass tube 2046 is filled with a predetermined amount of noble gas.

After the glass tube 2046 has been filled with the noble gas, the mercury pellet 2054 side end of the gas exhaust tube 2316 is heated on the second sealed portion side by a burner 2056 and sealed (process G).

Subsequently, in process H shown in FIG. 41, the mercury pellet 2054 is induction-heated by a high-frequency oscillation coil (not depicted) disposed in the surrounding area of the glass tube 2046, and the mercury is flushed out of the sinter (mercury discharge process). Thereafter, the glass tube 2046 is heated in a furnace 2057, and the flushed-out mercury is transferred to the electrode 2194 on the first sealed portion side.

Next, in such a way that a necessary length remains on the side of the electrodes 2174 and 2194 more than on the constricted portion formed in process E, the gas exhaust tube 2316 is heated by a burner 2058, tipped off, and sealed so as to be airtight (processes I and J). The margin of error from the setting value of the sealed position of the second seal of is 0.5 [mm].

After performing the processes described above, the fluorescent lamps are completed.

Identifying Marks

Variation 12

In the glass bulbs of embodiments 4 to 9, one portion of the phosphor layer on the inner circumference (inner face) of the glass bulb may be retained separately, and the retained portion may be used as the identifying mark of lengthwise direction orientation. The following describes variation 12 pertaining to embodiments 4 to 9.

Figure 42:
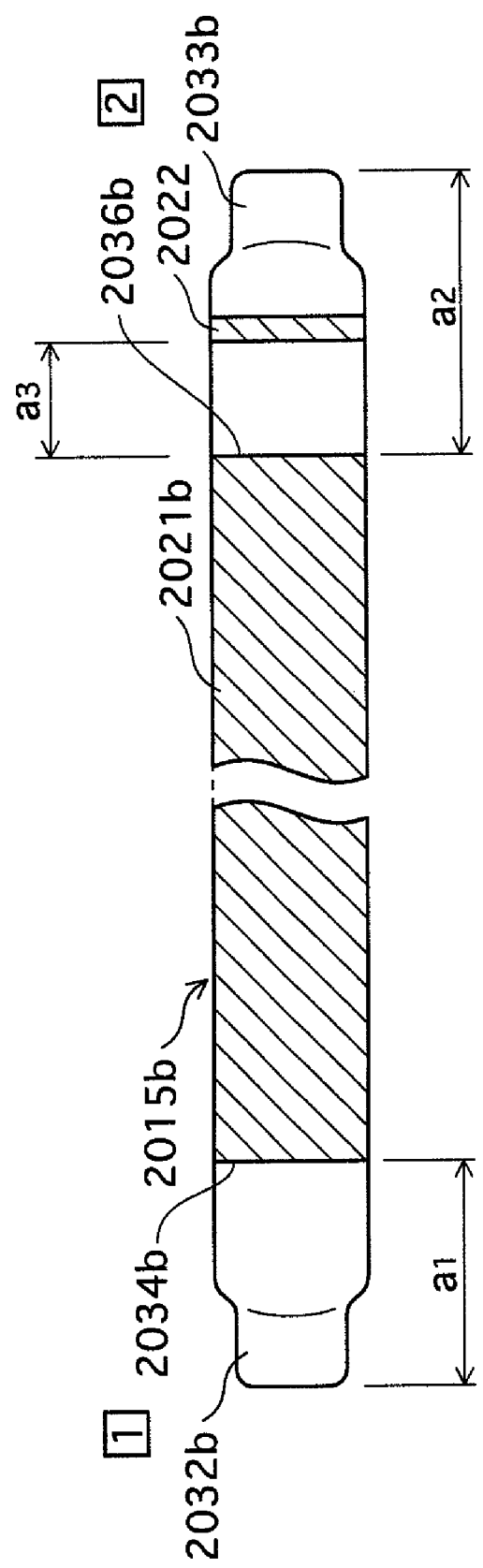
FIG. 42 is a schematic pattern diagram showing a glass bulb pertaining to variation 12 of embodiments 4 to 9.

As shown in FIG. 42, a phosphor layer 2022 that is separate from the phosphor layer 2021b has been formed on the second sealed portion 2033b side of the glass bulb 2015b. Due to being in a position outside the discharge area between the electrodes 2017 and 2019, the phosphor layer 2022 is a phosphor layer that does not substantially contribute to light emission.

In the present variation, for example, distance a3 from the boundary 2036b to the phosphor layer 2022 can be used for detection. Also, since the identifying mark is the phosphor layer, luminance caused by ultraviolet irradiation can be used for detection, and a sensor having a simple structure can be used.

Variation 13

Even when identifying marks are not separately applied to the glass bulb 2015b, orientation detection in the lengthwise direction can be realized by modifying the structural members originally provided in the lamps. The following describes such a case as variation 13 of embodiments 4 to 9.

Figure 43A:
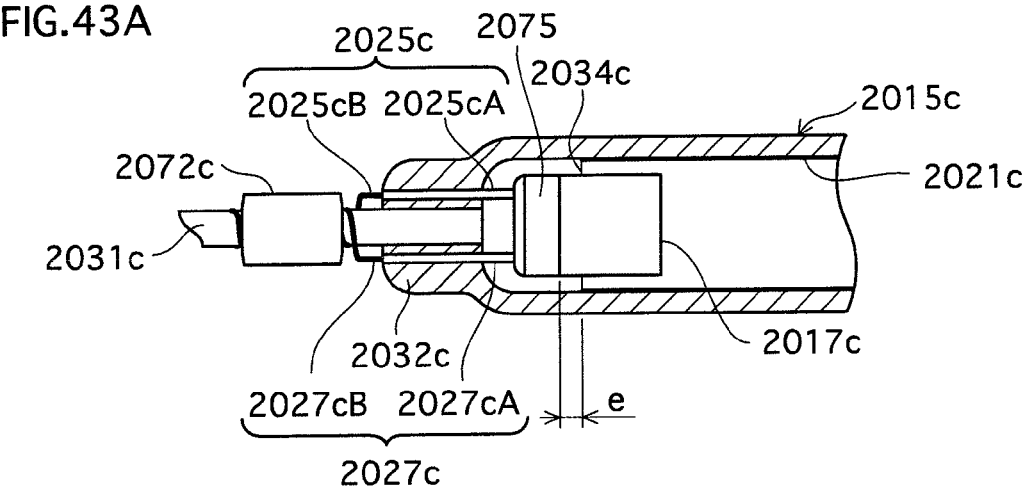
FIGS. 43A, 43B, and 43C are pattern diagrams showing schematic structures of glass bulbs pertaining to variation 13 of embodiments 4 to 9.
Figure 43B:
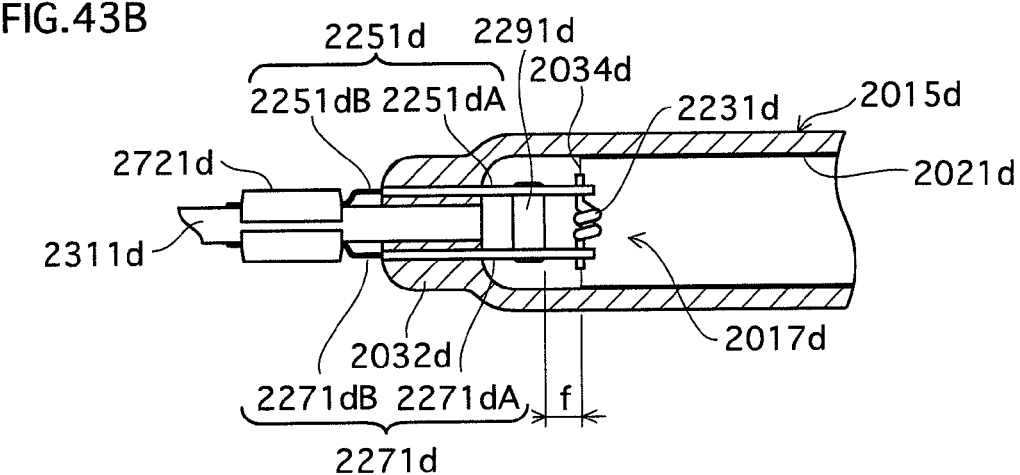
Figure 43C:
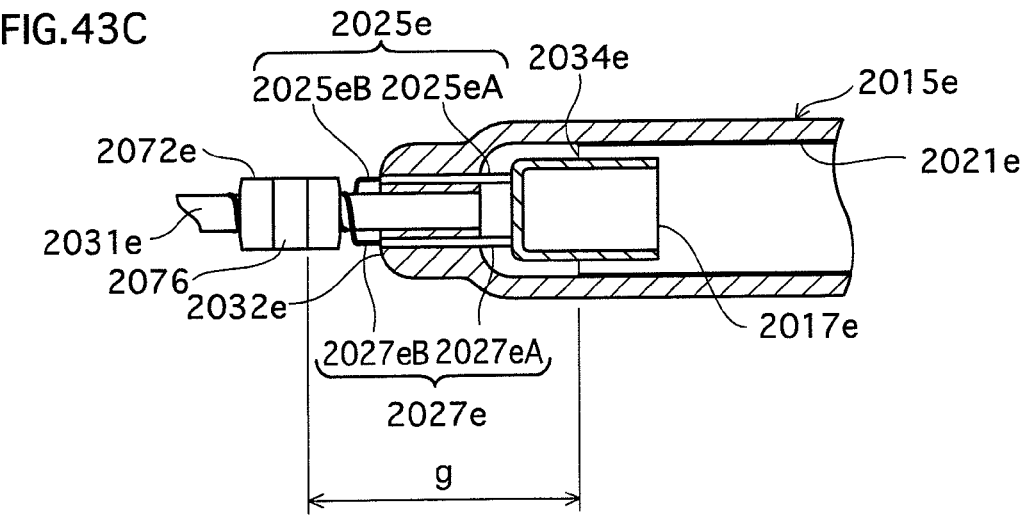

FIGS. 43A, 43B, and 43C are pattern diagrams showing a schematic structure of the glass bulb pertaining to variation 13. FIGS. 43A and 43B show the glass bulbs 2015c and 2015d and the phosphor layers 2021c and 2021d in cross section, and the lead-in wires 2025c, 2027c, 2251d, 2271d and the electrodes 2017c and 2017d from the outside. Also, in FIG. 43C, a cross section is shown in order to illustrate the shape of the electrode 2017e. Note that in FIGS. 43A, 43B, and 43C, description of structural elements similar to FIG. 34 is omitted.

In the example of FIG. 43A, a mark 2075, used for detecting orientation, has been applied to the lower center of the revolution direction of a cylinder-shaped electrode 2017c (hatching in the drawing indicates coloration).

In such a case, distance e from the boundary 2034c to the ring-shaped mark 2075 can be used for detection. Since more fade-resistant and vividly colored marks can be made on the electrode 2017 than on the outer circumference of the glass bulb, marking the electrode 2017 enables improving sensor precision.

FIG. 43B shows an exemplary application for a hot cathode fluorescent lamp, and coloring has been added to a glass stem 2291d that supports inner lead wires 2251dA and 271dA that are connected to filaments 2231d. In this example, distance f from a boundary 2034 to the glass stem 2291d can be used for detection. Since the glass stem 2291d can be detected from any direction regardless of the revolution direction of the glass bulb 2015d, the sensing equipment can be simplified.

In the example of FIG. 43C, a mark 2076 has been applied to the revolution direction of the base 2072e. In this example, distance g from a boundary 2034c to the mark 2076 can be used for detection. Similarly to the mark 2075, the mark 2076 can be detected from any direction regardless of the revolution direction of the glass bulb 2015e.

Although the shape of the electrode 17e is a bottomed tube, the shape is not limited to this, and may be a tube that is open on both ends, or a rod shape.

Embodiment 10

The present embodiment provides a fluorescent lamp that, due to modifying the mixed gas composition, does not have problems pertaining to luminance maintenance rate when substituted for an existing cold cathode fluorescent lamp, and whose luminous efficiency has been improved further.

The present embodiment is described with reference to the drawings, and a cold cathode fluorescent lamp is used as an example of a fluorescent lamp.

Since the structure of the cold cathode fluorescent lamp pertaining to the present embodiment is basically similar to the cold cathode fluorescent lamp shown in FIG. 2, description of the structure is omitted. Since the composition of the noble gas that fills the lamps 20 and the charged pressure are different, these differences are described in detail below.

Here, as described above, it is generally thought that lowering the charged pressure of the noble gas improves the luminous efficiency of the lamps. To confirm this, the inventors of the present invention performed an experiment to investigate how charged pressure influences luminous efficiency.

The outer diameter of the glass bulb of the cold cathode fluorescent lamp used in the experiment is 3 [mm], the inner diameter is 2 [mm], and the total length is 450 [mm]. Also, the glass bulb has been filled with a mixed gas including neon and argon at a partial pressure rate of 90[%] and 10[%] respectively.

Cold cathode fluorescent lamps having different charged pressures (total pressures) of the noble mixed gas at 25[° C.] were manufactured. There were five types of charged pressure, 10 [Torr], 20 [Torr], 40 [Torr], 60 [Torr], and 80 [Torr]. There were also four types of drive current flowing in the cold cathode fluorescent lamps for the various charged pressures, 4 [mA], 6 [mA], 8 [mA], and 10 [mA]. In view of the temperature environment in the backlight unit, the surrounding temperature when the lamps are lit was set at 50[° C.].

Figure 44:
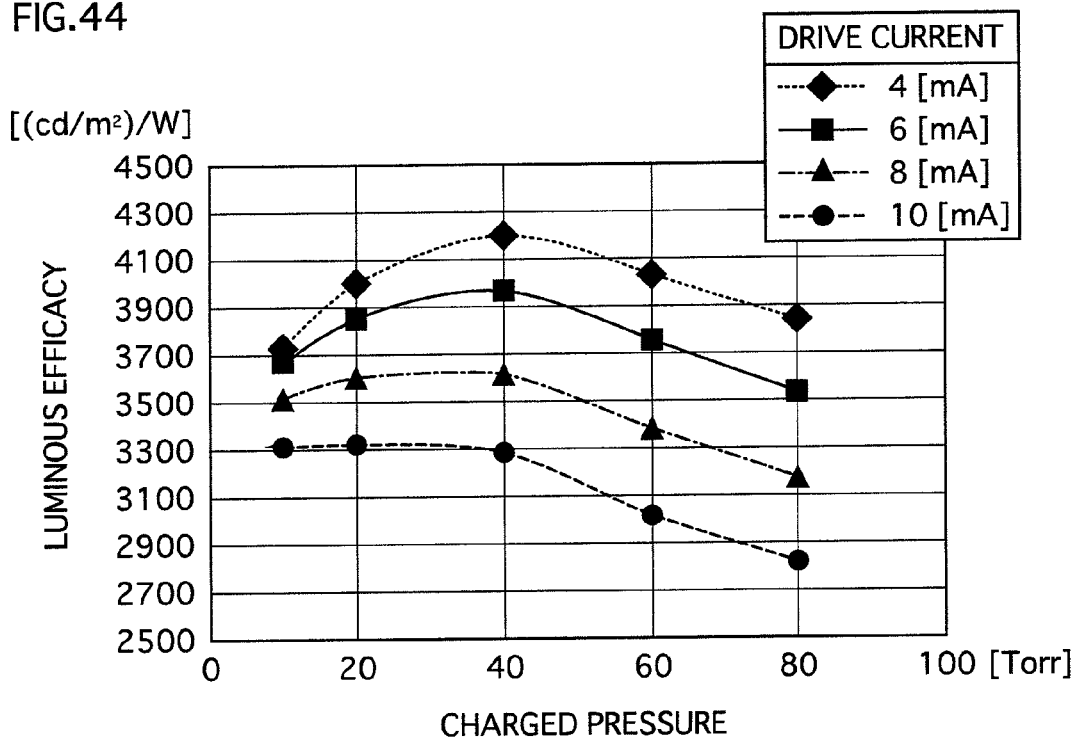
FIG. 44 pertains to embodiment 10, and shows results of an experiment to investigate how luminous efficacy varies according to charged pressure among lamps having different charged pressures of the mixed gas and drive currents, the mixed gas including argon gas at a partial pressure rate of 10%.

FIG. 44 shows the results of the experiment. Note that the luminous efficiency [cd/m$^2$] acquired from the cold cathode fluorescent lamps is divided by input power [W] to arrive at the luminous efficacy values in FIG. 44.

FIG. 44 illustrates that when the drive current is 10 [mA], the luminous efficacy gradually improves as the charged pressure is lowered from 80 [Torr] to 40 [Torr], leveling off at 40 [Torr].

On the other hand, when the drive current is 8, 6, or 4 [mA], lowering the charged pressure from 80 [Torr] results in gradually improved luminous efficiency until 40 [Torr] is reached, at which point worsening of the luminous efficiency can be seen. This shows that although lowering the charged pressure was generally thought to improve luminous efficiency, depending on the drive current, lowering the charged pressure too much can actually decrease luminous efficiency.

Figure 45:
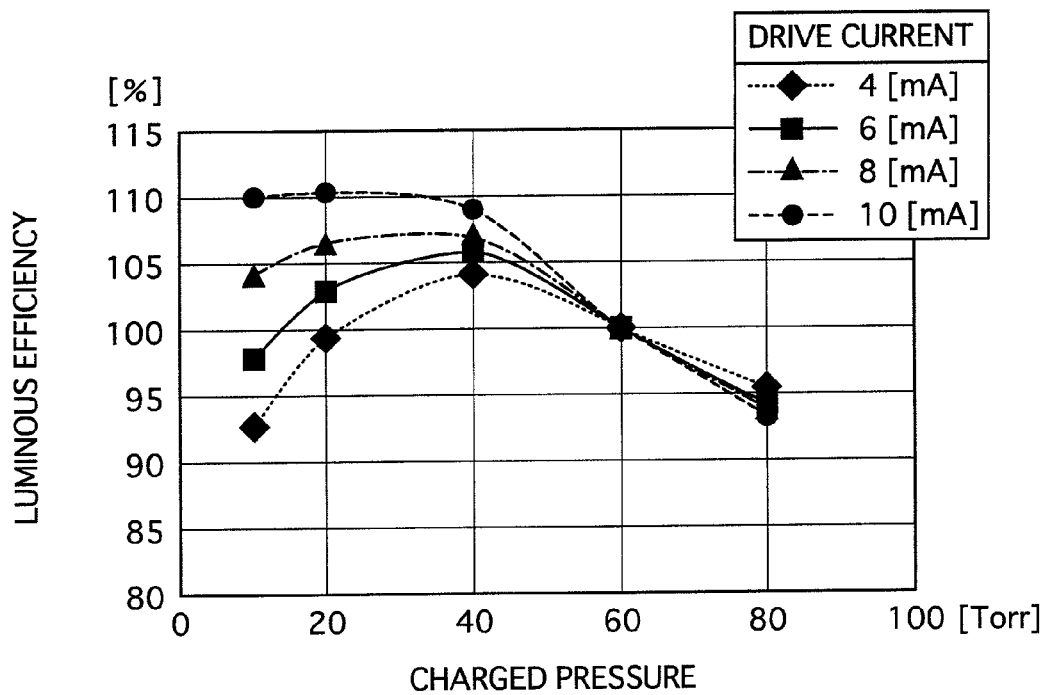
FIG. 45 shows the values of charged pressures and the lamp drive current as percentages when luminous efficiency is set to 100 at a charged pressure of 60 [Torr], a percentage analysis of drive current values at other charged pressures based on the results of the experiment of FIG. 44.

Since the charged pressure of the mixed gas in existing cold cathode fluorescent lamps is 60 [Torr], FIG. 45 was created to illustrate to what extent luminous efficiency at 60 [Torr] differs in accordance with differences in charged pressure (and current). Here, a cold cathode fluorescent lamp whose charged pressure is 60 [Torr] is hereinafter referred to as a "reference lamp".

FIG. 45 is a graph showing a percentage analysis of drive current values at various charged pressures compared to when the charged pressure is 60 [Torr].

FIG. 45 illustrates that to improve the luminous efficiency by 5[%] or more over the reference lamp when the drive current is 10 [mA], the charged pressure should be set at 50 [Torr] or less, for example. Also, FIG. 45 illustrates that when the charged pressure is 40 [Torr], for example, a drive current of 4 [mA] is not enough to improve the luminous efficiency by 5[%] or more over the reference lamp, and a drive current of 6 [mA] is enough. In other words, adjusting the combination between the charged pressure and the drive current enables improving the luminous efficiency by a predetermined rate over the reference lamp.

Figure 46:
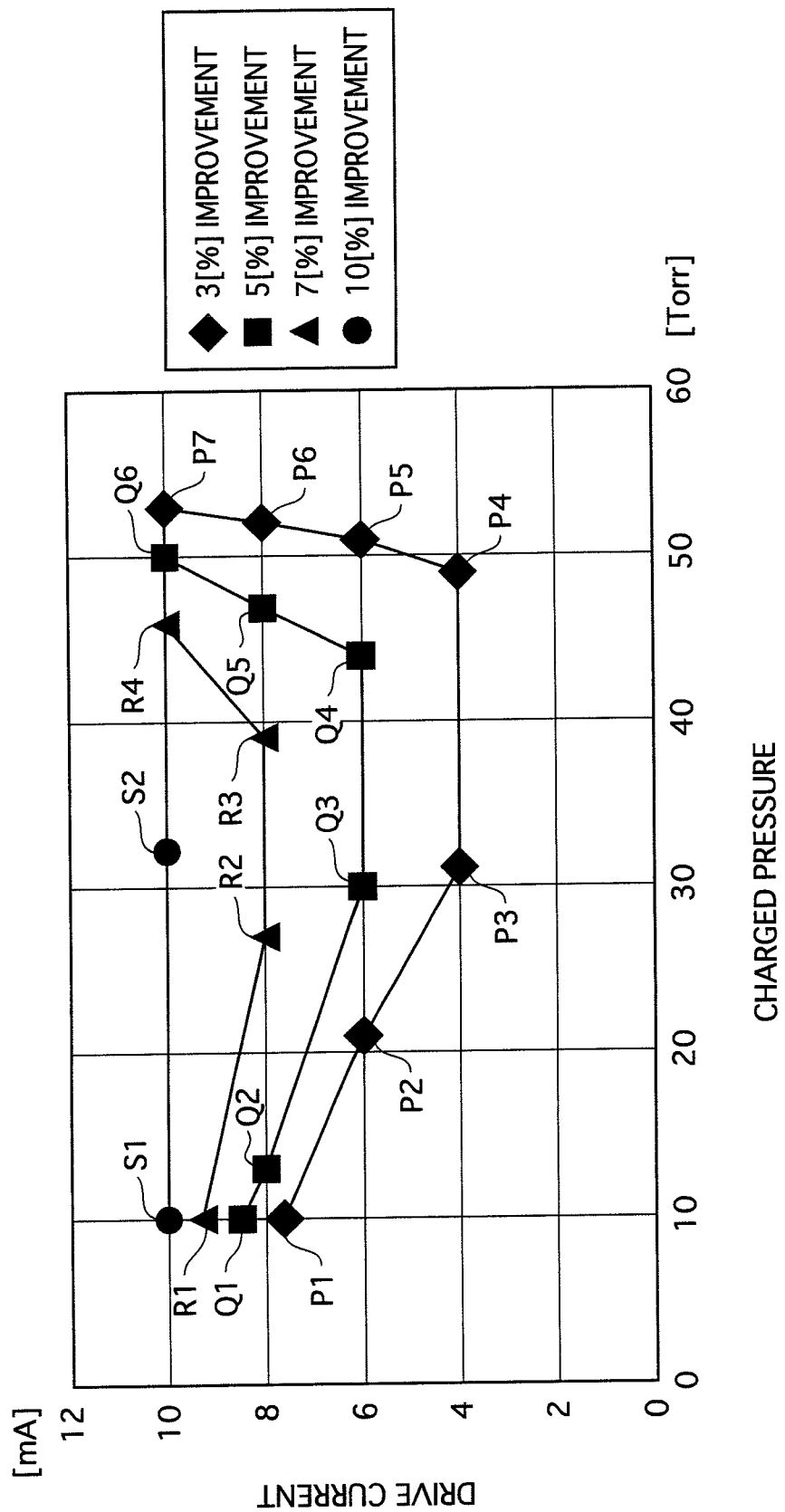
FIG. 46 shows a range of values when emission efficiency is improved 3[%], 5[%], 7[%], and 10[%] over a cold cathode fluorescent lamp having a charged pressure of 60 [Torr], based on FIG. 45.

FIG. 46 was created in accordance with FIG. 45 to illustrate how combinations of charged pressure and drive current improve luminous efficiency by predetermined rates over the reference lamp. Here, the predetermined rates are set to be 3[%], 5[%], 7[%], and 10[%].

FIG. 46 shows a range of values for each predetermined ratio when emission efficiency is improved over the reference lamp by at least the predetermined ratio, on an x-y orthogonal coordinate system in which charged pressure [Torr] of the mixed gas is plotted on the x axis and drive current values [mA] are plotted on the y axis.

For example, in FIG. 46, when a combination of charged pressure and drive current value is in a range enclosed by a line drawn sequentially between points S1 "●" (a black circle) and "◆" (a black diamond), the luminous efficiency is improved by at least 3[%] over the reference lamp. Specifically, when a combination of charged pressure and drive current value is in a range enclosed by a line drawn sequentially between point S1 and points P1 to P7 (including the line), the luminous efficiency is improved by at least 3[%] over the reference lamp.

Similarly, in FIG. 46, when a combination of charged pressure and drive current value is in a range enclosed by a line drawn sequentially between point S1 and points Q1 to Q6 (including the line), the luminous efficiency is improved by at least 5[%] over the reference lamp.

Also, in FIG. 46, when a combination of charged pressure and drive current value is in a range enclosed by a line drawn sequentially beween point S1 and points R1 to R4 (including the line), the luminous efficiency is improved by at least 7 over the reference lamp.

Furthermore, in FIG. 46, when a combination of charged pressure and drive current value is set to have a value that is on a line connecting point S1 to point S2, the luminous efficiency is improved by at least 10[%] over the reference lamp.

The values of the coordinate points are indicated in FIG. 47.

For example, a case of improving the luminous efficiency 7[%] over the reference lamp, based on the coordinate values shown in FIG. 47, is described below. In the x-y orthogonal coordinate system, when the charged pressure [Torr] of the mixed gas that fills the glass bulb in the cold cathode fluorescent lamp is plotted on the x axis, and the value of the drive current [mA] that flows into the cold cathode fluorescent lamp is plotted on the y axis, in a range enclosed by a line drawn sequentially between the points represented by (x,y) coordinates S1 (10,10), R1 (10,9.3), R2(27,8), R3(39,8), R4(46,10), S1(10,10) (including the line), a cold cathode fluorescent lamp can be achieved whose luminous efficiency has been improved by a rate of at least 7[%].

As described above, reducing the charged pressure in an appropriate range below the reference lamp (having a charged pressure of 60 [Torr] improves luminous efficiency. However, it was found that when the charged pressure is reduced, the luminance maintenance rate decreases. Therefore, by performing this experiment, the inventors of the present invention discovered that a decrease in the luminance maintenance rate can be suppressed by adjusting the partial pressure rate of argon gas in the mixed gas.

The present experiment was performed at a drive current of 8 [mA] in an environment having a surrounding temperature of 25[° C.], with use of a cold cathode fluorescent lamp having a glass bulb whose outer diameter is 3.4 [mm], inner diameter is 2.4 [mm], and total length is 450 [mm].

Figure 48:
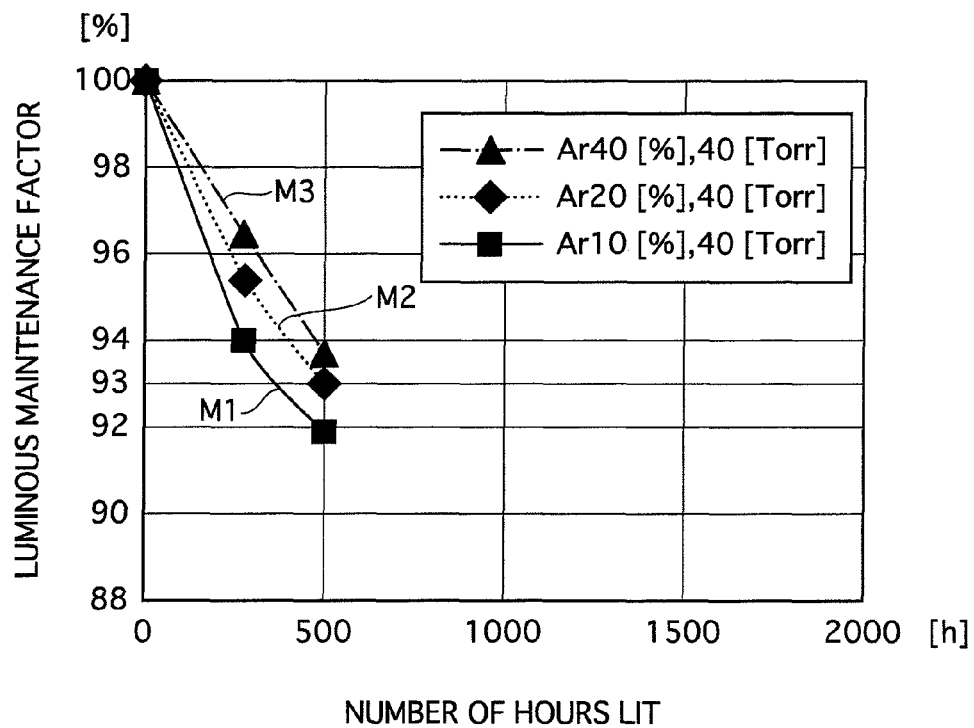
FIG. 48 shows results of an experiment to investigate luminance maintenance rate when varying the partial pressure rate of argon gas in an argon mixed gas.

The results of the experiment are shown in FIG. 48.

In FIG. 48, an arc M1 between points indicated by "■" (black squares) is a luminance maintenance rate arc of a cold cathode fluorescent lamp filled with a mixed gas of 10[%] argon and 90[%] neon at a charged pressure of 40 [Torr].

Similarly, an arc M2 between points indicated by "◆" (black diamonds) is a luminance maintenance rate arc of a cold cathode fluorescent lamp filled with a mixed gas of 20[%] argon and 80[%] neon at a charged pressure of 40 [Torr].

Similarly, an arc M3 between points indicated by "▲" (black triangles) is a luminance maintenance rate arc of a cold cathode fluorescent lamp filled with a mixed gas of 40[%] argon and 60[%] neon at a charged pressure of 40 [Torr].

FIG. 48 illustrates that the luminance maintenance rate varies in accordance with the partial pressure rate of argon.

Here, there is a practical demand for the luminance maintenance rate to be greater than or equal to 93[%] after 500 hours have passed, and the existing lamp noted in the "background art" column fulfils this demand.

Accordingly, in view of this, making the partial pressure rate of argon gas in the mixed gas greater than or equal to 20[%], that is to say, mixing argon gas in the gas that fills the lamp at a partial pressure rate greater than or equal to 20[%], can practically achieve a satisfactory luminance maintenance rate, and does not pose any problems in terms of luminance maintenance rate when used to replace an existing lamp.

As described above, the range of combinations of charged pressure of the mixed gas and drive current for improving luminous efficiency by a predetermined percentage over the reference lamp (the mixed gas being at a charged pressure of 60 [Torr]) can be demarcated based on the experiment results shown in FIG. 46. Also, in view of the luminance maintenance rate, the partial pressure rate of the argon gas in the mixed gas has been set to be greater than or equal to 20[%].

Here, since the experiment results shown in FIG. 46 are based on a cold cathode fluorescent lamp having a 10[%] partial pressure rate of argon gas, achieving efficiency in the range of the above combinations may pose a problem. Therefore, an experiment related to luminous efficiency was also performed on a cold cathode fluorescent lamp whose partial pressure rate of argon gas is 40[%].

The experiment was performed in an environment having a surrounding temperature of 50[° C.], with use of a cold cathode fluorescent lamp having a glass bulb whose outer diameter is 3.4 [mm], inner diameter is 2.4 [mm], and total length is 450 [mm].

Figure 49:
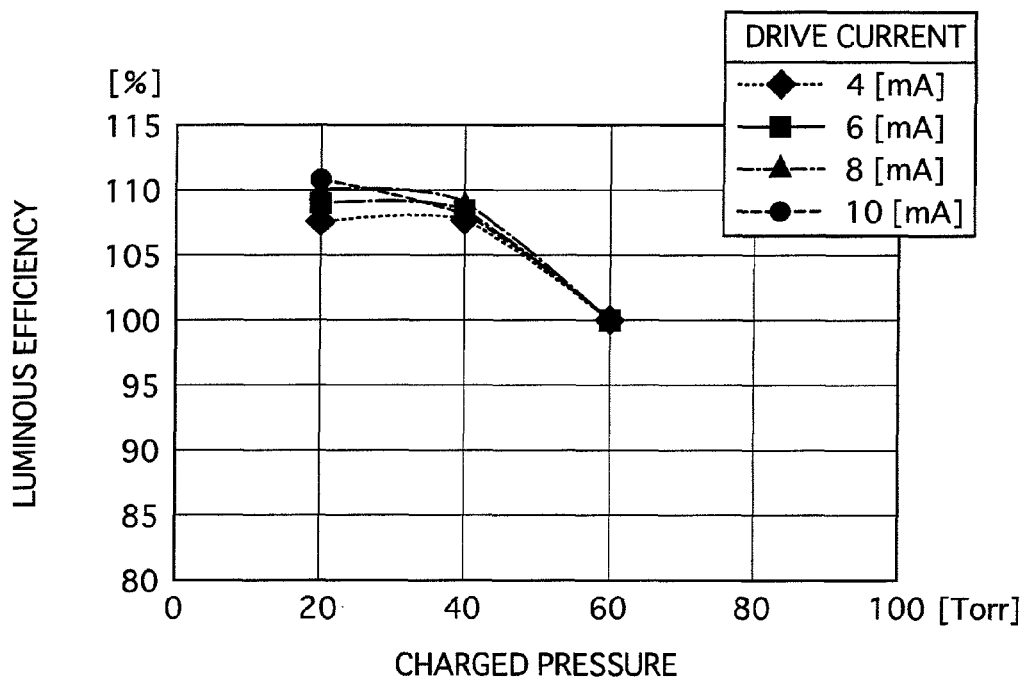
FIG. 49 shows a percentage analysis of values of other charged pressures and drive currents when the charged pressure is 60 [Torr] and the luminous efficiency is set at 100, with use of the results of the experiment to investigate how luminous efficiency varies according to charged pressure among lamps having different charged pressures of the mixed gas and drive currents, the mixed gas including argon gas at a partial pressure rate of 40%.

The results of the experiment are indicated in FIG. 49. FIG. 49 corresponds to the above-referenced FIG. 45.

A comparison between FIG. 45 and FIG. 49 illustrates that increasing the partial pressure rate of argon gas from 10[%] (FIG. 45) to 40[%] (FIG. 49) improves the percentage analysis of the luminous efficiency overall at a reference charged pressure of 60 [Torr]. Specifically, FIGS. 45 and 49 illustrate that the luminous efficiency also varies depending on the partial pressure rate of argon, and the luminous efficiency increases proportionately to the amount of argon in the mixed gas (the partial pressure rate).

Accordingly, when the range of combinations of charged pressure of the mixed gas and drive current has been demarcated according to FIG. 46, the partial pressure rate of argon gas is 10[%] and the luminous efficiency is low, a higher luminous efficiency can be achieved by raising the partial pressure of argon gas higher (over 10[%]). Accordingly, demarcating the range of combinations of charged pressure of mixed gas and drive current according to FIG. 46 is not a problem.

Supplementary Remarks on Embodiment 10

(1) Shape of the Lamp

In the present embodiment, the shape of the lamp is a straight tube (FIG. 2). However, the present invention is also applicable when the lamp is a U-shape, a U-shape having three straight parts, or an L-shape.

Embodiment 11

Embodiment 11 realizes a high degree of spatter-resistance at a low cost by modifying the structural material of the electrodes. The present embodiment is described with use of a cold cathode fluorescent lamp as an example of the fluorescent lamp.

1. Structure of Cold Cathode Fluorescent Lamp 3220

The following describes the structure of a cold cathode fluorescent lamp 3220 pertaining to the present embodiment, with reference to FIG. 50. FIG. 50A shows the schematic structure of the cold cathode fluorescent lamp 3220 having a portion cut away. FIG. 50B is a pattern diagram showing an area where a phosphor film 3308 has been formed on the glass bulb 3305. FIG. 50C is a cross-sectional view of an electrode 3306.

The lamp 3220 is a straight tube shape glass lamp (glass container) 3305 having a substantially circular cross section. For example, the glass bulb has a 2.4 [mm] outer diameter, a 2.0 [mm] inner diameter, and a length of approximately 350 [mm], and is formed of borosilicate glass. The measurements of the lamp 3220 described below are values corresponding to the measurements of the glass bulb 3305, which has a 2.4 [mm] outer diameter and a 2.0 [mm] inner diameter. Needless to say, these values are an example and do not limit the present embodiment.

Mercury in the glass bulb 3305 occupies a predetermined ratio of the cubic capacity of the glass bulb 3305, for example, such that the glass bulb 3305 is filled to 1.20 [mg], and the glass bulb 3305 is filled to a predetermined filling pressure, for example 60 [Torr] with a noble gas such as argon or neon. Note that a mixed gas of argon and neon (Ar-5[%], Ne-95[%]) can be used as the noble gas.

Also, a phosphor film 3308 has been formed on an inner face of the glass bulb 3305. The phosphor film 3308 includes red phosphor, green phosphor, and blue phosphor that convert ultraviolet radiation emitted from the mercury into red, green, and blue light respectively.

The lead wires 3302 and 3304 are trunk wires constituted from, for example, inner lead wires 3302A and 3304A made of tungsten, and outer lead wires 3302B and 3304B made of nickel. The inner lead wires 3302A and 3304A have a 1 [mm] wire diameter and a 3 [mm] total length, and the outer lead wires 3302B and 3304B have a 0.8 [mm] wire diameter and a 5 [mm] total length.

So-called hollow-shaped electrodes 3306 and 3307 have been fixed to the ends of the inner lead wires 3302A and 3304A. The electrodes 3306 and 3307 are substantially cup-shaped, each including a concave portion having an opening on one side. The fixing is performed by laser welding, for example.

The electrodes 3306 and 3307 have the same shape, and the measurements of each portion shown in FIG. 50C are as follows. The electrode length L1 is 5.5 [mm], the outer diameter PO is 1.70 [mm], the inner diameter Pi is 1.50 [mm], and the thickness t is 0.10 [mm].

Yttrium oxide ($Y_2O_3$) has been added (doped) at 0.46 [wt %] to a nickel base material to which silicon (Si) has also been added at 0.14 [wt %] to form the electrodes 3306 and 3307. Adding the yttrium oxide enables improving spatter-resistance in the electrodes 3306 and 3307. Also, adding silicon enables preventing the electrodes 3306 and 3307 from oxidizing.

When the lamps 3220 are lit, a discharge occurs in the tube portions of the bottomed tube-shaped electrodes 3306 and 3307 and between the electrodes 3306 and 3307.

In the present embodiment, similarly to embodiment 1, as shown in FIG. 50B, b2 is longer than b1 (b2>b1) where b1 is the distance from the boundary 3309 (a border between the phosphor layer area, where the phosphor layer 3308 exists, and the non-phosphor layer area, where the phosphor layer 3308 does not exist) on the first sealed portion side of the glass bulb 3305, and the base of the electrode 3306, and b2 is the distance from a boundary 3310 to the base of an electrode 3307. The base of the electrode referred to here is the base portion where the electrodes 3306 and 3307 are fixed to the lead wires 3302 and 3304.

Note that as a result of the positions of members other than the phosphor layer 3308, namely the electrodes 3306 and 3307 and the lead wires 3302 and 3304, being provided symmetrically on both the left and the right ends, c2 is longer than c1 (c2>c1) where c1 and c2 are the distances from the boundaries 3309 and 3310 to outer tips of the outer lead wires 3302B and 3304B, respectively.

Also, a2 is longer than a1 (a2>a1) where a1 is the distance from the boundary 3309 to the end on the first sealed portion side (length of the non-phosphor layer area) and a2 is the length from the boundary 3310 to the end on the second sealed portion side.

For example, the measurements thereof are as follows.
a1=8.0 [mm], a2=10.0 [mm], b1=5.0 [mm], b2=7.0 [mm], c1=14.0 [mm], and c2=16.0 [mm].

2. Manufacturing Method for the Electrode 3306

Next, a manufacturing method for the electrode 3306 is described. Note that since the electrodes 3307 and 3306 are manufactured similarly, the description of the method for manufacturing the electrode 3306 also applies to the electrode 3307. Note that description of the manufacturing method for the cold cathode fluorescent lamps 3220 is omitted since the lamps are manufactured similarly to the method depicted in FIGS. 3 and 4.

In the present embodiment, as described above, after processing ingots made of nickel to which yttrium oxide and silicon have been added into wires (wire drawing), the ingots are cold pressed by header processing. FIG. 51 shows the manufacturing method for the electrode 3306. First, the wire-drawn ingot 3701 is cut at a predetermined length (FIG. 51A).

Next, the cut ingot 3701 is stored in the die 3702 (FIG. 51B), and the ingot 3701 is compressed one to several times in the press 3703 (FIGS. 51C to 51E). Thereafter, the electrode 3306 can be acquired by extracting the molded ingot 3701 from the die 3702 with use of the eject bar (not depicted).

The manufacturing cost of the electrode 3306 can be reduced since the electrode 3306 can be acquired in such a manner by cold forging. Also, the manufacturing cost can be reduced since nickel is softer than tungsten and niobium, and the electrode 3306 can be molded using fewer compressions.

3. Evaluation of Spatter Resistance

The spatter resistance of the electrode pertaining to the present embodiment and a nickel electrode to which yttrium oxide was not added have been evaluated, and next, the evaluation results are described.

The glass bulbs of the cold cathode fluorescent lamps used in the evaluation have a 2.4 [mm] outer diameter and a 2.0 [mm] inner diameter, the hollow-type electrodes have a 1.7 [mm] outer diameter, a 1.5 [mm] inner diameter, and a length of 5.5 [mm], the distance between the electrodes (interval from the farthest end of one electrode to the farthest end of the other electrode) is 330 [mm], the cold cathode fluorescent lamps being filled with mercury to a saturated vapor pressure and with a 5[%] neon-argon mixed gas to 8 [kPa] (60 [Torr]). Also, the voltage of 60 [kHz] sinusoidal waveforms is applied, and the current magnitude is 6 [mA].

Under these conditions, after the cold cathode fluorescent lamps have been continuously lit for 5,000 [hours] at an atmospheric temperature of 25[° C.], when average values of spatter amounts of the electrodes were obtained from five sample lamps, the electrode pertaining to the present invention had a spatter amount of 1.8 [μg] compared to 2.8 [μg] in a pure nickel electrode. In other words, using the present invention enables reducing spatter amount by 35[%].

Note that in the present evaluation, the spatter amount was obtained by quantifying, via chemical analysis, a metallic film deposited on an inner wall of the glass bulb in the vicinity of the opening of the electrode.

Also, although the spatter amount, obtained in the same manner, of a pure niobium electrode is 0.8 [μg], which is even less than in the electrode pertaining to the present invention, in view of the fact that an aim of the present invention is to reduce both spatter amount and cost, this result in no way detracts from the effect of the present invention.

Supplementary Remarks on Embodiment 11

Although the present invention has been described based on the embodiment, the present invention is of course not limited to this.

(1) Although the above embodiment describes an example of adding only nickel to a base material of yttrium oxide at 0.46 [wt %], the present invention is of course not limited to this. A similar effect to the present invention can be achieved provided that the added amount of yttrium oxide is in a range from 0.1 [wt %] to 1.0 [wt %] inclusive.

(2) Although the above embodiment described a case of adding only yttrium oxide, the present invention is of course not limited to this. In addition to yttrium oxide, one or more of silicon, titanium (Ti), strontium (Sr) and calcium (Ca) may be added as deoxidizing agents. This enables preventing the electrode from oxidizing.

(3) Although the above embodiment describes manufacturing the electrode 3306 only by header processing, the present invention is of course not limited to this, and the electrode may be molded by drawing processing in place of header processing.

(4) Although the above embodiment describes a case of using only hollow-type electrodes as cold cathodes, the present invention is of course not limited to this, and rod-shaped electrodes may be used in place of hollow-type electrodes. The effect of the present invention is the same regardless of the shape of the electrode.

(7) The measurements of the glass bulb 3305 are of course not limited to those of the above embodiment, and employing other measurements does not change the effect of the present invention.

Note that to maintain the slim shape of the external electrode-type discharge lamp, the inner diameter is preferably from 1.4 [mm] to 7.0 [mm], and the thickness is preferably from 0.2 [mm] to 0.6 [mm].

Also, the horizontal section of the glass bulb 3305 is not limited to being substantially circular, and may be substantially oval.

(8) The composition of the phosphor film 3308 is of course not limited to the above embodiment, and the effect of the present invention can be achieved when another composition is used in place of this.

(9) The shape of the glass bulb 3305 may be a U-shape having three flat parts, a U-shape, or an L-shape, and the cross section shape may be circular or flattened. In the case of a flattened shape, the cross section shape of the lamp may be elliptic or oval. Also, the length of the lamp is less than or equal to 1500 [mm].

Embodiment 12

Embodiment 12 provides an emitter for fluorescent lamps that has low spatter when the fluorescent lamps are in use, and a fluorescent lamp having a high luminous efficiency and long lifetime and that includes the emitter.

Figure 52:
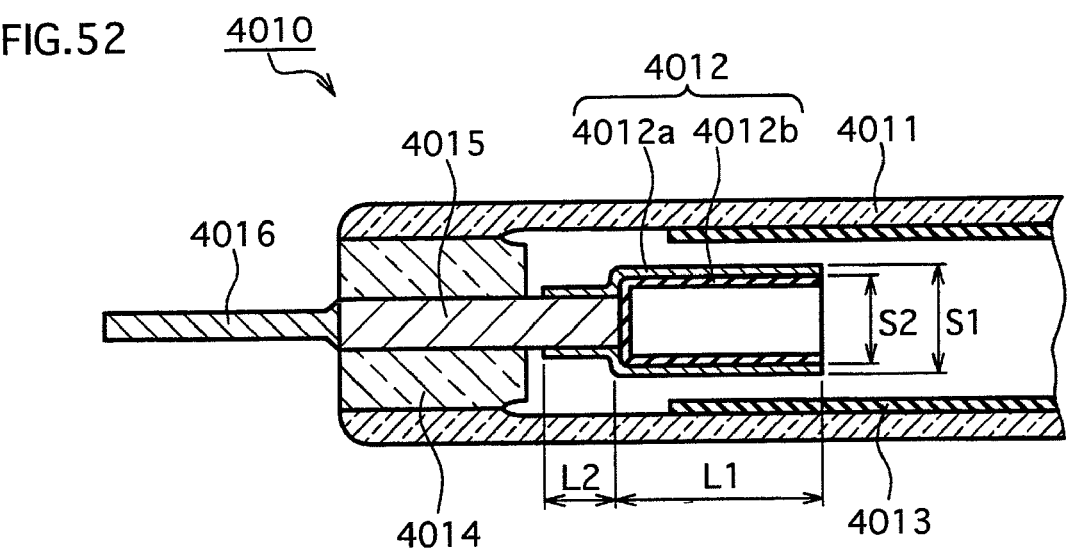
FIG. 52 is a cross-sectional view of which one part has been enlarged showing an example of a fluorescent lamp pertaining to embodiment 12.

FIG. 52 is a cross-sectional view of which one part has been enlarged showing an example of a fluorescent lamp pertaining to the present embodiment. Note that FIG. 52 shows one end of the fluorescent lamp, and the other end is omitted due to being similar to the end shown in FIG. 52.

A fluorescent lamp 4010 includes a glass bulb 4011 and a pair of electrodes 4012 disposed in the interior of the glass bulb 4011.

The glass bulb 4011 is made of borosilicate glass or the like, and a phosphor film 4013 has been formed on an inner face of the glass bulb 4011. Both ends of the glass bulb 4011 have been sealed with use of glass beads 4014. The interior of the glass bulb 4011 that has been sealed with use of the glass bead 4014 has been filled with mercury and noble gas (not depicted).

Since a RBG color display lamp, in particular a white lamp, is in high demand, the phosphor film 4013 preferably uses phosphor having three wavelength types including, for example, a blue phosphor composed of europium-activated barium-magnesium aluminate $[BaMg_2Al_{16}O_{27}:Eu^{2+}]$ (abbreviation: BAM-B), a green phosphor composed of cerium and terbium-activated lanthanum phosphate (LAP) $[LaPO_4: Ce^{3+},Tb^{3+}]$ (abbreviation: LAP), and a red phosphor composed of europium-activated yttrium oxide $[Y_2O_3:Eu^{3+}]$ (abbreviation: YOX). However, the material of the phosphor film 4013 is not limited to this.

Next, the electrode 4012 is described. The electrode 4012 includes a metal sleeve 4012a and an emitter 4012b that at least partially covers the metal sleeve 4012a. The difference between the outer diameter S1 and the inner diameter S2 of the metal sleeve 4012a, in other words the thickness of the metal sleeve 4012a, is normally set to between 0.1 [mm] to 0.2 [mm]. Also, although the cup length L1 of the metal sleeve 4012a has been set to approximately three times the length of the base section L2, the cup length is not limited to this.

Note that although FIG. 52 shows an example of the emitter 4012b being formed on the inner face of the metal sleeve 4012a, the formation position of the emitter 4012b is not limited to this, provided that the emitter 4012b is formed on a portion of the metal sleeve 4012a. However, providing the emitter 4012b on at least the inner face of the metal sleeve 4012a enables preventing the emitter 4012b from spattering due to ion bombardment resulting from the cold cathode operation, and thus enables longer preservation of the emitter effect.

Figure 53:
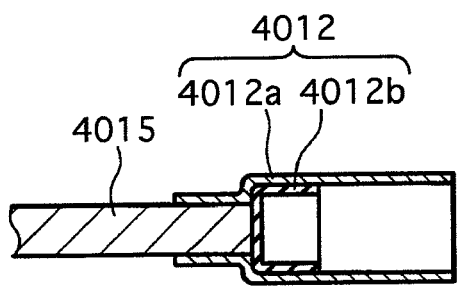
FIG. 53 is a cross-sectional view showing another formation condition of an emitter $4012b$ of an electrode $4012$ of FIG. 52.
Figure 54:
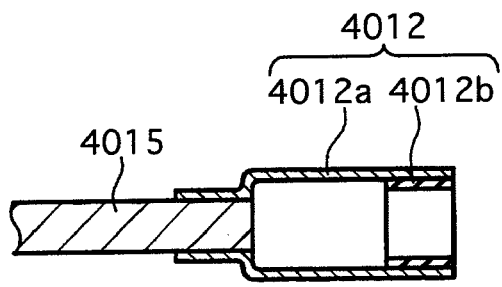
FIG. 54 is a cross-sectional view showing a further formation condition of the emitter $4102b$ of the electrode $4012$ of FIG. 52.

Also, there is a correlation between the spattering described above and charged gas pressure. When charged gas pressure is low, spattering readily occurs at the relative bottom of the metal sleeve 4012a. When charged gas pressure is high, spattering readily occurs in a vicinity of the opening of the metal sleeve 4012a. When the charged gas pressure is low pressure that is at or below 1 Torr, as shown in FIG. 53, the emitter 4012b is preferably formed on the bottom face portion of the metal sleeve 4012a and on an inner side face to a ⅓ height upward from the bottom face of the metal sleeve 4012a. Also, when the charged gas pressure is high pressure that is greater than or equal to 10 [Torr], as shown in FIG. 54, the emitters 4012b are preferably formed on an inner face to a ⅓ depth downward from the opening of the metal sleeve 4012a. Furthermore, when the charged gas pressure is medium pressure that exceeds 1 [Torr] and is under 10 [Torr], the emitters 4012b are preferably formed on an inner side face at least to a ⅓ height or depth, downward and upward respectively, from the opening. Since the emitter 4012b has a great deal of resistance to spatter, changing the formation position of the emitter 4012b in accordance with the charged gas pressure enables preventing scattering (spattering) of the metal sleeve 4012a due to ion bombardment.

Note that although the example of a cup-shaped electrode is shown in FIG. 52, a rod-shaped electrode can also be used. In such a case, the relationship between the spattering and the charged gas pressure is such that when the charged gas pressure is high (greater than or equal to 10 [Torr]), spattering occurs easily on the ends of the rod-shaped electrodes and on the side faces to a ⅓ depth from the ends. When the charged gas pressure is medium to low (under 10 [Torr]), spattering occurs easily on the ends of the rod-shaped electrodes and to a ⅔ depth from the ends. Accordingly, when using rod-shaped electrodes, emitters having great resistance to spatter are preferably disposed in positions on the rod-shaped electrodes on which spatter easily occurs, similarly to when cup-shaped electrodes are used.

The metal sleeve 4012a is formed from a metal that is heat-resistant to a temperature greater than or equal to the sintering temperature of the emitter (for example, 550[° C.]). For example, nickel, stainless steel, cobalt, or iron can be used as the material for the metal sleeve 4012a. An inner lead wire 4015 that is made of tungsten or the like has been inserted into the metal sleeve 4012a and welded to one end of the metal sleeve 4012a. The inner lead wire 4015 passes through the glass bead 4014 and connects to an outer lead wire 4016.

Figure 55:
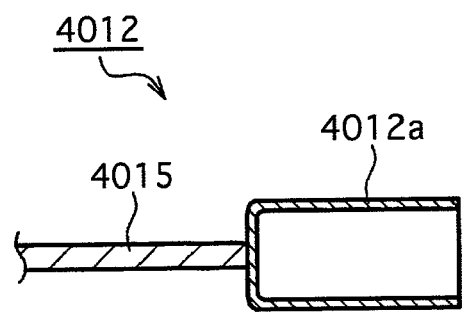
FIG. 55 is a cross-sectional view showing another example of the electrode $4012$ of FIG. 52.

Note that although an example is shown in FIG. 52 of inserting the base portion of the metal sleeve 4012a into the inner lead wire 4015 and joining the metal sleeve 4012a and the inner lead wire 4015 together by welding to form the electrode 4012, the electrode 4012 can also be the metal sleeve 4012a and the inner lead wire 4015 formed as a single piece, as shown in FIG. 55.

Also, the centerline average roughness (Ra) of the surface of the metal sleeve 4012a is preferably between 1 [µm] and 10 [µm]. This is because the effect of suppressing deficiency in the emitter 4012b is greatest in this range.

Figure 57:
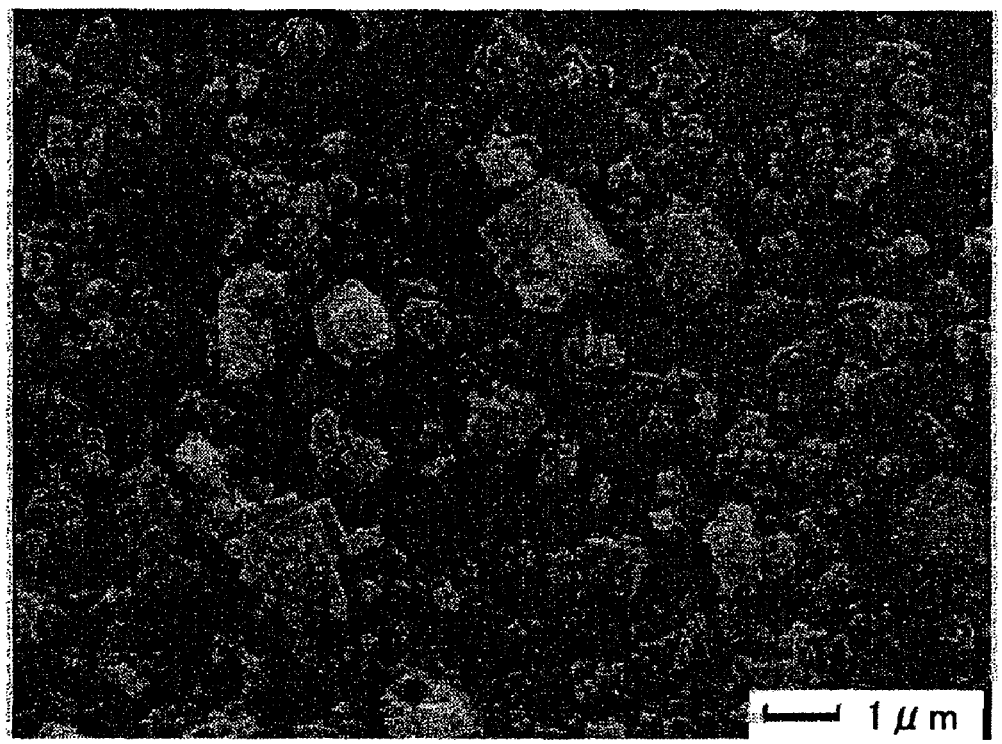
FIG. 57 is an electron microscope photograph showing an example of single-crystal magnesium oxide microparticles used in the present invention.

The primary particles of the emitter 4012b are formed from single crystals, and are formed from single-crystal magnesium oxide microparticles, the average particle diameter of such single crystals being less than or equal to 1 [µm]. These single-crystal magnesium oxide microparticles are produced by a gas-phase oxidation reaction between metallic magnesium vapor and oxygen, and have, for example, the cubic single-crystal structure shown in the electron microscope photograph of FIG. 57.

The emitter 4012b is formed by applying an emitter application liquid to the metal sleeve 4012a, the emitter application liquid being a mixture of the single-crystal magnesium oxide microparticles, a binder, and a solvent, and then performing heat processing. For example, nitrocellulose, ethylcellulose, or polyethylene oxide can be used as the binder. Also, for example, butyl acetate or an alcohol expressed in the chemical formula $C_nH_{2n+1}OH$ (n=1 to 4) can be used as the solvent.

Also, although FIG. 52 depicts the straight tube shaped fluorescent lamp 4010, the fluorescent lamp of the present invention is not limited to this, and a curved tube having a U-shape or a U-shape with three straight parts may also be used. Also, the fluorescent lamp 4010 is not limited to being a cylindrical type lamp having a circular cross section. For example, a flattened type lamp having an elliptical cross section, as shown in FIG. 56A, may also be used. Note that FIG. 56B shows a cross section taken along line I-I'.

Working Examples of Embodiment 12

The following specifically describes exemplary cold cathode fluorescent lamps of embodiment 12 with use of working examples.

Working Example 1

Working example 1 describes an example of a fluorescent lamp 10 that is similar to fluorescent lamps described in previous embodiments. With reference to FIG. 52, in the fluorescent lamp 4010, a tungsten inner lead wire 4015 having a 0.6 [mm] outer diameter is inserted in one end of the nickel metal sleeve 4012a which has a 1.7 [mm] outer diameter (S1), a 1.5 [mm] inner diameter (S2), a 5.5 [mm] cup length (L1), and a 1.5 [mm] base portion length (L2). The inner lead wire 4015 and the metal sleeve 4012a are joined together in the fluorescent lamp 4010 by pinch-sealing one end of the metal sleeve 4012a.

The glass bulb 4011 has a 2.4 [mm] outer diameter, a 2.0 [mm] inner diameter, and is formed of borosilicate glass. Electrodes 4012 have been disposed on respective ends of the glass bulb 4011. The electrodes 4012 include the emitter 4012b that is formed from single-crystal magnesium oxide microparticles whose the original particles are single crystals, the average particle diameter of such single crystals being less than or equal to 1 [mm].

Also, both ends of the glass bulb 4011 are sealed by glass beads 4014 that are formed from borosilicate glass, and the inner lead wire 4015 passes through the glass bead 4014 and connects to the stainless steel outer lead wire 4016. The distance between the ends of the pair of electrodes 4012 has been set at 330 [mm]. Also, a phosphor film 4013 has been formed on the inner face of the glass bulb 4011, and the interior thereof is filled with a mixed gas of argon and neon to a pressure of 8 [kPa] as well as mercury.

For the phosphor film 4013, phosphors of three wavelength types, including a blue phosphor composed of europium-activated barium-magnesium aluminate [$BaMg_2Al_{16}O_{27}$:$Eu^{2+}$] (abbreviation: BAM-B), a green phosphor composed of cerium and terbium activated lanthanum phosphate [$LaPO_4$:$Ce^{3+}$, $Tb^{3+}$] (abbreviation: LAP), and a red phosphor composed of europium-activated yttrium oxide [$Y_2O_3$:$Eu^{3+}$] (abbreviation: YOX), were mixed at a weight ratio of BAM-B:LAP:YOX=4:3:3.

The fluorescent lamp of working example 1 was created by the following method.

To begin with, the emitter 4012 was formed on an inner face of the metal sleeve 4012a by the following method. First, single-crystal magnesium oxide microparticles were prepared, the average particle diameter of the single crystals being less than or equal to 1 [µm]. Thereafter, the emitter application fluid was prepared by dispersing 10 [kg] of the microparticulate single-crystal magnesium oxide into 20 [liters] of a mixed solution of nitrocellulose (the binder) and butyl acetate (the solvent) (the nitrocellulose being 1.5 [wt %] of the butyl acetate solution). Next, the emitter application liquid was applied by a spray method to the inner face of the metal sleeve 4012a, and allowed to dry naturally in the air.

Thereafter, the electrode 4012 including the emitter 4012b was formed by affixing the single-crystal magnesium oxide microparticles to the metal sleeve 4012 by heating the metal sleeve 4012a to which the emitter application fluid had been applied to approximately 550[° C.] in an argon atmosphere reduction furnace, and removing the binder and solvent.

Next, the electrodes 4012 were disposed on respective ends of the glass bulb 4011 to which the phosphor film 4013 was applied, and first only one of the electrodes 4012 was sealed by heating via the glass bead 4014 in an argon atmosphere. Next, mercury and a mixed gas of argon and neon was introduced to the glass bulb 4011 to 8 [kPa], and lastly the other electrode 4012 and the glass bulb 4011 are sealed via the glass bead 4014 by heating the glass bead 4014, creating the fluorescent lamp of working example 1.

Comparative Example 1

The fluorescent lamp of comparative example 1 was created in the same way as working example 1, except that the metal sleeve 4012a used did not have the emitter 4012b formed thereon.

Comparative Example 2

The fluorescent lamp of comparative example 2 was created in the same way as working example 1, except that magnesium oxide microparticles having an 18 [µm] average particle diameter were used in place of single-crystal magnesium oxide microparticles.

Measurement of Lamp Voltage

Lamp voltage (effective value: Vrms) was measured by lighting the fluorescent lamps of working example 1 and comparative examples 1 and 2 with use of a high-frequency lighting circuit under the conditions of a 25[° C.] surrounding temperature, 4 [mArms] (effective value) lamp current, and 60 [kHz] lighting frequency. Also, the lamp voltage was measured after similarly changing the lamp currents to 6 [mArms], 8 [mArms], and 10 [mArms]. The results are shown in FIG. 58.

Figures 58, 59:
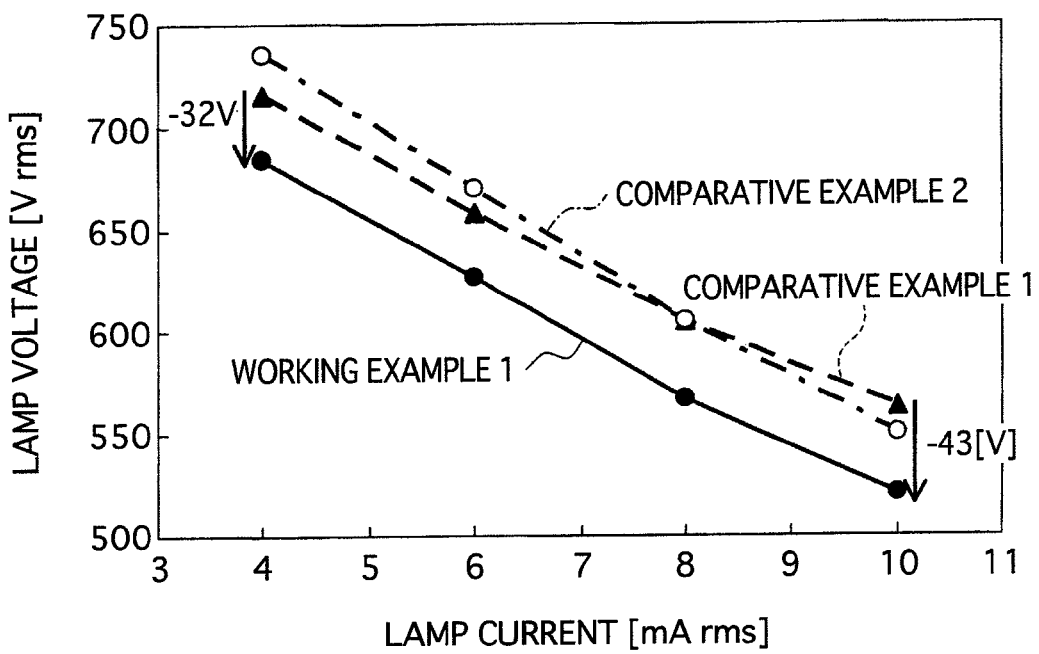
FIG. 58 shows relationships between lamp current and lamp voltage in lamps pertaining to working example 1 and comparative examples 1 and 2.
FIG. 59 is a table showing the results of a comparative measurement of spatter amounts.

As illustrated in FIG. 58, working example 1 enables reducing the lamp voltage by between 32 [Vrms] and 43 [Vrms] over comparative examples 1 and 2.

Measurement of Spatter Amount

Spatter amount was measured by lighting the fluorescent lamps of working example 1 and comparative examples 1 and 2 with use of a high-frequency lighting circuit for 6000 [hours] under the conditions of a 25[° C.] surrounding temperature, 6 [mArms] (effective value) lamp current, and 60 [kHz] lighting frequency. Here, spatter amount refers to the total quantity of scattered component of the emitter 4011 and the metal sleeve 4012*a* that are deposited on, and adhere to, the inner wall of the glass bulb 4011, after such ingredients have scattered due to ion bombardment resulting from the cold cathode operation. The scattered quantity was extracted by immersing both ends of the glass bulb 4011 near the electrodes 4012 in acid, and dissolving the scattered quantity in the acid. The spatter amount was obtained by analyzing the solution in which the scattered quantity has been dissolved with use of ICP mass spectrometry.

FIG. 59 is a table showing the results of a comparative measurement of spatter amounts.

As illustrated in FIG. 59, working example 1 has a lower spatter amount than comparative examples 1 and 2, leading to a longer life of the fluorescent lamp. Note that the MgO component from the scattering of the emitter 4012*b* and the Ni component from the scattering of the metal sleeve 4012*a* are included in the spatter amounts of working example 1 and comparative example 2, and only the Ni component from the scattering of the metal sleeve 4012*a* is included in the spatter amount of comparative example 1.

Supplementary Remarks on Embodiments 1 to 12

1. Phosphor Layer Composition

Although described based on embodiments 1 to 12, the phosphor layer is not limited to the above descriptions, and in particular, the following materials can be used for the phosphor layer.

(1) Ultraviolet Radiation Absorption

For example, in recent years, as liquid crystal televisions have become larger, polycarbonate having good measurement stability is being used for the diffusion sheet blocking the opening of the backlight unit. Such polycarbonate readily degrades due to ultraviolet radiation of 313 [nm] wavelength emitted by the mercury. In such a case, phosphor that absorbs 313 [nm] wavelength ultraviolet radiation should be used. Note that the following phosphors absorb 313 [nm] wavelength ultraviolet radiation.

(a) Blue

Europium and manganese activated barium strontium magnesium aluminate $[Ba_{1-x-y}Sr_xEu_yMg_{1-z}Mn_zAl_{10}O_{17}]$ or $[Ba_{1-x-y}Sr_xEu_yMg_{2-z}Mn_zAl_{16}O_{27}]$.

Here, x, y and z are preferably values that respectively satisfy $0 \leq x \leq 0.4$, $0.07 \leq y \leq 0.25$, $0 \leq z < 0.1$.

Examples of this type of phosphor are europium-activated barium-magnesium aluminate $[BaMg_2Al_{16}O_{27}:Eu^{2+}]$, $[BaMg_2Al_{10}O_{17}:Eu^{2+}]$ (abbreviation: BAM-B) and europium-activated barium-strontium-magnesium aluminate $[(Ba, Sr) MgAl_{16}O_{27}:Eu^{2+}]$, $[(Ba, Sr) MgAl_{10}O_{17}:Eu^{2+}]$ (abbreviation: SBAM-B).

(b) Green

Manganese-activated magnesium gallate $[MgGa_2O_4:Mn^{2+}]$ (abbreviation: MGM)

Manganese-activated cerium-magnesium zinc aluminate $[Ce(Mg,Zn)Al_{11}O_{19}:Mn^{2+}]$ (abbreviation: CMZ)

Terbium-activated cerium-magnesium aluminate $[CeMgAl_{11}O_{19}:Tb^{3+}]$ (abbreviation: CAT)

Europium and manganese activated barium-strontium-magnesium aluminate $[Ba_{1-x-y}Sr_xEu_yMg_{1-z}Mn_zAl_{10}O_{17}]$ or $[Ba_{1-x-y}Sr_xEu_yMg_{2-z}Mn_zAl_{16}O_{27}]$.

Here, x, y and z are values that respectively satisfy $0 \leq x \leq 0.4$, $0.07 \leq y \leq 0.25$, $0.1 \leq z < 0.6$, and z preferably satisfies $0.4 \leq x \leq 0.5$.

Examples of this type of phosphor are europium and manganese activated barium-magnesium aluminate $[BaMg_2Al_{16}O_{27}:Eu^{2+}, Mn^{2+}]$ $[BaMgAl_{10}O_{17}:Eu^{2+},Mn^{2+}]$ (abbreviation: BAM-G) and europium and manganese activated barium-strontium-magnesium aluminate $[(Ba, Sr) Mg_2Al_{16}O_{27}:Eu^{2+}, Mn^{2+}]$, $[(Ba, Sr) MgAl_{10}O_{17}:Eu^{2+}, Mn^{2+}]$ (abbreviation: SBAM-G).

(c) Red

Europium-activated yttrium phosphovanadate $[Y(P,V)O_4:Eu^{3+}]$ (abbreviation: YPV)

Europium-activated yttrium vanadate $[YVO_4:Eu^{3+}]$ (abbreviation: YPO)

Europium-activated yttrium oxysulfite $[Y_2O_2S:Eu^{3+}]$ (abbreviation: YOS)

Manganese-activated magnesium germanate $[3.5 MgO.0.5 MgF_2.GeO_2:Mn^{4+}]$ (abbreviation: MFG)

Dysprosium-activated yttrium vanadate $[YVO_4:Dy^{3+}]$ (phosphor emitting two components of light, red and green, abbreviation: YDS)

Note that different chemical compounds of phosphor may be mixed together and used for one type of emission color. For example, BAM-B (absorbs 313 [nm]) only may be used for blue, LAP (does not absorb 313 [nm]) for green, and YOX (does not absorb 313 nm) for red. In such a case, adjusting the phosphor that absorbs 313 [nm] radiation to have a gross weight composition ratio of more than 50[%] enables nearly totally preventing the ultraviolet radiation from leaking out of the glass tube. Accordingly, including phosphor that absorbs 313 [nm] ultraviolet radiation enables suppressing degradation due to ultraviolet radiation of the polycarbonate (PC) diffusion plate, etc. that blocks the opening of the backlight unit, and long-term maintenance of the attributes of the backlight unit.

The definition used here for "absorbing 313 [nm] ultraviolet radiation" is having a 313 [nm] excitable wavelength spectrum intensity of 80% or more when the intensity of an approximately 254 [nm] excitation wavelength spectrum is 100% (the excitation wavelength spectrum is a spectrum in which an excitation wavelength and a light intensity when a phosphor is excited over a range of wavelengths is plotted). In other words, phosphor that absorbs 313 [nm] ultraviolet radiation is phosphor that can convert 313 [nm] ultraviolet radiation to visible light.

(2) High Color Reproduction

In liquid crystal display apparatuses epitomized by liquid crystal color televisions, a trend towards high color fidelity has been part of a trend towards high image quality, and in the cold cathode fluorescent lamps and external electrode fluorescent lamps that are used as light sources for backlight units of the liquid crystal display apparatuses, there is demand for expansion of the reproducible chromaticity range.

In response to this demand, using the following phosphors, for example, enables enlarging the chromaticity range. Specifically, in the chromaticity diagram CIE 1931, the chromaticity coordinate values of the high-reproduction phosphors are positioned to enlarge the chromaticity range and include a triangle formed by connecting chromaticity coordinate values of three ordinary phosphors.

(a) Blue

Europium-activated strontium-chloroapatite [$Sr_{10}(PO_4)_6Cl_2$:$Eu^{2+}$] (abbreviation: SCA), chromaticity coordinates: x=0.151, y=0.065

In addition to the above, europium-activated strontium-calcium-barium-chloroapatite [(Sr, Ca, Ba)$_{10}(PO_4)_6Cl_2$:$Eu^{2+}$] (abbreviation: SBCA), can be used, and SBAM-B, described above, that can absorb 313 [nm] ultraviolet radiation can also be used.

(b) Green

BAM-G, chromaticity coordinate values: x=0.139, y=0.574

CMZ, chromaticity coordinate values: x=0.164, 0.722

CAT, chromaticity coordinate values: x=0.267, y=0.663

Note that these, as described above, can absorb 313 [nm] wavelength radiation, and other than the three types of phosphor particles described above, MGM can also be used for high-color fidelity.

(c) Red

YOS, chromaticity coordinate values: x=0.651, y=0.344

YPV, chromaticity coordinate values: x=0.658, y=0.333

MFG, chromaticity coordinate values: x=0.711, y=0.287

Note that these, as described above, can absorb 313 [nm] wavelength radiation, and other than the three types of phosphor particles described above, YVO and YDS can also be used for high-color fidelity.

Also, the chromaticity coordinate values indicated above are representative values reached by measuring only the fine particles of each phosphor type, and the chromaticity coordinate values indicated by the fine particles of each phosphor type may differ slightly from the values given above depending on measurement method (measurement principle) etc.

Furthermore, the phosphors used for emitting red, green, and blue light are not limited to being one type per each wavelength, and combinations of a plurality of types may be used.

The following describes a case of using phosphor particles for high fidelity, as mentioned above. The evaluation was performed with use of an area ratio (hereinafter referred to as an NTSC ratio) of a triangle formed by connecting three chromaticity coordinate values using high-fidelity phosphor, based on the area of an NTSC triangle formed by connecting chromaticity coordinate values of the three NTSC standard colors in the CIE 1931 chromaticity diagram.

For example, when BAM-B is used for blue, BAM-G for green, and YVO for red (example 1), the NTSC ratio is 92[%], when SCA is used for blue, BAM-G for green, and YVO for red (example 2), the NTSC ratio is 100[%], and when SCA is used for blue, BAM-G for green, and YOX for red (example 3), the NTSC ratio is 95[%], and thus luminance can be improved 10[%] over examples 1 and 2.

Note that the chromaticity coordinate values used for this evaluation have been measured for a liquid crystal display apparatus in which lamps, etc. have been mounted.

2. Material of the Glass Bulb

The following is a supplementary description regarding the material of the glass bulb with reference to FIG. 2.

The material of the glass bulb 26 is not limited to borosilicate glass, and lead glass, lead-free glass, soda glass, etc., may be used. In such a case, the in-dark start characteristic can be improved. Specifically, the above glass contains a large amount of an alkali metal oxide typified by sodium oxide ($Na_2O$), and when sodium oxide is used, for example, the sodium (Na) component elutes into an inner face of the glass bulb as time passes. Since sodium has a low electronegativity, the sodium that elutes into the interior surface of the glass bulb (does not have a protective film) is thought to contribute to an improvement in the in-dark start characteristic of the lamp.

In particular, in an external/internal electrode type fluorescent lamp such as the fluorescent lamp pertaining to embodiment 19 described later or an external electrode type fluorescent lamp, a content ratio of alkali metallic oxide between 3 [mol %] and 20 [mol %] inclusive is preferable.

For example, when the alkali metal oxide is sodium oxide, a content ratio between 5 [mol %] and 20 [mol %] inclusive is preferable. If the alkali metal oxide is less than 5 mol %, the probability of the in-dark start time exceeding 1 [second] is high (in other words, the probability is high of the in-dark start time being under 1 [second] when the content ratio is under 5 [mol %]), and if over 20 mol %, prolonged use causes problems such as whitening of the glass tube and a decline in the strength of the glass bulb.

Also, using lead-free glass is preferable in consideration of environmental protection. However, there are cases in the manufacturing process of lead-free glass in which lead is included as an impurity. Therefore, lead-free glass is defined as also including glass which includes an impurity level of lead that is less than or equal to 0.1 wt %.

Also, doping the glass with a transition metal oxide, in a predetermined amount depending on the type of oxide, enables absorbing 254 [nm] and 313 [nm] ultraviolet radiation. Specifically, for example when using titanium oxide ($TiO_2$), doping a composition ratio of greater than or equal to 0.05 [mol %] enables absorbing 254 [nm] ultraviolet radiation, and doping a composition ratio of greater than or equal to 2 [mol %] enables absorbing 313 [nm] ultraviolet radiation. However, since the glass devitrifies if a composition ratio of more than 5.0 [mol %] of titanium oxide is used, doping a composition ratio in a range between 0.05 [mol %] and 5.0 [mol %] inclusive is preferable.

When cerium oxide ($CeO_2$) is used, doping a composition ratio greater than or equal to 0.05 [mol %] enables absorbing 254 [nm] ultraviolet radiation. However, since doping a composition ratio of more than 0.5 [mol %] of cerium oxide stains the glass, doping a composition ratio of cerium oxide in a range between 0.05 [mol %] and 0.5 [mol %] inclusive is preferable. Note that since doping tin oxide (SnO) in addition to cerium oxide enables suppressing staining of the glass by the cerium oxide, this enables doping cerium oxide up to a composition ratio of 5.0 [mol %] inclusive. In such a case, doping a composition ratio of cerium oxide greater than or equal to 0.5 [mol %] enables absorbing 313 [nm] ultraviolet radiation. However, even in such a case, doping a composition ratio of cerium oxide of more than 5.0 [mol %] causes the glass to devitrify.

Also, when zinc oxide (ZnO) is used, doping a composition ratio greater than or equal to 2.0 [mol %] enables absorbing 254 [nm] ultraviolet radiation. However, doping a composition ratio of more than 10 [mol %] of zinc oxide causes the coefficient of thermal expansion of the glass to increase, and when the lead wire 6005 is made of tungsten (W), the coefficient of thermal expansion of the lead wire 6005 (approximately $44 \times 10^{-7}$ [$K^{-1}$]) is different from the coefficient of thermal expansion of the glass, thereby making sealing difficult. Therefore, doping a composition ratio of zinc oxide in a range between 2.0 [mol %] and 10 [mol %] inclusive is preferable. However, when the lead wire 6005 is made of Kovar or molybdenum (Mo), since the coefficient of thermal expansion of the lead wire 6005 (approximately $51 \times 10^{-7}$ [$K^{-1}$]) is larger than when tungsten is used, zinc oxide can be doped up to a composition ratio of 14 [mol %], inclusive.

Also when iron oxide ($Fe_2O_3$) is used, doping composition ratio greater than or equal to 0.01 [mol %] enables absorbing 254 [nm] ultraviolet radiation. However, since doping a composition ratio of more than 2.0 [mol %] of iron oxide stains the glass, doping a composition ratio of iron oxide in a range between 0.01 [mol %] and 2.0 [mol %] inclusive is preferable.

Also, the infrared transmission coefficient is adjusted to be preferably in a range between 0.3 and 1.2, inclusive, and particularly between 0.4 and 0.8, inclusive. An infrared transmission coefficient of less than or equal to 1.2 enables readily obtaining a low dielectric loss tangent that is applicable to a high-voltage impressed lamp of an external electrode fluorescent lamp (EEFL) or a long-type cold cathode fluorescent lamp, and if lower than or equal to 0.8, the dielectric loss tangent is sufficiently small, and further applicable to a high-voltage impressed lamp.

Note that the infrared transmission coefficient (X) can be represented by the formula below.

$$X = (\log(a/b))/t \quad \text{[Formula I]}$$

a: transmission rate [%] at local minimum point in the vicinity of 3840 [$cm^{-1}$]
b: transmission rate [%] at local minimum point in the vicinity of 3560 [$cm^{-}$]
t: thickness of the glass Note that adjusting the thermal expansion coefficient of the glass enables increasing the sealing strength of the lead wires 22 and 24 of the lamp 20 (see FIG. 2). For example, if the lead wires 22 and 24 are made of tungsten (W), a range of $36 \times 10^{-7}$ [$K^{-1}$] to $45 \times 10^{-7}$ [$K^{-1}$] inclusive is preferable. In such a case, causing the sum of the alkali metal component and the alkali earth metal component in the glass to be between 4 [mol %] and 10 [mol %] inclusive enables the thermal expansion coefficient of the glass to be in the above range.

Also, when the lead wires 22 and 24 are made of Kovar or molybdenum (Mo), a range of $45 \times 10^{-7}$ [$K^{-1}$] to $56 \times 10^{-7}$ [$K^{-1}$] inclusive is preferable. In such a case, causing the sum of the alkali metal component and the alkali earth metal component in the glass to be between 7 [mol %] and 14 [mol %] inclusive enables the thermal expansion coefficient of the glass to be in the above range.

Also, when the lead wires 22 and 24 are made of Dumet, a value in the vicinity of $94 \times 10^{-7}$ [$K^{-1}$] is preferable. In such a case, causing the sum of the alkali metal component and the alkali earth metal component in the glass to be between 20 [mol %] and 30 [mol %] inclusive enables the thermal expansion coefficient of the glass to be the value mentioned above.

3. Liquid Crystal Display Apparatus and Circuit Structure

Figure 60:
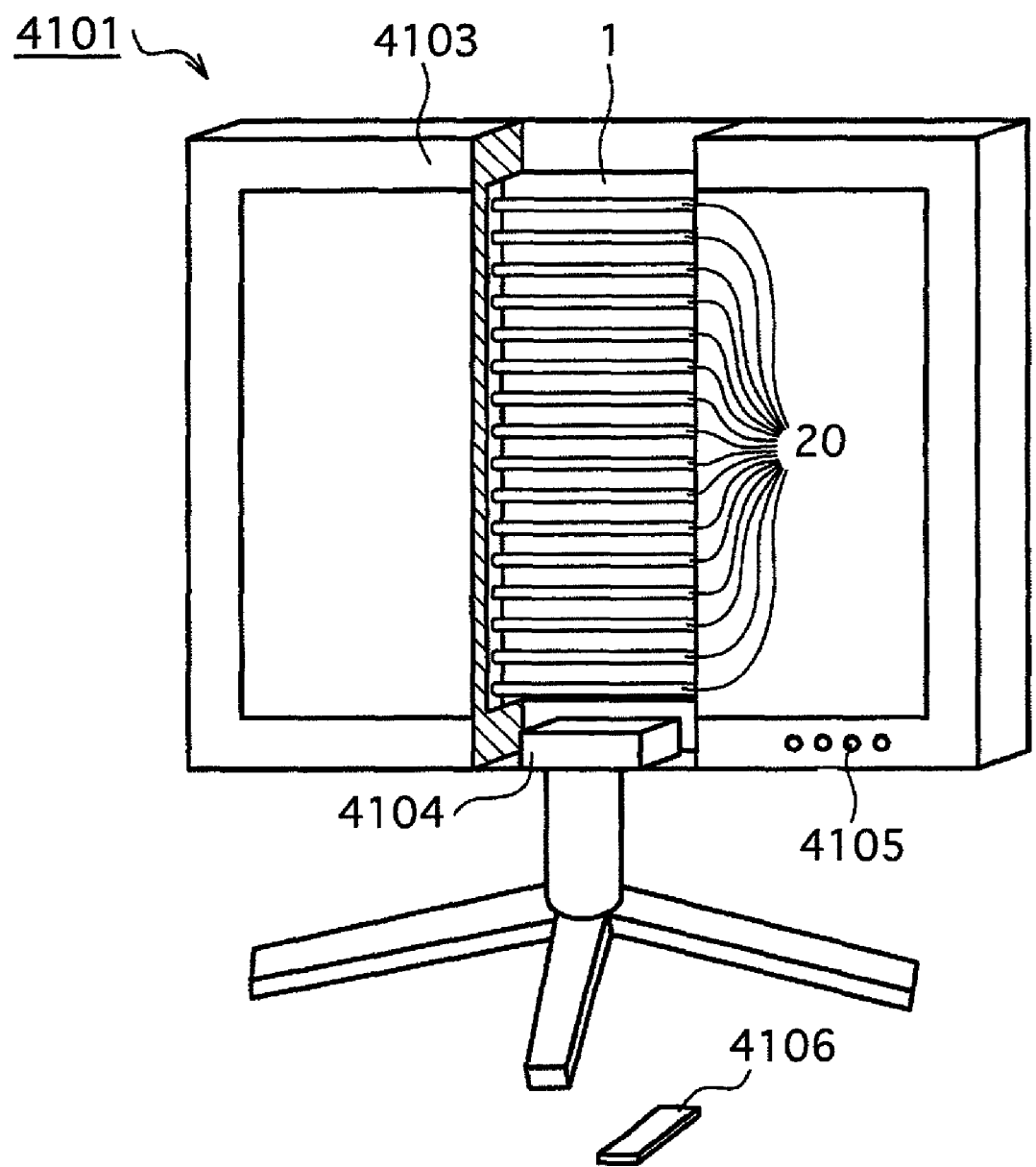
FIG. 60 is a partially cut-away perspective view of an exemplary display apparatus using fluorescent lamps.

Next, a display apparatus is described that uses the fluorescent lamp of the present invention. FIG. 60 schematically shows a display apparatus 4101 that uses fluorescent lamps of the present invention.

The display apparatus 4101 of FIG. 60 is, for example, a 32-inch liquid crystal television, and includes a liquid crystal screen unit 4103 and a backlight unit (fluorescent lamp unit) 1. Although the aspect ratio differs slightly from FIG. 1, since the structural elements in the backlight unit 1 shown in FIG. 60 are basically similar to FIG. 1, the same reference notations are used, and description thereof is omitted.

The liquid crystal screen unit 4103 includes, for example, a color filter substrate, a liquid crystal, a TFT substrate, and a drive module (not depicted), and a color image is formed in accordance with an image signal from an external source. An electronic ballast 4104 has been disposed on the bottom portion of the liquid crystal screen unit 4103, and all of the plurality of cold cathode fluorescent lamps 20 provided on the backlight unit 1 are lit by the electronic ballast 4104. Note that in FIG. 60, 4105 is a manual operation button, and 4106 is a remote control.

Next, a lighting apparatus for lighting the cold cathode fluorescent lamp 20 (see FIG. 2) is described.

Figure 61:
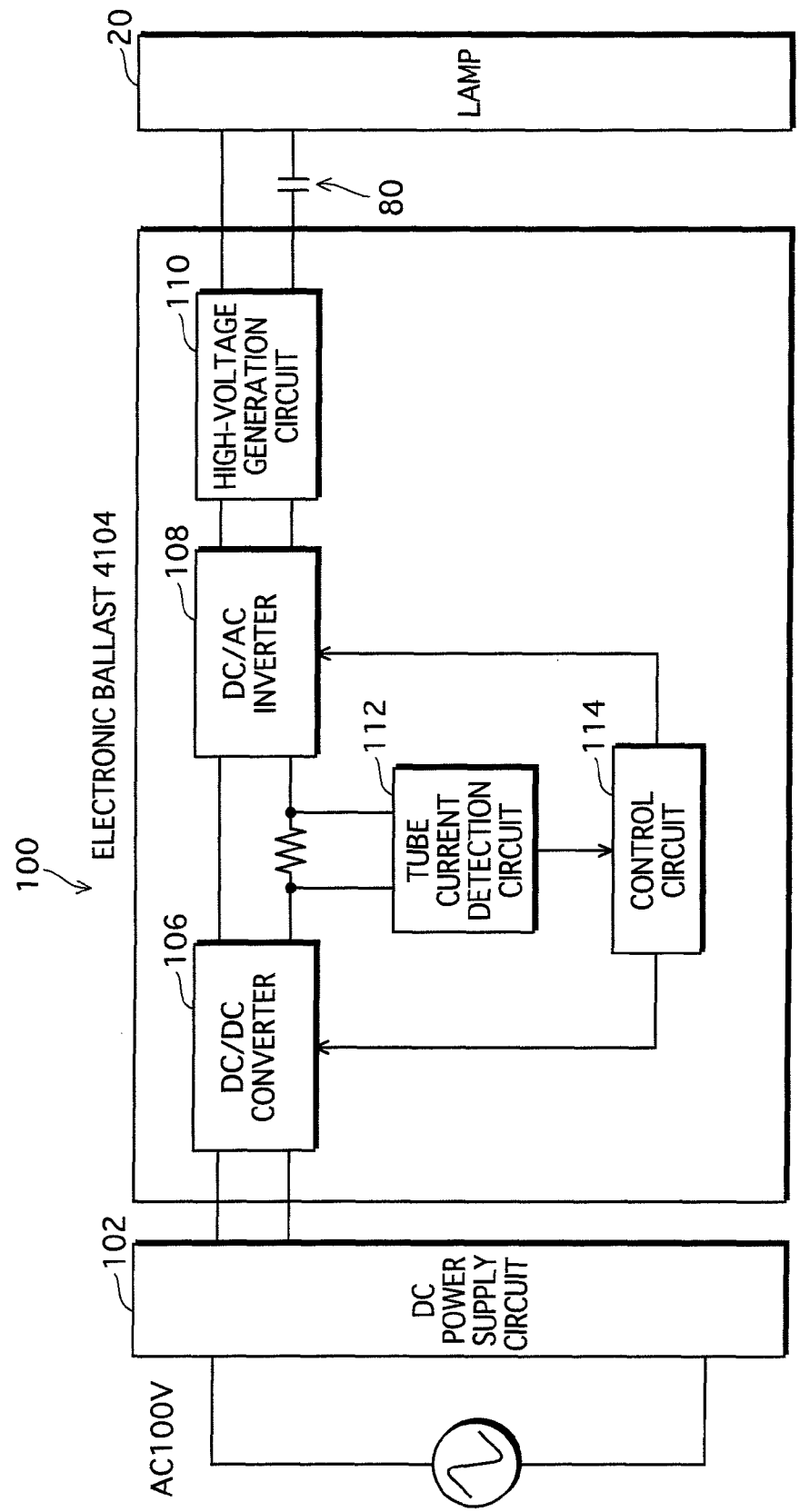
FIG. 61 is a block diagram showing a structure of a lighting apparatus in a backlight unit.

FIG. 61 is a block diagram showing a structure of a lighting apparatus 100 for lighting a cold cathode fluorescent lamp 20. Note that although only one of the cold cathode fluorescent lamps 20 is depicted in FIG. 61, a plurality of cold cathode fluorescent lamps 20 are connected in parallel in the lighting apparatus 100. Also, one of the lead wires of the cold cathode fluorescent lamps 20 is electrically connected to the lighting apparatus 100 via a ballast capacitor 80 that is provided in each one of the plurality of cold cathode fluorescent lamps 20. The ballast capacitor 80 enables causing the plurality of cold cathode fluorescent lamps 20 to be lit in parallel by an electronic ballast (inverter) 4104 described below.

As shown in FIG. 61, the lighting apparatus 100 is constituted from a DC power supply circuit 102 and the electronic ballast 4104. The electronic ballast 4104 is constituted from a DC/DC converter 106, a DC/AC inverter 108, a high voltage generation circuit 110, a tube current detection circuit 112, and a control circuit 114.

The DC power supply circuit 102 generates direct current voltage from a commercial alternating current power supply (100V), and supplies power to the electronic ballast 4104. The DC/DC converter 106 converts the direct current voltage to a predetermined size of direct current voltage, and supplies power to the DC/AC inverter 108. The DC/AC inverter 108 generates an alternating rectangular current having a predetermined frequency and sends the alternating rectangular current to the high voltage generation circuit 110. The high voltage generation circuit 110 includes a transformer (not depicted), and the high voltage generated by the high voltage generation circuit 110 is applied to the cold cathode fluorescent lamps 20.

Meanwhile, the tube current detection circuit 112 is connected to the input side of the DC/AC inverter 108, indirectly detects the lamp current (drive current) of the cold cathode fluorescent lamps 20, and sends the detection signal to the control circuit 114. In accordance with the detection signal, the control circuit 114 refers to the reference current value set in an internal memory (not depicted), and controls the DC/DC converter 106 and the DC/AC inverter 108 so as to light the cold cathode fluorescent lamps 20 at the set current of the reference current value.

Accordingly, setting the reference current value of the internal memory to a drive current value demarcated according to FIG. 46 drives the cold cathode fluorescent lamps 20 at the drive current value (reference current value) of the predetermined current.

INDUSTRIAL APPLICABILITY

The direct type backlight unit manufacturing method of the present invention enables detecting the orientation of fluorescent lamps in a lengthwise direction by a simple method.

The invention claimed is:

1. A manufacturing method for a direct type backlight unit, comprising the steps of:
preparing a plurality of fluorescent lamps, each of the fluorescent lamps having a non-phosphor layer area of a first length at a first end, a non-phosphor layer area of a second length at a second end, and light emitting properties that are different from each other at a first end side and a second end side;
detecting, with use of a sensor, a length of the non-phosphor layer area at least one of the first end and the second end; and
installing the plurality of fluorescent lamps in a housing with use of a result of the detection, so that the first end and the second end alternate on a same side of the housing.

2. The manufacturing method for a direct type backlight unit of claim 1, wherein for each of the fluorescent lamps
in the detection step, using a boundary between a non-phosphor layer area and a phosphor layer area as a reference, a distance from the boundary to a predetermined position of a constituent element of the fluorescent lamp is detected with use of the sensor.

3. The manufacturing method for a direct type backlight unit of claim 2, wherein
each of the fluorescent lamps further includes a pair of electrodes, each electrode being disposed on an inner side of a different one of the first end and the second end, and
in the detection step, a distance from the boundary to a base of at least one of the electrodes is detected with use of the sensor.

4. The manufacturing method for a direct type backlight unit of claim 2, wherein
each of the first and second end portions of each of the fluorescent lamps further includes a lead wire projecting outward, and
in the detection step, a distance from the boundary to an outer tip of at least one of the lead wires is detected with use of the sensor.

5. A fluorescent lamp including a glass bulb and a phosphor layer formed on an inner face of the glass bulb excluding ends thereof, wherein
a length of a non-phosphor layer area extending from one of the ends of the glass bulb and a length of the non-phosphor layer area extending from another of the ends of the glass bulb are sufficiently different so as to be identifiable by a sensor.

6. The fluorescent lamp of claim 5, wherein
an identifying mark pertaining to detecting lengthwise orientation has been provided on one of an outer circumference and an inner circumference of the non-phosphor layer area of the glass bulb.

7. The fluorescent lamp of claim 6, wherein
a plurality of the identifying marks have been provided at respective positions on the outer circumference of the glass bulb, the positions corresponding to the non-phosphor layer area, the plurality of identifying marks have been provided so as to be at positions substantially equivalent to each other in the lengthwise direction of the glass bulb, and such that one or more of the identifying marks is visible from a direction regardless of a revolution direction of the glass bulb, and
the plurality of identifying marks have been provided so as to have one or more intervals therebetween in the revolution direction.

8. The fluorescent lamp of claim 5, wherein
the difference between the length of the non-phosphor layer area extending from the one end of the glass bulb and the length of the non-phosphor layer area extending from the another end of the glass bulb is greater than or equal to 2 [mm].

9. The fluorescent lamp of claim 5, wherein
both of the ends of the glass bulb have been pinch-sealed to form pinch-sealed ends,
a lead-in wire and a gas exhaust tube have been inserted through at least one of the pinch-sealed ends, the lead-in wire functioning as a power supply route to an internal electrode, and an outer end of the gas exhaust tube being sealed, and
the fluorescent lamp further comprises:
a base that is electrically connected to the lead-in wire and affixed to one of the gas exhaust tube and a portion of the glass bulb excluding the pinch-sealed ends.

10. The fluorescent lamp of claim 9, wherein
the base is sleeve-shaped and affixed to an un-pinch-sealed portion of the glass bulb, the un-pinch-sealed portion being a portion of the glass bulb other than the pinch-sealed ends.

11. The fluorescent lamp of claim 9, wherein
the gas exhaust tube extends outward from at least one of the pinch-sealed ends, and the base has been affixed to an extending portion of the gas exhaust tube.

12. The fluorescent lamp of claim 5, further comprising:
a pair of bottomed tube-shaped electrodes, each electrode being disposed on an inner side of a different one of the first end and the second end; and
a fluorescent lamp emitter containing magnesium oxide, whose primary particles are formed from single crystals, formed on at least a portion of one of an inner face and an outer face of at least one of the electrodes, an average particle diameter of the single crystals being less than or equal to 1 [μm].

13. The fluorescent lamp of claim 5, further comprising:
a pair of bottomed tube-shaped electrodes, each electrode being disposed on an inner side of a different one of the first end and the second end, wherein
an electrode material of at least one of the electrodes is composed of nickel as a base material, yttrium oxide in a range of 0.1 [wt %] to 1.0 [wt %] inclusive having been added to the electrode material.

14. The fluorescent lamp of claim 13, wherein
any of silicon, titanium, strontium and calcium has been added to the electrode material in a content amount that is less than or equal to half of a content amount of the yttrium oxide.

15. The fluorescent lamp of claim 5, wherein
a mixed gas including argon gas and neon gas has been enclosed in the glass bulb,
letting a charged pressure [Torr] of the mixed gas be plotted on an x axis and a drive current value [mA] be plotted on a y axis in an x-y orthogonal coordinate system, the charged pressure of the mixed gas is a coordinate value of x and the mixed gas drive current value is a coordinate value of y that are in an area enclosed by a line (including the line) drawn sequentially between points represented as (x,y) coordinates, the points being (10,10), (10, 7.6), (21,6), (31,4), (49,4), (51,6), (52,8), (53,10), and (10, 10), and the mixed gas contains argon gas at a partial pressure rate of greater than or equal to 20[%].

16. The fluorescent lamp of claim 15, wherein the charged pressure of the mixed gas and the drive current value are, respectively, in an area enclosed by a line (including the line) drawn sequentially between points represented as (x,y) coordinates in the x-y orthogonal coordinate system, the points being (10,10), (10, 8.5), (13,8), (30,6), (44,6), (47,8), (50,10), and (10,10).

17. The fluorescent lamp of claim 16, wherein the charged pressure of the mixed gas and the drive current value are, respectively, in an area enclosed by a line (including the line) drawn sequentially between points represented as (x,y) coordinates in the x-y orthogonal coordinate system, the points being (10,10), (10, 9.3), (27,8), (39,8), (46,10), and (10,10).

18. The fluorescent lamp of claim 17, wherein the charged pressure of the mixed gas and the drive current value are, respectively, on a line that connects points represented as (x,y) coordinates in the x-y orthogonal coordinate system, the points being (10,10) and (32, 10).

19. A backlight unit including the fluorescent lamp of claim 5 in a housing.

20. A liquid crystal display apparatus including the backlight unit of claim 19.

* * * * *